US009019607B2

(12) United States Patent
Merrill et al.

(10) Patent No.: US 9,019,607 B2
(45) Date of Patent: Apr. 28, 2015

(54) MULTILAYER OPTICAL FILMS SUITABLE FOR BI-LEVEL INTERNAL PATTERNING

(75) Inventors: William Ward Merrill, White Bear Lake, MN (US); Douglas S. Dunn, Maplewood, MN (US); Przemyslaw P. Markowicz, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 408 days.

(21) Appl. No.: 13/139,848

(22) PCT Filed: Dec. 22, 2009

(86) PCT No.: PCT/US2009/069173
§ 371 (c)(1),
(2), (4) Date: Jun. 15, 2011

(87) PCT Pub. No.: WO2010/075373
PCT Pub. Date: Jul. 1, 2010

(65) Prior Publication Data
US 2011/0255167 A1 Oct. 20, 2011

Related U.S. Application Data

(60) Provisional application No. 61/139,736, filed on Dec. 22, 2008, provisional application No. 61/157,996, filed on Mar. 6, 2009, provisional application No. 61/158,006, filed on Mar. 6, 2009.

(51) Int. Cl.
*G02B 5/30* (2006.01)
*G02B 5/08* (2006.01)

(52) U.S. Cl.
CPC .............. *G02B 5/305* (2013.01); *G02B 5/0841* (2013.01); *G02B 5/30* (2013.01)

(58) Field of Classification Search
USPC ............ 359/485.01, 485.03, 489.01, 489.06, 359/489.08, 489.11, 489.12, 489.13, 359/489.19, 577, 580, 583, 584, 586, 588, 359/589, 590
See application file for complete search history.

(56) References Cited

U.S. PATENT DOCUMENTS 4,417,948 A    11/1983   Mayne-Banton et al.
4,446,305 A    5/1984    Rogers
(Continued)

FOREIGN PATENT DOCUMENTS

EP    0976529    2/2000
GB    2328180    2/1999
(Continued)

OTHER PUBLICATIONS

Tsai, "Fabricating Polymeric Micro-retardation Arrays for Autostereoscopic Display System by $CO_2$ Laser Heat Processing Technology", Stereoscopic Displays and Virtual Reality Systems VII, Proceedings of SPIE, May 3, 2000, vol. 3957, pp. 142-152.
(Continued)

*Primary Examiner* — Stephone B Allen
*Assistant Examiner* — Jyotsna Dabbi
(74) *Attorney, Agent, or Firm* — Yufeng Dong; Gregory D. Allen; James A. Baker

(57) ABSTRACT

A reflective film includes a first optical stack that provides a first reflective characteristic and a second optical stack that provides a second reflective characteristic. The optical stacks also have first and second absorptive characteristics that are suitable to absorptively heat the respective stacks upon exposure to light including a write wavelength while maintaining the structural integrity of the stacks. The absorptive heating can change the first and second reflective characteristics to third and fourth reflective characteristics, respectively. A blocking layer that at least partially blocks light of the write wavelength may also be provided between the optical stacks to permit absorptive heating of any selected one of the optical stacks. The reflective characteristics of the optical stacks can thus be independently modified in any desired patterns by appropriate delivery of light beams that include the write wavelength.

13 Claims, 11 Drawing Sheets

(56) References Cited

U.S. PATENT DOCUMENTS

| | | |
|---|---|---|
| 4,551,819 A | 11/1985 | Michl et al. |
| 4,568,632 A | 2/1986 | Blum et al. |
| 4,822,451 A | 4/1989 | Ouderkirk et al. |
| 4,864,537 A | 9/1989 | Michl et al. |
| 4,879,176 A | 11/1989 | Ouderkirk et al. |
| 4,902,378 A | 2/1990 | Ouderkirk et al. |
| 5,103,337 A | 4/1992 | Schrenk et al. |
| 5,302,259 A | 4/1994 | Birngruber |
| 5,360,659 A | 11/1994 | Arends et al. |
| 5,389,324 A | 2/1995 | Lewis et al. |
| 5,527,650 A | 6/1996 | Yoshinaga et al. |
| 5,633,123 A | 5/1997 | Hill et al. |
| 5,706,131 A | 1/1998 | Ichimura |
| 5,757,016 A | 5/1998 | Dunn et al. |
| 5,781,317 A | 7/1998 | Kawazoe et al. |
| 5,882,774 A | 3/1999 | Jonza et al. |
| 5,926,241 A | 7/1999 | Gunning, III |
| 6,045,894 A | 4/2000 | Jonza et al. |
| 6,099,758 A | 8/2000 | Verall et al. |
| 6,157,490 A | 12/2000 | Wheatley et al. |
| 6,179,948 B1 | 1/2001 | Merrill et al. |
| 6,207,260 B1 | 3/2001 | Wheatley et al. |
| 6,252,710 B1 | 6/2001 | Fan et al. |
| 6,268,961 B1 | 7/2001 | Nevitt et al. |
| 6,352,761 B1 | 3/2002 | Hebrink et al. |
| 6,368,699 B1 | 4/2002 | Gilbert et al. |
| 6,372,309 B1 | 4/2002 | Claussen |
| 6,498,679 B2 | 12/2002 | Lee et al. |
| 6,506,480 B2 | 1/2003 | Liu et al. |
| 6,531,230 B1 | 3/2003 | Weber et al. |
| 6,590,707 B1 | 7/2003 | Weber |
| 6,628,877 B2 | 9/2003 | Dugan et al. |
| 6,686,105 B2 | 2/2004 | Washizu |
| 6,693,657 B2 | 2/2004 | Carroll, Jr. et al. |
| 6,783,349 B2 | 8/2004 | Neavin et al. |
| 6,788,463 B2 | 9/2004 | Merrill et al. |
| 6,830,713 B2 | 12/2004 | Hebrink et al. |
| 6,852,203 B1 | 2/2005 | Kawakami |
| 6,939,499 B2 | 9/2005 | Merrill et al. |
| 6,949,212 B2 | 9/2005 | Merrill et al. |
| 6,977,774 B1 | 12/2005 | Kawakami |
| 6,991,695 B2 | 1/2006 | Tait et al. |
| 7,064,897 B2 | 6/2006 | Hebrink |
| 7,187,396 B2 | 3/2007 | Carroll, Jr. et al. |
| 7,223,512 B2 | 5/2007 | Lutz |
| 7,256,936 B2 | 8/2007 | Hebrink et al. |
| 7,316,558 B2 | 1/2008 | Merrill et al. |
| 7,396,493 B2 | 7/2008 | Tait |
| 7,435,357 B2 | 10/2008 | Harding |
| 8,297,522 B2 | 10/2012 | Umemoto |
| 2001/0036745 A1* | 11/2001 | Sandhu ............ 438/736 |
| 2002/0154406 A1 | 10/2002 | Merrill et al. |
| 2003/0178609 A1 | 9/2003 | Hammond-Smith et al. |
| 2004/0008298 A1 | 1/2004 | Kwok et al. |
| 2004/0022967 A1 | 2/2004 | Lutz |
| 2004/0051875 A1 | 3/2004 | Mi et al. |
| 2005/0032009 A1* | 2/2005 | Goswami et al. ............ 430/617 |
| 2006/0126066 A1 | 6/2006 | Kawakami |
| 2006/0285210 A1 | 12/2006 | Hebrink et al. |
| 2007/0177272 A1* | 8/2007 | Benson et al. ............ 359/584 |
| 2007/0228325 A1 | 10/2007 | Yumoto et al. |
| 2007/0247573 A1 | 10/2007 | Ouderkirk et al. |
| 2008/0003419 A1* | 1/2008 | Hebrink et al. ............ 428/213 |
| 2008/0143926 A1* | 6/2008 | Amimori et al. ............ 349/75 |
| 2008/0174848 A1 | 7/2008 | Kim et al. |
| 2008/0241733 A1* | 10/2008 | Wright et al. ............ 430/200 |
| 2009/0219603 A1* | 9/2009 | Xue ............ 359/288 |
| 2009/0273836 A1 | 11/2009 | Yust et al. |
| 2011/0121557 A1 | 5/2011 | Wu et al. |

FOREIGN PATENT DOCUMENTS

| | | |
|---|---|---|
| JP | H08263841 | 10/1996 |
| JP | 08334618 | 12/1996 |
| JP | 09183287 | 7/1997 |
| JP | 2000-242748 | 9/2000 |
| JP | 2001-051122 | 2/2001 |
| JP | 2001-194695 | 7/2001 |
| JP | 2001-256531 | 9/2001 |
| JP | 2002048915 | 2/2002 |
| JP | 2005-017430 | 1/2005 |
| JP | 2007-086720 | 4/2007 |
| WO | WO 97/36195 | 10/1997 |
| WO | WO 02/084343 | 10/2002 |
| WO | WO 2006/110402 | 10/2006 |
| WO | WO 2007/084000 | 7/2007 |
| WO | WO 2009/093718 | 7/2009 |
| WO | WO 2009/140088 | 11/2009 |
| WO | WO 2010/075340 | 7/2010 |
| WO | WO 2010/075357 | 7/2010 |
| WO | WO 2010/075363 | 7/2010 |
| WO | WO 2010/075383 | 7/2010 |

OTHER PUBLICATIONS

3M Security Solutions Brochure, "3M™ Color Shifting Authentication Products", 2 pgs, Feb. 28, 2008.

Tsai et al., "Fabricating Microretarders by $CO_2$ Laser Heating Process Technology", Opt. Eng., Nov. 2001, vol. 40, No. 11, pp. 2577-2581.

International Search Report for PCT/US2009/069173, Feb. 11, 2010.

Written Opinion for PCT/US2009/069173, Feb. 24, 2010.

U.S. Appl. No. 13/139,826; Inventors: William W. Merrill and Douglas S. Dunn and Travis L. Potts; Filed: Dec. 22, 2009.

U.S. Appl. No. 13/139,838; Inventors: William W. Merrill, Douglas S. Dunn; Filed: Dec. 22, 2009.

U.S. Appl. No. 13/139,856; Inventors: William W. Merrill, Douglas S. Dunn, Stephen A. Johnson, and David T. Yust; Filed: Dec. 22, 2009.

U.S. Appl. No. 13/139,866; Inventors: William W. Merrill and Douglas S. Dunn; Filed Dec. 22, 2009.

* cited by examiner

MULTILAYER OPTICAL FILMS SUITABLE FOR BI-LEVEL INTERNAL PATTERNING

CROSS REFERENCE TO RELATED APPLICATIONS

This application claims the benefit of U.S. Provisional Application No. 61/139,736, "Internally Patterned Multilayer Optical Films Using Spatially Selective Birefringence Reduction", filed Dec. 22, 2008, and U.S. Provisional Application No. 61/157,996, "Multilayer Optical Films Having Side-by-Side Mirror/Polarizer Zones", filed Mar. 6, 2009, and U.S. Provisional Application No. 61/158,006, "Multilayer Optical Films Suitable for Bi-Level Internal Patterning", filed Mar. 6, 2009, the disclosures of which are incorporated herein by reference.

FIELD OF THE INVENTION

This invention relates generally to optical films, with particular application to such films whose reflection characteristics are determined in large part by constructive and destructive interference of light reflected from interfaces between layers disposed within the film, i.e., internal to the film. The invention also relates to associated systems and methods.

BACKGROUND

Multilayer optical films, i.e., films that contain a multiplicity of distinct layers of different refractive index and of suitable thicknesses to selectively reflect and transmit light as a result of constructive and destructive interference of light reflected at the interfaces between the layers, are known. In some cases, such films are formed by vacuum depositing alternating layers of a high refractive index inorganic material, such as titanium dioxide, and a low refractive index inorganic material, such as silicon dioxide, onto a glass substrate or other rigid substrate.

In other cases, such films are formed by coextruding different organic polymer materials in an alternating layer arrangement through a die, cooling the extrudate to form a cast web, and stretching the cast web in order to thin the web to a suitable final thickness. In some cases the stretching may also be carried out in such a way as to cause one or both of the alternating polymer materials to become birefringent, i.e., wherein a given material has a refractive index for light polarized along one direction that differs from a refractive index for light polarized along a different direction.

This birefringence may result in the finished film having a large refractive index mismatch between adjacent layers along a first in-plane direction (sometimes referred to as an x-axis or block axis), and a substantial refractive index match between adjacent layers along a second in-plane direction (sometimes referred to as a y-axis or pass axis), whereupon normally incident light polarized along the first direction is highly reflected and normally incident light polarized along the second direction is highly transmitted. See, e.g., U.S. Pat. No. 3,610,729 (Rogers), U.S. Pat. No. 4,446,305 (Rogers et al.), and U.S. Pat. No. 5,486,949 (Schrenk et al.). Such a film is typically referred to as a reflective polarizer.

The birefringence may also result in a refractive index difference between adjacent layers along an out-of-plane direction (i.e., along an axis perpendicular to the film) that differs significantly from a refractive index difference between adjacent layers along one or both in-plane directions. An example of this latter situation is a film having substantially the same large refractive index mismatch between adjacent layers along both orthogonal in-plane directions (x and y), such that normally incident light of any polarization is highly reflected, but where the refractive indices of adjacent layers along the out-of-plane direction (z) are substantially matched, such that the reflectivity of the interfaces for so-called "p-polarized" light (light polarized in the plane of incidence) is substantially constant. See, e.g., U.S. Pat. No. 5,882,774 (Jonza et al.). Jonza et al. teach, among other things, how a z-axis mismatch in refractive index between adjacent microlayers, more briefly termed the z-index mismatch or $\Delta n_z$, can be tailored to allow the construction of multilayer stacks for which the Brewster angle—the angle at which reflectance of p-polarized light at an interface goes to zero—is very large or is nonexistent. This in turn allows for the construction of multilayer mirrors and polarizers whose interfacial reflectivity for p-polarized light decreases slowly with increasing angle of incidence, or is independent of angle of incidence, or increases with angle of incidence away from the normal direction. As a result, multilayer films having high reflectivity for both s-polarized light (light polarized perpendicular to the plane of incidence) and p-polarized light for any incident direction in the case of mirrors, and for the selected direction in the case of polarizers, over a wide bandwidth, can be achieved.

It is also known to impart a pattern to multilayer optical films to form indicia. See, e.g., U.S. Pat. No. 6,045,894 (Jonza et al.) "Clear to Colored Security Film", U.S. Pat. No. 6,531,230 (Weber et al.) "Color Shifting Film", and U.S. Pat. No. 6,788,463 (Merrill et al.) "Post-Formable Multilayer Optical Films and Methods of Forming". Pressure is selectively applied to the film, such as with an embossing die, to thin the film in selected areas or zones to produce the desired pattern. The selective thinning, which may produce a thickness reduction greater than 5% or greater than approximately 10%, is effective throughout the thickness of the film in the selected areas, such that substantially all optically thin layers ("microlayers") internal to the film, which microlayers are responsible for the observed reflective and transmissive characteristics, are also thinned in the selected areas relative to neighboring areas of the film. This thinning of the microlayers shifts any reflection bands associated with the microlayers to shorter wavelengths as a result of the shortened optical path length difference through the microlayers. The shift in the reflection band is manifested to the observer as a difference in reflected or transmitted color between the embossed and unembossed areas, so that the pattern is readily perceived.

For example, the '463 Merrill et al. patent describes an embossed color shifting security film in which a multilayer polymer film containing 418 internal microlayers (two packets of 209 microlayers each) was embossed in selected regions. Before embossing, and in unembossed areas after embossing, the microlayers had refractive indices and thicknesses that produced a reflection band whose short wavelength band edge shifted with incidence angle (viewing angle) from 720 nm at normal incidence, to 640 nm at 45 degree viewing, to an even shorter wavelength at 60 degree viewing, corresponding to a clear appearance at normal, to cyan at 45 degrees, to a brilliant cyan at 60 degrees. In these unembossed areas the film had a thickness of 3.4 mils, i.e., 0.0034 inches. The film was then embossed between a roll at 149 degrees C. and a pre-heated embossing plate to thin the film down to about 3.0 mils in the selected areas. The embossed areas exhibited a bright gold color at normal incidence, indicative of a band edge shift from 720 nm to shorter wavelengths. The observed color in the embossed areas changed to cyan or deeper blue at oblique viewing angles.

BRIEF SUMMARY

The known embossing techniques modify one area or zone of the film (e.g. an embossed area) relative to another area (e.g. an unembossed area), but they have limited applicability since the pressure of the embossing tool is transmitted to all interior layers of the film in the embossed area. Moreover, such pressure typically has a depth profile that is greatest at the outer surface of the film and diminishes monotonically and smoothly with increasing depth, with no ability to selectively treat an interior portion of the film without substantially treating other interior portions or surface layers of the film. The embossing techniques thus do not allow the skilled artisan to effectively practice bi-level patterning, in which one interior portion of the film is selectively modified in one area and a different interior portion of the film is selectively modified in a different area.

We describe herein, among other things, multilayer optical films that are designed to allow reflective characteristics of different groups of interior layers to be independently modified to provide bi-level internal patterning. For example, the multilayer optical film may contain two microlayer packets, and reflective characteristics of each microlayer packet are capable of being modified independently. The film may also include other independently addressable interior layers, such as a third microlayer packet whose reflective characteristic can be modified independent of the other two microlayer packets.

In exemplary embodiments, modification of the reflective characteristics of the respective microlayer packets or other groups of interior layers is accomplished by reducing or eliminating a birefringence in at least some interior layers of the film by selective heating. The heating can be provided at least in part by directing a beam of light at the multilayer optical film, the beam of light comprising a write wavelength at which at least some of the interior layers of the multilayer optical film are absorptive. In the x- and y- (in-plane) directions, the heating can be patternwise applied to selected in-plane areas or zones of the film by shaping and/or steering the light beam as appropriate so that only the selected in-plane areas or zones are exposed to the light. In the z- (thickness) direction, the heating can be applied to different selected interior portions of the film by suitable design of the multilayer optical film, in combination with suitable delivery characteristics of the directed light beam, as described further below. In at least some cases, the internal patterning can be accomplished without any selective application of pressure to the film, and/or without any significant thinning of the film.

The selective birefringence reduction can be performed by the judicious delivery of an appropriate amount of energy to a selected in-plane zone so as to selectively heat some of the interior layers therein to a temperature high enough to produce a relaxation in the material that reduces or eliminates a preexisting optical birefringence, but low enough to maintain the physical integrity of the layer structure within the film. The reduction in birefringence may be partial or it may be complete, in which case some of the interior layers that are birefringent in a first (untreated) zone are rendered optically isotropic in a second (treated) zone. The selective heating may be achieved at least in part by selective delivery of light or other radiant energy to the second zone of the film. The light may comprise ultraviolet, visible, or infrared wavelengths, or combinations thereof. Typically the light is substantially monochromatic at a wavelength $\lambda$, as is the case with most laser sources, or the light may be relatively narrow band with a center or peak occurring at a wavelength $\lambda$ as is the case with LED light sources, where in any case $\lambda$ may be referred to as a "write wavelength" because the light at this wavelength can be used to modify or "write" information to the film in the desired pattern. At least some of the delivered light is absorbed by the film to provide the desired heating, with the amount of light absorbed being a function of the intensity, duration, and wavelength distribution of the delivered light, and the absorptive properties of the film. Such a technique for internally patterning a multilayer optical film is compatible with known high intensity light sources and electronically addressable beam steering systems, thus allowing for the creation of virtually any desired pattern or image in the film by simply steering the light beam appropriately, without the need for dedicated hardware such as image-specific embossing plates or photomasks.

We also describe a multilayer optical film that includes a first and second group of interior layers arranged to selectively reflect light by constructive or destructive interference to provide a first and second reflective characteristic, respectively. The first group of layers has a first absorption characteristic suitable to, upon exposure to light comprising a write wavelength, absorptively heat the first group of layers by an amount sufficient to change the first reflective characteristic to a third reflective characteristic while maintaining the structural integrity of the first group of layers. Likewise, the second group of layers has a second absorption characteristic suitable to, upon exposure to light comprising a write wavelength, absorptively heat the second group of layers by an amount sufficient to change the second reflective characteristic to a fourth reflective characteristic while maintaining the structural integrity of the second group of layers. The film also preferably includes a first blocking layer disposed between the first and second groups of interior layers, the blocking layer being adapted to at least partially block light of the write wavelength.

The first blocking layer preferably blocks light of the write wavelength such that a first beam of light comprising the write wavelength can be directed at the film to change the first reflective characteristic to the third reflective characteristic without substantially changing the second reflective characteristic. The first blocking layer also preferably blocks light of the write wavelength such that a second beam of light comprising the write wavelength can be directed at the film to change the second reflective characteristic to the fourth reflective characteristic without substantially changing the first reflective characteristic. In some embodiments the first blocking layer is substantially absorptive at the write wavelength, and in some embodiments the first blocking layer is substantially reflective at the write wavelength. In the former case, the first blocking layer may comprise an absorbing agent, which may also be included in selected layers of the multilayer optical film. In the latter case, the first blocking layer may incorporate a multilayer stack whose reflectivity is a function of incidence angle such that the blocking layer substantially reflects a first beam of light at the write wavelength and substantially transmits a second beam of light at the write wavelength, the first and second beams having different angles of incidence. The first blocking layer may also have blocking characteristics that are strong functions of polarization. That is, the blocking layer may be or comprise a reflective polarizer or an absorptive polarizer, for example. In such a case the blocking layer may substantially block (by absorption or reflection) a first beam of light at the write wavelength and substantially transmit a second light beam at the write wavelength, where the first and second light beams may differ only in their polarization states.

The multilayer optical film may also include a third group of interior layers arranged to selectively reflect light by constructive or destructive interference to provide a fifth reflective characteristic, the third group of layers also having a third absorption characteristic suitable to, upon exposure to light comprising the write wavelength, absorptively heat the third group of layers by an amount sufficient to change the fifth reflective characteristic to a sixth reflective characteristic while maintaining the structural integrity of the third group of layers. In this case, the film may also then include a second blocking layer disposed between the third group of interior layers and one or both of the first and second groups of interior layers, the second blocking layer being adapted to at least partially block light of the write wavelength.

We also describe a method of making a bi-level patterned film. In the method, a multilayer optical film is provided that has a first and second group of interior layers arranged to selectively reflect light by constructive or destructive interference to provide a first and second reflective characteristic, respectively. Preferably, the multilayer optical film also includes a blocking layer disposed between the first and second groups of interior layers. The method includes directing a first beam of light comprising a write wavelength at the film to change the first reflective characteristic to a third reflective characteristic without substantially changing the second reflective characteristic. The method also includes directing a second beam of light comprising the write wavelength at the film to change the second reflective characteristic to a fourth reflective characteristic without substantially changing the first reflective characteristic. The directing steps may be carried out in patternwise fashion to provide a bi-level internally patterned article in which the third reflective characteristic is associated with a first pattern and the fourth reflective characteristic is associated with a second pattern, the first and second patterns being overlapping, non-overlapping, or partially overlapping.

In some cases the multilayer optical film may also comprise a third group of interior layers arranged to selectively reflect light by constructive or destructive interference to provide a fifth reflective characteristic, and the method may further include directing a third beam of light comprising the write wavelength at the film to change the fifth reflective characteristic to a sixth reflective characteristic without substantially changing the first and second reflective characteristics.

In the method, the first and second beams may be directed at the same major surface of the film, or at opposed major surfaces. The first and second beams may also be characterized by the same angle of incidence relative to the film or different angles of incidence. In one example, the first and second beams may both have the same write wavelength and may both be directed at the same major surface of the film at the same angle of incidence (e.g., normal incidence), but may be polarized in different (e.g. orthogonal) polarization states. Depending on the design of the multilayer optical film, the third reflective characteristic may comprise a peak reflectivity less than, or greater than, a peak reflectivity of the first reflective characteristic. Likewise, the fourth reflective characteristic may comprise a peak reflectivity less than, or greater than, a peak reflectivity of the second reflective characteristic. In some film embodiments that include the first, second, and third groups of interior layers, and first and second blocking layers separating these groups, the first, second, and third beams capable of selectively writing or treating their respective groups of layers may all be directed at the same major surface of the film and may all have the same write wavelength.

We also disclose a patterned multilayer optical film that includes a first and second group of interior layers arranged to selectively reflect light by constructive or destructive interference. The first group of layers extends at least from a first zone to a second zone of the film, and provides a first reflective characteristic in the first zone and a third reflective characteristic different from the first reflective characteristic in the second zone. The second group of layers extends at least from the first zone to a third zone of the film, and provides a second reflective characteristic in the first zone and a fourth reflective characteristic different from the second reflective characteristic in the third zone. Significantly, the second group of layers provides the second reflective characteristic not only in the first zone but also in at least a portion of the second zone. Further, the first group of layers may provide the first reflective characteristic not only in the first zone but also in at least a portion of the third zone. The difference between the first and third reflective characteristics, and/or between the second and fourth characteristics, may not be substantially attributable to any difference in film thickness between the respective zones of the film.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

In the figures, like reference numerals designate like elements.

DETAILED DESCRIPTION OF ILLUSTRATIVE EMBODIMENTS

In at least some embodiments, the bi-level internal patterning techniques discussed herein can make use of patterning techniques that do not rely on a selective thinning of the film to accomplish the patterning. For example, the bi-level internal patterning may utilize internal patterning techniques in which a multilayer optical film is selectively heated in at least one zone by exposing the film to suitable directed radiation, without any selective application of pressure, in such a way that birefringence of at least some interior layers is reduced or eliminated in the selected zone but not in a neighboring zone, while substantially maintaining the physical integrity of the layer structure in the selected (treated) zone, so as to change the reflective properties of the film in the selected zone relative to the neighboring zone. The various treated and untreated zones of the film may have substantially the same overall film thickness, or at any rate the difference in reflective characteristics between the different zones may not be substantially attributable to any differences in film thickness between the zones. Reference is made to U.S. Patent Application 61/139,736, "Internally Patterned Multilayer Optical Films Using Spatially Selective Birefringence Reduction", filed Dec. 22, 2008, and International Application No. PCT/US2009/069153, "Internally Patterned Multilayer Optical Films Using Spatially Selective Birefringence Reduction", filed on even date herewith, each of which is incorporated herein by reference.

Figure 1:
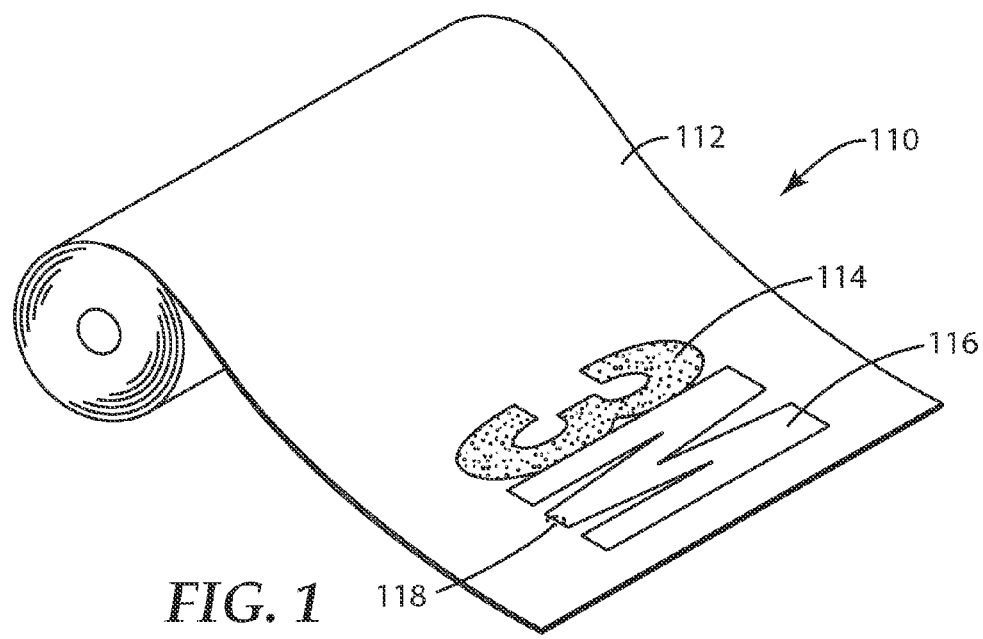
FIG. 1 is a perspective view of a roll of multilayer optical film that has been internally patterned independently in multiple levels thereof to provide different reflective characteristics in different portions or zones of the film so as to form bi-level indicia.

FIG. 1 depicts a multilayer optical film 110 that has been internally patterned or spatially tailored using spatially selective birefringence reduction of at least some of the internal layers (not shown in FIG. 1). The internal patterning defines distinct zones 112, 114, 116 that are shaped so as to form the indicia "3M" as shown. The film 110 is shown as a long flexible material wound into a roll because the methodology described herein is advantageously compatible with high volume roll-to-roll processes. However, the methodology is not limited to flexible roll goods and can be practiced on small piece parts or samples as well as non-flexible films and articles.

The "3M" indicia is visible because the different zones 112, 114, 116 have different reflective characteristics. In the depicted embodiment, zone 112 has a first film reflective characteristic, zone 114 has a second film reflective characteristic different from the first film reflective characteristic, and zone 116 has a third film reflective characteristic different from both the first and second film reflective characteristics. These "film reflective characteristics" are made up of reflective characteristics of distinct interior portions, such as distinct layer packets, of the film as discussed further below, the combination of which then provide the overall reflective characteristic of the film itself, i.e., the "film reflective characteristic".

For example, the first film reflective characteristic, in zone 112, may be a combination of a first reflective characteristic of a first layer packet and a second reflective characteristic of a second layer packet. In such a case, the second film reflective characteristic of zone 114 may then be a combination of a (modified) third reflective characteristic of the first layer packet and the (unmodified) second reflective characteristic of the second layer packet, while the third film reflective characteristic of zone 116 may be a combination of the (unmodified) first reflective characteristic of the first layer packet and a (modified) fourth reflective characteristic of the second layer packet. Alternatively, the second film reflective characteristic of zone 114 may be a combination of the (modified) third reflective characteristic of the first layer packet and the (unmodified) second reflective characteristic of the second layer packet, while the third film reflective characteristic of zone 116 may be a combination of the (modified) third reflective characteristic of the first layer packet and the (modified) fourth reflective characteristic of the second packet. In still another alternative, the second film reflective characteristic of zone 114 may be a combination of the (modified) third reflective characteristic of the first layer packet and the (modified) fourth reflective characteristic of the second layer packet, while the third film reflective characteristic of zone 116 may be a combination of the (unmodified) first reflective characteristic of the first layer packet and the (modified) fourth reflective characteristic of the second packet.

Typically, but not necessarily, the film 110 will be at least partially light transmissive, in which case the zones 112, 114, 116 will also have different "film transmissive characteristics" that correspond to their respective reflective characteristics. In general, of course, transmission (T) plus reflection (R) plus absorption (A)=100%, or T+R+A=100%. In some embodiments the film is composed entirely of materials that have low absorption over at least a portion of the wavelength spectrum. This may be the case even for films that incorporate an absorbing dye or pigment to promote heat delivery, since some absorbing materials are wavelength-specific in their absorptivity. For example, infrared dyes are available that selectively absorb in the near-infrared wavelength region but that have very little absorption in the visible spectrum. At the other end of the spectrum, many polymer materials that are considered to be low loss in the multilayer optical film literature do have low loss over the visible spectrum but also have significant absorption at certain ultraviolet wavelengths. Thus, in many cases the multilayer optical film 110 may have an absorption that is small or negligible over at least a limited portion of the wavelength spectrum, such as the visible spectrum, in which case the reflection and transmission over that limited range take on a complementary relationship because T+R=100%−A, and since A is small, $$T+R \approx 100\%.$$

As mentioned above and explained further below, the first, second, and third film reflective characteristics are each the result of structural features that are internal to the film 110, rather than the result of coatings applied to the surface of the film or other surface features. This aspect of the disclosed films makes them advantageous for security applications (e.g. where the film is intended for application to a product, package, or document as an indicator of authenticity) because the interior features are difficult to copy or counterfeit.

The first, second, and third film reflective characteristics differ from each other in some way that is perceptible under at least some viewing conditions to permit detection of the pattern by an observer or by a machine. In some cases it may be desirable to maximize the difference between the various film reflective characteristics at visible wavelengths so that the pattern is conspicuous to human observers under most viewing and lighting conditions. In other cases it may be desirable to provide only a subtle difference between the various film reflective characteristics, or to provide a difference that is conspicuous only under certain viewing conditions. In either case the differences between the first, second, and third reflective characteristics are preferably attributable primarily to differences in the refractive index properties of interior layers of the multilayer optical film in the different neighboring zones of the film, and are not primarily attributable to differences in thickness between the neighboring zones.

The zone-to-zone differences in refractive index can produce various differences in reflective characteristics (whether of the entire film and/or a portion of its constituent interior layers) depending on the design of the multilayer optical film. In some cases a first reflective characteristic (whether of the entire film and/or a portion of its constituent interior layers) may include a first reflection band with a given center wavelength, band edge, and maximum reflectivity, and a second reflective characteristic (whether of the entire film and/or a portion of its constituent interior layers) may differ from the first by having a second reflection band that is similar in center wavelength and/or band edge to the first reflection band, but that has a substantially different maximum reflectivity (whether greater or lesser) than the first reflection band, or the second reflection band may be substantially absent from the second reflection characteristic. These first and second reflection bands may be associated with light of only one polarization state, or with light of any polarization state depending on the design of the film.

In some cases the first and second reflective characteristics may differ in their dependence with viewing angle. For example, the first reflective characteristic may include a first reflection band that has a given center wavelength, band edge, and maximum reflectivity at normal incidence, and the second reflective characteristic may include a second reflection band that is very similar to these aspects of the first reflection band at normal incidence. With increasing incidence angle, however, although both the first and second reflection bands may shift to shorter wavelengths, their respective maximum reflectivities may deviate from each other greatly. For example, the maximum reflectivity of the first reflection band may remain constant or increase with increasing incidence angle, while the maximum reflectivity of the second reflection band, or at least the p-polarized component thereof, may decrease with increasing incidence angle.

In cases where the differences discussed above between the first and second reflective characteristics relate to reflection bands that cover a portion of the visible spectrum, the differences may be perceived as differences in color between the different in-plane zones of the film.

Figure 2:
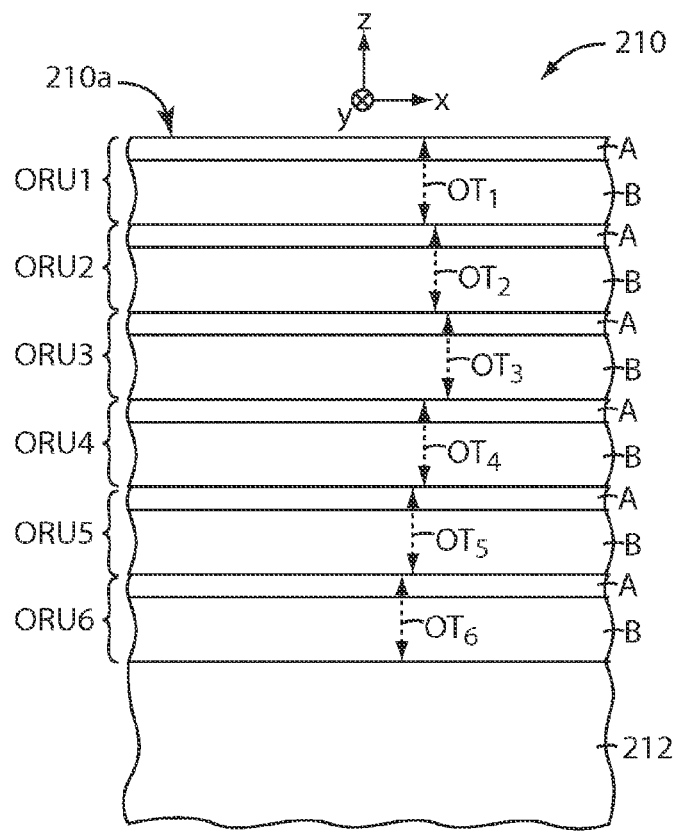
FIG. 2 is a schematic side view of a portion of a multilayer optical film.

Turning now to FIG. 2, we see there a portion of a multilayer film 210 in schematic side view to reveal the structure of the film including its interior layers. The film is shown in relation to a local x-y-z Cartesian coordinate system, where the film extends parallel to the x- and y-axes, and the z-axis is perpendicular to the film and its constituent layers and parallel to a thickness axis of the film. Note that the film 210 need not be entirely flat, but may be curved or otherwise shaped to deviate from a plane, and even in those cases arbitrarily small portions or regions of the film can be associated with a local Cartesian coordinate system as shown. The film 210 may in general be considered to represent a portion of the film 110 of FIG. 1 in any of its zones 112, 114, 116, since the individual layers of the film 110 preferably extend continuously from each such zone to the next.

Multilayer optical films include individual layers having different refractive indices so that some light is reflected at interfaces between adjacent layers. These layers, sometimes referred to as "microlayers", are sufficiently thin so that light reflected at a plurality of the interfaces undergoes constructive or destructive interference to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 µm. However, thicker layers can also be included, such as skin layers at the outer surfaces of the multilayer optical film, or protective boundary layers (PBLs) disposed within the multilayer optical film to separate coherent groupings (known as "stacks" or "packets") of microlayers. In FIG. 2, the microlayers are labeled "A" or "B", the "A" layers being composed of one material and the "B" layers being composed of a different material, these layers being stacked in an alternating arrangement to form optical repeat units or unit cells ORU 1, ORU 2, . . . ORU 6 as shown. Typically, a multilayer optical film composed entirely of polymeric materials would include many more than 6 optical repeat units if high reflectivities are desired. Note that all of the "A" and "B" microlayers shown in FIG. 2 are interior layers of film 210, except for the uppermost "A" layer whose upper surface in this illustrative example coincides with the outer surface 210a of the film 210. The substantially thicker layer 212 at the bottom of the figure can represent an outer skin layer, or a PBL that separates the stack of microlayers shown in the figure from another stack or packet of microlayers (not shown). If desired, two or more separate multilayer optical films can be laminated together, e.g. with one or more thick adhesive layers, or using pressure, heat, or other methods to form a laminate or composite film.

In some cases, the microlayers can have thicknesses and refractive index values corresponding to a ¼-wave stack, i.e., arranged in optical repeat units each having two adjacent microlayers of equal optical thickness (f-ratio=50%, the f-ratio being the ratio of the optical thickness of a constituent layer "A" to the optical thickness of the complete optical repeat unit), such optical repeat unit being effective to reflect by constructive interference light whose wavelength λ is twice the overall optical thickness of the optical repeat unit, where the "optical thickness" of a body refers to its physical thickness multiplied by its refractive index. In other cases, the optical thickness of the microlayers in an optical repeat unit may be different from each other, whereby the f-ratio is greater than or less than 50%. In the embodiment of FIG. 2, the "A" layers are depicted for generality as being thinner than the "B" layers. Each depicted optical repeat unit (ORU 1, ORU 2, etc.) has an optical thickness ($OT_1$, $OT_2$, etc.) equal to the sum of the optical thicknesses of its constituent "A" and "B" layer, and each optical repeat unit reflects light whose wavelength λ is twice its overall optical thickness. The reflectivity provided by microlayer stacks or packets used in multilayer optical films in general, and by the internally patterned multilayer films discussed herein in particular, is typically substantially specular in nature, rather than diffuse, as a result of the generally smooth well-defined interfaces between microlayers, and the low haze materials that are used in a typical construction. In some cases, however, the finished article may be tailored to incorporate any desired degree of scattering, e.g., using a diffuse material in skin layer(s) and/or PBL layer(s), and/or using one or more surface diffusive structures or textured surfaces, for example.

In some embodiments, the optical thicknesses of the optical repeat units in a layer stack may all be equal to each other, to provide a narrow reflection band of high reflectivity centered at a wavelength equal to twice the optical thickness of each optical repeat unit. In other embodiments, the optical thicknesses of the optical repeat units may differ according to a thickness gradient along the z-axis or thickness direction of the film, whereby the optical thickness of the optical repeat units increases, decreases, or follows some other functional relationship as one progresses from one side of the stack (e.g. the top) to the other side of the stack (e.g. the bottom). Such thickness gradients can be used to provide a widened reflection band to provide substantially spectrally flat transmission and reflection of light over the extended wavelength band of interest, and also over all angles of interest. Thickness gradients tailored to sharpen the band edges at the wavelength transition between high reflection and high transmission can also be used, as discussed in U.S. Pat. No. 6,157,490 (Wheatley et al.) "Optical Film With Sharpened Bandedge". For polymeric multilayer optical films, reflection bands can be designed to have sharpened band edges as well as "flat top" reflection bands, in which the reflection properties are essentially constant across the wavelength range of application. Other layer arrangements, such as multilayer optical films having 2-microlayer optical repeat units whose f-ratio is different from 50%, or films whose optical repeat units include more than two microlayers, are also contemplated. These alternative optical repeat unit designs can be configured to reduce or to excite certain higher-order reflections, which may be useful if the desired reflection band resides in or extends to near infrared wavelengths. See, e.g., U.S. Pat. No. 5,103,337 (Schrenk et al.) "Infrared Reflective Optical Interference Film", U.S. Pat. No. 5,360,659 (Arends et al.) "Two Component Infrared Reflecting Film", U.S. Pat. No. 6,207,260 (Wheatley et al.) "Multicomponent Optical Body", and U.S. Pat. No. 7,019,905 (Weber) "Multi-layer Reflector With Suppression of High Order Reflections".

The thickness gradient and optical repeat unit design may thus be tailored as desired to provide the disclosed multilayer optical films, whether in a treated or untreated zone thereof, and whether for light of one polarization state or for unpolarized light, with a substantial reflectivity in a limited spectral band. For example, the substantial reflectivity may be at least 50%, or at least 60, 70, 80, or 90% or more, over only substantially one spectral band, the band being disposed in the visible or in any other desired portion of the spectrum. The band may have a bandwidth of less than 200, or 150, or 100, or 50 nm or less, for example, which may be measured as a full-width at half-maximum (FWHM) reflectivity. As noted above, the band may be associated with zero-order reflection, or with a desired higher order reflection if the optical repeat unit is suitably designed.

As mentioned above, adjacent microlayers of the multilayer optical film have different refractive indices so that some light is reflected at interfaces between adjacent layers. We refer to the refractive indices of one of the microlayers (e.g. the "A" layers in FIG. 2) for light polarized along principal x-, y-, and z-axes as $n1x$, $n1y$, and $n1z$, respectively. We refer to the refractive indices of the adjacent microlayer (e.g. the "B" layers in FIG. 2) along the same axes as $n2x$, $n2y$, $n2z$, respectively. The x-, y-, and z-axes may, for example, correspond to the principal directions of the dielectric tensor of the material. Typically, and for discussion purposes, the principle directions of the different materials are coincident, but this need not be the case in general. We refer to the differences in refractive index between these layers as Δnx ($=n1x-n2x$) along the x-direction, Δny ($=n1y-n2y$) along the y-direction, and Δnz ($=n1z-n2z$) along the z-direction. The nature of these refractive index differences, in combination with the number of microlayers in the film (or in a given stack of the film) and their thickness distribution, controls the reflective and transmissive characteristics of the film (or of the given stack of the film) in a given zone. For example, if adjacent microlayers have a large refractive index mismatch along one in-plane direction (Δnx large) and a small refractive index mismatch along the orthogonal in-plane direction (Δny≈0), the film or packet may behave as a reflective polarizer for normally incident light. In this regard, a reflective polarizer may be considered for purposes of this application to be an optical body that strongly reflects normally incident light that is polarized along one in-plane axis (referred to as the "block axis") if the wavelength is within the reflection band of the packet, and strongly transmits such light that is polarized along an orthogonal in-plane axis (referred to as the "pass axis"). "Strongly reflects" and "strongly transmits" may have different meanings depending on the intended application or field of use, but in many cases a reflective polarizer will have at least 70, 80, or 90% reflectivity for the block axis, and at least 70, 80, or 90% transmission for the pass axis.

For purposes of the present application, a material is considered to be "birefringent" if the material has an anisotropic dielectric tensor over a wavelength range of interest, e.g., a selected wavelength or band in the UV, visible, and/or infrared portions of the spectrum. Stated differently, a material is considered to be "birefringent" if the principal refractive indices of the material (e.g., $n1x$, $n1y$, $n1z$) are not all the same.

In another example, adjacent microlayers may have a large refractive index mismatch along both in-plane axes (Δnx large and Δny large), in which case the film or packet may behave as an on-axis mirror. In this regard, a mirror or mirror-like film may be considered for purposes of this application to be an optical body that strongly reflects normally incident light of any polarization if the wavelength is within the reflection band of the packet. Again, "strongly reflecting" may have different meanings depending on the intended application or field of use, but in many cases a mirror will have at least 70, 80, or 90% reflectivity for normally incident light of any polarization at the wavelength of interest.

In variations of the foregoing embodiments, the adjacent microlayers may exhibit a refractive index match or mismatch along the z-axis ($\Delta n_z \approx 0$ or $\Delta n_z$ large), and the mismatch may be of the same or opposite polarity or sign as the in-plane refractive index mismatch(es). Such tailoring of $\Delta n_z$ plays a key role in whether the reflectivity of the p-polarized component of obliquely incident light increases, decreases, or remains the same with increasing incidence angle. In yet another example, adjacent microlayers may have a substantial refractive index match along both in-plane axes ($\Delta n_x \approx \Delta n_y \approx 0$) but a refractive index mismatch along the z-axis ($\Delta n_z$ large), in which case the film or packet may behave as a so-called "p-polarizer", strongly transmitting normally incident light of any polarization, but increasingly reflecting p-polarized light of increasing incidence angle if the wavelength is within the reflection band of the packet.

In view of the large number of permutations of possible refractive index differences along the different axes, the total number of layers and their thickness distribution(s), and the number and type of microlayer packets included in the multilayer optical film, the variety of possible multilayer optical films 210 and packets thereof is vast. We refer to multilayer optical films disclosed in any of the patent documents cited herein (whether or not patented, and whether published by the U.S. Patent Office or by any another country or patent authority), as well as the following documents, all of which are incorporated herein by reference: U.S. Pat. No. 5,486,949 (Schrenk et al.) "Birefringent Interference Polarizer"; U.S. Pat. No. 5,882,774 (Jonza et al.) "Optical Film"; U.S. Pat. No. 6,045,894 (Jonza et al.) "Clear to Colored Security Film"; U.S. Pat. No. 6,179,949 (Merrill et al.) "Optical Film and Process for Manufacture Thereof"; U.S. Pat. No. 6,531,230 (Weber et al.) "Color Shifting Film"; U.S. Pat. No. 6,939,499 (Merrill et al.) "Processes and Apparatus for Making Transversely Drawn Films with Substantially Uniaxial Character"; U.S. Pat. No. 7,256,936 (Hebrink et al.) "Optical Polarizing Films with Designed Color Shifts"; U.S. Pat. No. 7,316,558 (Merrill et al.) "Devices for Stretching Polymer Films"; PCT Publication WO 2008/144136 A1 (Nevitt et al.) "Lamp-Hiding Assembly for a Direct Lit Backlight"; PCT Publication WO 2008/144656 A2 (Weber et al.) "Backlight and Display System Using Same".

At least some of the microlayers in each interior packet that is intended to be independently patterned are birefringent before the selective heat treatment, and preferably also are birefringent in at least one zone of the finished film (e.g., zones 112, 114, 116 of FIG. 1) after heat treatment. Thus, a first layer in the optical repeat units of a particular layer packet may be birefringent (i.e., $n1x \neq n1y$, or $n1x \neq n1z$, or $n1y \neq n1z$), or a second layer in the optical repeat units of such packet may be birefringent (i.e., $n2x \neq n2y$, or $n2x \neq n2z$, or $n2y \neq n2z$), or both the first and second layers may be birefringent. Moreover, the birefringence of one or more such layers is diminished in at least one zone relative to a neighboring zone. In some cases, the birefringence of these layers may be diminished to zero, such that they are optically isotropic (i.e., $n1x = n1y = n1z$, or $n2x = n2y = n2z$) in one zone but birefringent in a neighboring zone. In cases where both layers are initially birefringent, depending on materials selection and processing conditions, they can be processed in such a way that the birefringence of only one of the layers is substantially diminished, or the birefringence of both layers may be diminished.

Exemplary multilayer optical films and microlayer packets thereof are composed of polymer materials and may be fabricated using coextruding, casting, and orienting processes. Reference is made to U.S. Pat. No. 5,882,774 (Jonza et al.) "Optical Film", U.S. Pat. No. 6,179,949 (Merrill et al.) "Optical Film and Process for Manufacture Thereof", and U.S. Pat. No. 6,783,349 (Neavin et al.) "Apparatus for Making Multilayer Optical Films". The multilayer optical film may be formed by coextrusion of the polymers as described in any of the aforementioned references. The polymers of the various layers are preferably chosen to have similar rheological properties, e.g., melt viscosities, so that they can be co-extruded without significant flow disturbances. Extrusion conditions are chosen to adequately feed, melt, mix, and pump the respective polymers as feed streams or melt streams in a continuous and stable manner. Temperatures used to form and maintain each of the melt streams may be chosen to be within a range that avoids freezing, crystallization, or unduly high pressure drops at the low end of the temperature range, and that avoids material degradation at the high end of the range.

In brief summary, the fabrication method may comprise: (a) providing at least a first and a second stream of resin corresponding to the first and second polymers to be used in the finished film; (b) dividing the first and the second streams into a plurality of layers using a suitable feedblock, such as one that comprises: (i) a gradient plate comprising first and second flow channels, where the first channel has a cross-sectional area that changes from a first position to a second position along the flow channel, (ii) a feeder tube plate having a first plurality of conduits in fluid communication with the first flow channel and a second plurality of conduits in fluid communication with the second flow channel, each conduit feeding its own respective slot die, each conduit having a first end and a second end, the first end of the conduits being in fluid communication with the flow channels, and the second end of the conduits being in fluid communication with the slot die, and (iii) optionally, an axial rod heater located proximal to said conduits; (c) passing the composite stream through an extrusion die to form a multilayer web in which each layer is generally parallel to the major surface of adjacent layers; and (d) casting the multilayer web onto a chill roll, sometimes referred to as a casting wheel or casting drum, to form a cast multilayer film. This cast film may have the same number of layers as the finished film, but the layers of the cast film are typically much thicker than those of the finished film. Furthermore, the layers of the cast film are typically all isotropic.

Many alternative methods of fabricating the cast multilayer web can also be used. One such alternative method that also utilizes polymer coextrusion is described in U.S. Pat. No. 5,389,324 (Lewis et al.).

After cooling, the multilayer web can be drawn or stretched to produce the near-finished multilayer optical film, details of which can be found in the references cited above. The drawing or stretching accomplishes two goals: it thins the layers to their desired final thicknesses, and it orients the layers such that at least some of the layers become birefringent. The orientation or stretching can be accomplished along the cross-web direction (e.g. via a tenter), along the down-web direction (e.g. via a length orienter), or any combination thereof, whether simultaneously or sequentially. If stretched along only one direction, the stretch can be "unconstrained" (wherein the film is allowed to dimensionally relax in the in-plane direction perpendicular to the stretch direction) or "constrained" (wherein the film is constrained and thus not allowed to dimensionally relax in the in-plane direction perpendicular to the stretch direction). If stretched along both in-plane directions, the stretch can be symmetric, i.e., equal along the orthogonal in-plane directions, or asymmetric. Alternatively, the film may be stretched in a batch process. In any case, subsequent or concurrent draw reduction, stress or strain equilibration, heat setting, and other processing operations can also be applied to the film.

In some cases, a multilayer optical film that has been designed specifically for bi-level patterning, and which thus may include a first group of interior layers such as a first microlayer stack, a second group of interior layers such as a second microlayer stack, and a reflecting or absorbing blocking layer disposed between the first and second groups of interior layers, may be made in a single film-forming operation in which substantially all of the various constituent layers are coextruded, and then cast, and then stretched simultaneously. Alternatively, a multilayer optical film adapted for bi-level patterning may be made in a sequential fashion wherein two or more films are made in separate film-forming operations, each or some of which may involve coextrusion, casting, and stretching, and wherein the resulting films are then laminated or otherwise joined together before being exposed to the directed radiation responsible for the selective heating and patterning.

The multilayer optical films and film bodies can also include additional layers and coatings selected for their optical, mechanical, and/or chemical properties. For example, a UV absorbing layer can be added at one or both major outer surfaces of the film to protect the film from long-term degradation caused by UV light. Additional layers and coatings can also include scratch resistant layers, tear resistant layers, and stiffening agents. See, e.g., U.S. Pat. No. 6,368,699 (Gilbert et al.).

In some cases, the natural or inherent absorptivity of one, some, or all of the constituent polymer materials that make up the multilayer optical film may be utilized for the absorptive heating procedure. For example, many polymers that are low loss over the visible region have substantially higher absorptivity at certain ultraviolet and/or infrared wavelengths. Exposing portions of the film to light of such wavelengths may be used to selectively heat such portions of the film. Moreover, the natural or inherent absorptivity of the material(s) that make up the blocking layer(s) may be exploited to provide the necessary blocking of light of the write wavelength between groups of interior layers to allow the patternwise modification of one such group independent of another such group.

In other cases, absorbing dyes, pigments, or other agents can be incorporated into some or all of the individual layers of the multilayer optical film to promote absorptive heating as mentioned above, and/or to provide the necessary attenuation of light of the write wavelength in the blocking layer(s). In some cases, such absorbing agents are spectrally selective, whereby they absorb in one wavelength region but not in another. For example, some of the disclosed films may be intended for use in the visible region, such as with anti-counterfeiting security labels or as a component of a liquid crystal display (LCD) device or other display device, in which case an absorbing agent that absorbs at infrared or ultraviolet wavelengths but not substantially at visible wavelengths may be used. Further, an absorbing agent may be incorporated into one or more selected layers of a film. For example, the film may comprise two distinct microlayer packets separated by an optically thick layer such as a protective boundary layer (PBL), a laminating adhesive layer, one or more skin layers, or the like, and an absorbing agent may be incorporated into one of the packets and not the other, or may be incorporated into both packets but at a higher concentration in one relative to the other.

A variety of absorbing agents can be used. For optical films operating in the visible spectrum, dyes, pigments, or other additives that absorb in the ultraviolet and infrared (including near infrared) regions may be used. In some cases it may be advantageous to select an agent that absorbs in a spectral range for which the polymer materials of the film have a substantially lower absorption. By incorporating such an absorbing agent into selected layers of a multilayer optical film, directed radiation can preferentially deliver heat to the selected layers rather than throughout the entire thickness of the film. Exemplary absorbing agents may be melt extrudable so that they can be embedded into a selected layer set of interest. To this end, the absorbers are preferably reasonably stable at the processing temperatures and residence times required for extrusion. Some potential IR dyes include any of the Nickel, Palladium, and Platinum-based dyes available from Epolin, Inc. under the tradename Epolight™. Other suitable candidates include Amaplast™-brand dyes, available from ColorChem International Corp., Atlanta, Ga. For further information on suitable absorbing agents, reference is made to U.S. Pat. No. 6,207,260 (Wheatley et al.) "Multicomponent Optical Body".

In some cases the absorbing agent may be a non-linear absorber, i.e., it may be or comprise a composition in which the light energy absorption coefficient is intensity or fluence dependent, where intensity refers to energy per unit area per unit time, and fluence refers to energy density or energy per unit area. Nonlinear light absorbers may be of the two-photon absorption type or the reverse saturable absorption type, for example.

The two-photon absorption process is a nonlinear light absorption process in which the photon energy is approximately equal to half the energy required for linear excitation of the material. Excitation of the absorbing material therefore requires the simultaneous absorption of two of the lower energy photons. Examples of useful two-photon absorbers include those exhibiting large multiphoton absorption cross-sections, such as Rhodamine B (that is, N-[9-(2-carboxyphenyl)-6-(diethylamino)-3H-xanthen-3-ylidene]-N-ethylethanaminium chloride and the hexafluoroantimonate salt of Rhodamine B) and the four classes of photosensitizers described, for example, in PCT Publications WO 98/21521 (Marder et al.) and WO 99/53242 (Cumptson et al.).

The reverse saturable absorption process is also sometimes referred to as excited state absorption, and is characterized by the absorption cross section for the excited state involved in the absorption process being much larger than the cross section for excitation from the ground state to the excited state. The total light absorption involves both ground state absorption and excited state absorption. Examples of reverse saturable absorption materials include, for example, metallophthalocyanines, naphthalocyanines, cyanines, fullerenes, metal nanoparticles, metal oxide nanoparticles, metal cluster compounds, porphyrins, indanthrone derivatives and oligomers or combinations thereof. Examples of metallophthalocyanines include, for example, copper phthalocyanine (CuPC), and phthalocyanines containing metal or metalloids from group IIIA (Al, Ga, In) and IVA (Si, Ge, Sn, Pb). Examples of naphthalocyanines include, for example, the phthalocyanine derivatives of silicon (SiNC), tin (SnNC), and lead (PbNC). Examples of cyanines include, for example, 1,3,3,1',3',3'-hexamethylindotricarbocyanine iodide (HITCI). Examples of fullerenes include C60 and C70 fullerenes. Examples of metal nanoparticles include gold, silver, aluminum, and zinc nanoparticles. Examples of metal oxide nanoparticles include titanium dioxide, antimony tin oxide, and zirconium dioxide nanoparticles. Examples of metal clusters include iron tricobalt metal clusters such as $HFeCo_3(CO)_{12}$ and $NEt_4FeCO_3(CO)_{12}$. Examples of porphyrins include tetraphenylporphyrin (H2TPP), zinc tetraphenylporphyrin (ZnTPP), and cobalt tetraphenylporphyrin (CoTPP). Examples of indanthrone derivatives include unsubstituted indanthrone, oxidized indanthrone, chloroindanthrone, and an indanthrone oligomer.

Figure 3:
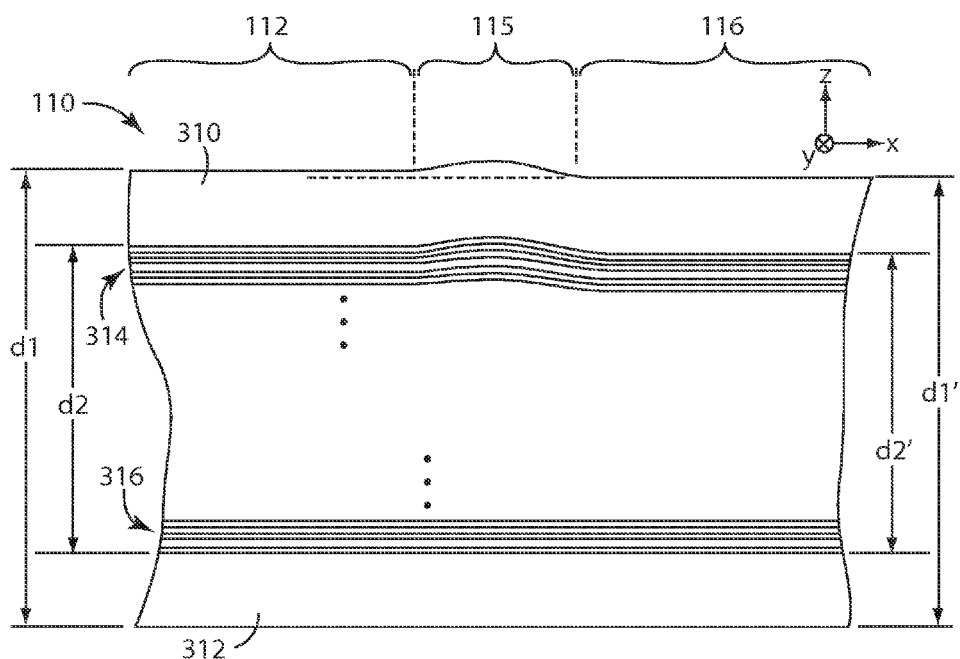
FIG. 3 is a schematic sectional view of a portion of the multilayer optical film of FIG. 1.

We turn now to FIG. 3, which shows a schematic sectional view of a portion of the multilayer optical film 110 of FIG. 1 in the vicinity of area 118 at a boundary of zone 112 and zone 116. In this expanded view of the film 110, a narrow transition zone 115 can be seen separating the zone 112 from the neighboring zone 116. Such a transition zone may or may not be present depending on processing details, and if it is not present then zone 116 may be immediately adjacent to zone 112 with no significant intervening features. Construction details of film 110 can also be seen: the film includes optically thick skin layers 310, 312 on opposite sides thereof, with a plurality of microlayers 314 and another plurality of microlayers 316 disposed between the skin layers 310, 312. All of the microlayers 314, 316 are interior to the film 110 by virtue of the outer skin layers. The space between microlayers 314 and 316 is left open in the drawing, but preferably the microlayers 314, 316 are portions of two or more distinct microlayer packets that are separated from each other by, for example, (i) one or more optically thick protective boundary layers (PBLs), (ii) one or more other optically thick interior layers, or (iii) a third distinct microlayer packet (and optionally a fourth distinct microlayer packet, and so forth), any of which may serve as a blocking layer. The microlayers 314, 316 preferably each comprise two alternating polymer materials arranged into optical repeat units, each of the microlayers 314, 316 extending continuously in a lateral or transverse fashion from the zone 112 to the neighboring zone 116 as shown. The microlayers 314, 316 provide a first and second reflective characteristic, respectively, in the zone 112 by constructive or destructive interference, and at least some of the microlayers 314, 316 are birefringent in this zone. These first and second reflective characteristics combine to provide the film with an overall first film reflective characteristic in the zone 112. In zones 115, 116, the microlayers 314, 316, as well as the entire film 110, may have previously had the same respective reflective characteristics as they do in zone 112, but one or both of the microlayers 314, 316 have been processed by the selective application of heat thereto in an amount sufficient to reduce or eliminate the birefringence of some of their respective microlayers in the zone 116, while maintaining the structural integrity of those microlayers in the treated zone 116 and also maintaining the birefringence of those microlayers in zone 112, so that the film has a second film reflective characteristic in zone 116 different from the first film reflective characteristic. The reduced birefringence of the microlayers 314 and/or 316 in the zone 116 is primarily responsible for the difference between the first film reflective characteristic in zone 112 and the second film reflective characteristic in zone 116.

The film 110 has characteristic thicknesses d1, d2 in zone 112, and characteristic thicknesses d1', d2' in zone 116, as shown in the figure. The thicknesses d1, d1' are physical thicknesses measured from a front outer surface of the film to a rear outer surface of the film in the respective zones. The thicknesses d2, d2' are physical thicknesses measured from the microlayer (at one end of a microlayer packet) that is disposed nearest the front surface of the film to the microlayer (typically at an end of a different microlayer packet) that is disposed nearest the rear surface of the film. Thus, if one wishes to compare the thickness of the film 110 in zone 112 with the thickness of the film in zone 116, one may choose to compare d1 to d1', or d2 to d2', depending on which measurement is more convenient. In most cases the comparison between d1 and d1' may well yield substantially the same result (proportionally) as the comparison between d2 and d2'. (Of course, in cases where the film contains no outer skin layers, and where microlayer packets terminate at both outer surfaces of the film, d1 and d2 become the same.) However, where a significant discrepancy exists, such as where a skin layer experiences a significant thickness change from one place to another but no corresponding thickness change exists in the underlying microlayers, or vice versa, then it may be desirable to use the d2 and d2' parameters as being more representative of the overall film thickness in the different zones, in view of the fact that the skin layers typically have a minor effect on the reflective characteristics of the film compared to the microlayer packet(s).

Of course, for multilayer optical films containing two or more distinct microlayer packets separated from each other by optically thick layers, the thickness of any given microlayer packet can also be measured and characterized as the distance along the z-axis from the first to the last microlayer in the packet. This information may become significant in a more in-depth analysis that compares the physical characteristics of the film 110 in the different zones 112, 116.

As mentioned, the zone 116 has been treated with the selective application of heat to cause at least some of the microlayers 314, 316 to lose some or all of their birefringence relative to their birefringence in neighboring zone 112, such that zone 116 exhibits a reflective characteristic, resulting from constructive or destructive interference of light from the microlayers, that differs from a reflective characteristic of zone 112. The selective heating process may involve no selective application of pressure to zone 116, and it may result in substantially no thickness change (whether using the parameters d1/d1' or the parameters d2/d2') to the film. For example, the film 110 may exhibit an average thickness in zone 116 that deviates from an average thickness in zone 112 by no more than the normal variability in thickness that one observes in the zone 112, or in the untreated film. Thus, the film 110 may exhibit in zone 112, or over an area of the film encompassing a portion of zone 112 and zone 116 before the heat treatment of zone 116, a variability in thickness (whether d1 or d2) of $\Delta d$, and the zone 116 may have spatially averaged thicknesses d1', d2' which differ from spatially averaged thicknesses d1, d2 (respectively) in zone 112 by no more than $\Delta d$. The parameter $\Delta d$ may represent, for example, one, two, or three standard deviations in the spatial distribution of the thickness d1 or d2.

In some cases, the heat treatment of zone 116 may give rise to certain changes to the thickness of the film in zone 116. These thickness changes may result from, for example, local shrinkage and/or expansion of the different materials that constitute the multilayer optical film, or may result from some other thermally-induced phenomenon. However, such thickness changes, if they occur, play only a secondary role in their effect on the reflective characteristic of the treated zone 116 compared to the primary role played by the reduction or elimination of birefringence in the treated zone. Note also that in many cases it may be desirable to hold the film by its edges under tension during the selective heat treatment that accomplishes the internal patterning, in order to avoid wrinkling of the film, or for other reasons. The amount of tension applied and details of the heat treatment may also result in some amount of thickness change in the treated zones.

In some cases it is possible to distinguish the effect of a thickness change from a change in birefringence by analyzing the reflective properties of the film. For example, if the microlayers in an untreated zone (e.g. zone 112) provide a reflection band characterized by a left band edge (LBE), right band edge (RBE), center wavelength $\lambda_c$, and peak reflectivity $R_1$, a given thickness change for those microlayers (with no change in the refractive indices of the microlayers) will produce a reflection band for the treated zone having a peak reflectivity $R_2$ about the same as $R_1$, but having an LBE, RBE, and center wavelength that are proportionally shifted in wavelength relative to those features of the reflection band of the untreated zone, and this shift can be measured. On the other hand, a change in birefringence will typically produce only a very minor shift in wavelength of the LBE, RBE, and center wavelengths, as a result of the (usually very small) change in optical thickness caused by the change in birefringence. (Recall that optical thickness equals physical thickness multiplied by refractive index.) The change in birefringence can, however, have a large or at least a significant effect on the peak reflectivity of the reflection band, depending on the design of the microlayer stack. Thus, in some cases, the change in birefringence may provide a peak reflectivity $R_2$ for the reflection band in the modified zone that differs substantially from $R_1$, where of course $R_1$ and $R_2$ are compared under the same illumination and observation conditions. If $R_1$ and $R_2$ are expressed in percentages, $R_2$ may differ from $R_1$ by at least 10%, or by at least 20%, or by at least 30%. As a clarifying example, $R_1$ may be 70%, and $R_2$ may be 60%, 50%, 40%, or less. Alternatively, $R_1$ may be 10%, and $R_2$ may be 20%, 30%, 40%, or more. $R_1$ and $R_2$ may also be compared by taking their ratio. For example, $R_2/R_1$ or its reciprocal may be at least 2, or at least 3.

A significant change in peak reflectivity, to the extent it is indicative of a change in the interfacial reflectivity (sometimes referred to as optical power) resulting from a change in refractive index difference between adjacent layers due to a change in birefringence, is also typically accompanied by at least some change in the bandwidth of the reflection band, where the bandwidth refers to the separation between the LBE and RBE.

As we have discussed, in some cases the thickness of the film 110 in the treated zone 116, i.e., d1' or d2', may differ somewhat from the thickness of the film in the untreated zone 112, even if no selective pressure was in fact applied to the zone 116 during heat treatment. For this reason, FIG. 3 depicts d1' as being slightly different from d1, and d2' as being slightly different from d2. A transition zone 115 is also shown for generality, to show that a "bump" or other detectable artifact may exist on the outer surface of the film as a consequence of the selective heat treatment. In some cases, however, the treatment may result in no detectable artifact between the neighboring treated and untreated zones. For example, in some cases an observer who slides his or her finger across the boundary between the zones may detect no bump, ridge, or other physical artifact between the zones.

Under some circumstances it is possible for thickness differences between treated and untreated zones to be non-proportional through the thickness of the film. For example, in some cases it is possible for an outer skin layer to have a relatively small thickness difference, expressed as a percentage change, between the treated and untreated zones, while one or more internal microlayer packets may have a larger thickness difference, also expressed as a percentage change, between the same zones.

Figure 4:
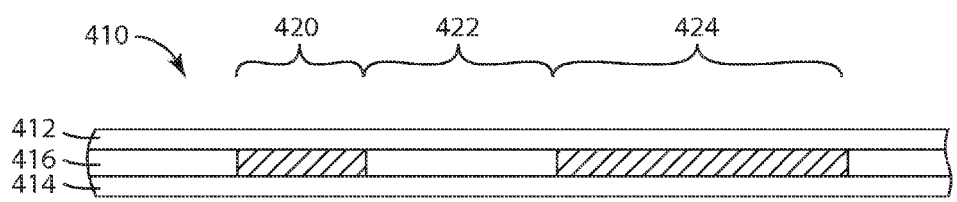
FIG. 4 is a schematic sectional view of a portion of another multilayer optical film with internal patterning, where the internal patterning is accomplished in only one level of the film.

FIG. 4 shows a schematic sectional view of a portion of another multilayer optical film 410 that incorporates internal patterning, where the internal patterning is accomplished in only one level of the film. Film 410 comprises outer optically thick skin layers 412, 414, and a packet of microlayers that reside in a stratum or layer 416 sandwiched between the skin layers. All of the microlayers are internal to the film 410. (In alternative embodiments, one or both skin layers may be omitted, in which case one or both PBLs or outermost microlayers in the packet may become external layers.) The microlayers include at least some microlayers that are birefringent in at least some zones or areas of the film and that extend in a lateral or transverse fashion at least between neighboring zones of the film. The microlayers provide a first reflective characteristic associated with constructive or destructive interference of light at least in a first untreated zone 422 of the film. The film 410 has been selectively heated in the neighboring zones 420, 424, without applying any pressure selectively to these zones, so as to provide a second reflective characteristic also associated with constructive or destructive interference of light, but that differs from the first reflective characteristic. (Note in this context that "first reflective characteristic" and "second reflective characteristic" may be interpreted as pertaining to only the packet of microlayers, or to the entire film.) These differences in reflective characteristics may be manifested to an observer as differences in color between the treated and untreated zones in reflected or transmitted light. The respective colors and the differences therebetween also typically change or shift with angle of incidence. The film 410 may have substantially the same film thickness in the zones 420, 422, 424, or the film thickness may vary somewhat between these zones, but any difference in film thickness between the zones is not primarily responsible for the differences between the first and second reflective characteristics. The zones 420, 422, 424 form a pattern that is internal or interior to the film, as indicated by the crosshatching in the stratum or layer 416. The crosshatching indicates that at least some of the microlayers in the crosshatched region have a reduced birefringence (including zero birefringence) compared to their birefringence in the zone 422 or in other untreated zones.

Figure 4A:
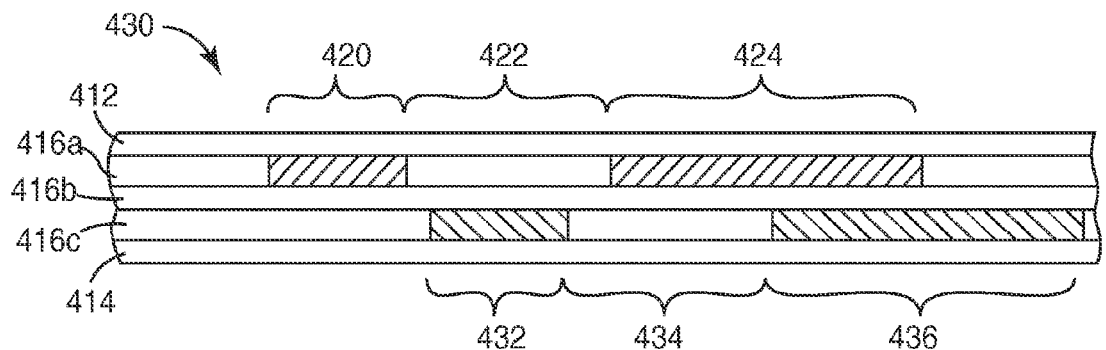
FIG. 4A is a schematic sectional view of a portion of another multilayer optical film with internal patterning, where the internal patterning is accomplished in two levels of the film.

FIG. 4A is a schematic sectional view of a portion of another multilayer optical film 430 with internal patterning, but where the internal patterning is accomplished independently in two levels of the film. Certain components or elements of FIG. 4A have the same reference numerals as in FIG. 4, namely, skin layers 412, 414, and zones 420, 422, and 424, to indicate they are the same as or similar to the corresponding components of FIG. 4, which have already been discussed above and will not be repeated here. Furthermore, the stratum or layer 416 in FIG. 4 is replaced in FIG. 4A with three layers or strata 416 a-c to allow for bi-level patterning. Layer 416a may be identical to layer 416 of FIG. 4, with the same crosshatched regions again indicating reduced birefringence in a packet of microlayers included in layer 416a relative to uncrosshatched areas. The microlayer packet of layer 416a may provide a first reflective characteristic in the uncrosshatched regions, and a different third reflective characteristic in the crosshatched regions. Layer 416c may be similar to layer 416a insofar as it also contains a packet of microlayers, but this packet provides a second reflective characteristic in the uncrosshatched regions of layer 416c (e.g. zone 434) and a fourth reflective characteristic in the crosshatched regions (zones 432, 436). In most applications the second reflective characteristic of layer 416c is preferably different from the first reflective characteristic of layer 416a. For example, the first reflective characteristic may comprise a first reflection band, and the second reflective characteristic may comprise a second reflection band that differs from the first reflection band e.g. by a characteristic wavelength such as the center wavelength, peak wavelength, LBE, RBE, and/or bandwidth. Likewise, the third and fourth reflective characteristics are preferably but not necessarily different from each other.

The microlayer packet of layer 416a preferably has an absorption characteristic that allows it to become absorptively heated, upon exposure to suitably directed light comprising a write wavelength, to an extent that the first reflective characteristic changes to the third reflective characteristic in portions of layer 416a exposed to such light (zones 420, 424). Likewise, the microlayer packet of layer 416c preferably has an absorption characteristic that allows it to become absorptively heated independent of layer 416a, upon exposure to different suitably directed light comprising the write wavelength, to an extent that the second reflective characteristic changes to the fourth reflective characteristic in portions of layer 416c exposed to such different light (zones 432, 436). These absorption characteristics of either or both of layers 416a, 416c may be achieved by incorporating a suitable absorptive agent such as a dye or pigment into constituent layers thereof such as selected microlayers, for example.

The bi-level patterned multilayer optical film 430 also preferably includes a blocking layer 416b disposed between the layers 416a, 416c. The blocking layer 416b blocks a sufficient amount of light at the write wavelength such that a first beam of light comprising the write wavelength can be directed at the zones 420, 424 of the film 430 to change the first reflective characteristic of layer 416a to the third reflective characteristic, while not changing the second reflective characteristic of layer 416c to the fourth reflective characteristic in such zones. The blocking layer 416b may also block a sufficient amount of light at the write wavelength such that a second beam of light comprising the write wavelength can be directed at the zones 432, 436 of the film 430 to change the second reflective characteristic of layer 416c to the fourth reflective characteristic, while not changing the first reflective characteristic of layer 416a to the third reflective characteristic in such zones. The blocking layer may achieve this functionality primarily by absorbing light at the write wavelength, by reflecting light at the write wavelength, or by a combination of absorbing and reflecting. Depending upon the design of the blocking layer and threshold characteristics of the respective writeable layers 416a, 416c, discussed further below, the first and second beams of light may be incident on the same side or major surface of the film 430, or they may be incident on opposite sides. In some designs, the first and second beams of light may also have different angles of incidence with respect to the film. For example, the first beam may be delivered at substantially normal incidence, and the second beam may be delivered at a large oblique angle relative to the film.

Another aspect of the blocking layer 416b that may be significant is the degree to which its in-plane properties are the same or different from each other. Stated another way, the blocking layer may have blocking characteristics that are independent, weakly dependent, or strongly dependent on the polarization state of the incident light. Stated yet another way, the blocking layer may be rotationally symmetric, or it may instead have varying degrees of rotational asymmetry, for rotations about the normal or z-axis. At one extreme, the blocking layer may be substantially rotationally symmetric about the z-axis, such that linearly polarized normally incident light at the write wavelength is blocked the same amount or to the same degree regardless of which in-plane axis of the blocking layer (e.g., the x-axis or the y-axis) the polarized light is aligned with. At another extreme, the blocking layer may be strongly rotationally asymmetric, such that linearly polarized normally incident light at the write wavelength is strongly blocked if aligned with one in-plane axis (e.g. the x-axis), and strongly transmitted if aligned with an orthogonal in-plane axis (e.g. the y-axis). Thus, the blocking layer may be or comprise a reflective polarizer or an absorptive polarizer, for example. In such a case the blocking layer may substantially block (by absorption or reflection) a first beam of light at the write wavelength and substantially transmit a second light beam at the write wavelength, where the first and second light beams may differ only in their polarization states and not in their angles of incidence. Such rotationally asymmetric blocking characteristics may also be limited to a particular reflection band of the electromagnetic spectrum, beyond which the blocking layer substantially transmits and does not block incident light of any polarization. Such reflection band may also shift with incident angle, as discussed elsewhere herein.

Regardless of the details of the blocking layer, at least two microlayer packets in a microlayer optical film can be independently patterned or "written" using a single wavelength or wavelength band, referred to as a write wavelength. The patterns of the respective levels (e.g. zones 420, 424 for the level associated with layer 416a, and zones 432, 436 for the level associated with layer 416c) can be, from the standpoint of an observer or in plan view, for example, completely overlapping, completely non-overlapping, or partially overlapping as desired. The independent patterning can be facilitated by the blocking layer which at least partially blocks the write wavelength. Light of the write wavelength may be delivered by a laser, for example. The blocking layer can be absorbing or reflecting in such a manner that when the multilayer optical film is subjected to laser irradiation on one side of the blocking layer, insufficient optical power is delivered to the other side, and insufficient thermal conduction is likewise allowed, so that the writable packet on the other side remains substantially intact and maintains at least a portion of its initial reflective characteristic. A simple construction of a bi-level writeable multilayer optical film may thus comprise three packets or layers, e.g. a first laser-writable microlayer packet reflecting or transmitting a first color, a second laser-writable microlayer packet reflecting or transmitting a second color, and an intervening blocking layer. A simple embodiment of the method may involve laser writing first on a first side of the film, thus modifying the reflective properties of only the packet on this first side, and then laser writing on the opposite or second side of the film, thus modifying the reflective properties of only the packet on this second side.

The blocking layer may be or comprise a multilayer reflective packet (whether rotationally symmetric or asymmetric) tuned to the laser wavelength (write wavelength) of interest. For example, the blocking layer may be or comprise a microlayer packet having a reflection band at normal incidence that overlaps a laser write wavelength in the infrared (IR) portion of the spectrum. Alternatively, the blocking layer may be or comprise an internal layer that is loaded with an absorbing agent such as a dye or pigment that absorbs at the write wavelength. In this case, the first and/or second laser-writeable microlayer packets may comprise some amount of the same absorbing agent, or some amount of a different absorbing agent.

Although IR wavelengths are often of particular utility to selectively heat the film during radiant processing, visible and ultraviolet (UV) wavelengths are also contemplated for the write wavelength. The blocking layer can thus be tailored for use in these ranges of the spectrum as well.

The blocking layer need not block all incident light at the write wavelength. Rather, the blocking layer, if included, need only block enough of the incident energy to prevent undesired processing or modification of the writeable multilayer packet(s) disposed behind the blocking layer from the standpoint of the incident beam. Typically, each writeable packet has associated therewith a first or lower threshold energy level required to alter the birefringence of its microlayers enough so that the resulting modification to the initial reflective characteristic of the packet is noticeable or detectable, whether in reflected light or transmitted light. This lower threshold energy level is a function of the absorption characteristics of the given writable packet. Likewise, each writeable packet also typically has associated therewith a second or upper threshold energy value at or above which the birefringence of its microlayers is substantially completely removed, i.e., such that those layers become isotropic. For each writeable packet, these lower and upper threshold energy levels can be related to threshold fluences and to the scan rate, e.g. for a laser processing system. For a given scan rate, it is convenient to consider beam intensities or fluences and designate these lower and upper thresholds $I_L$ and $I_U$, respectively.

Figure 4B:
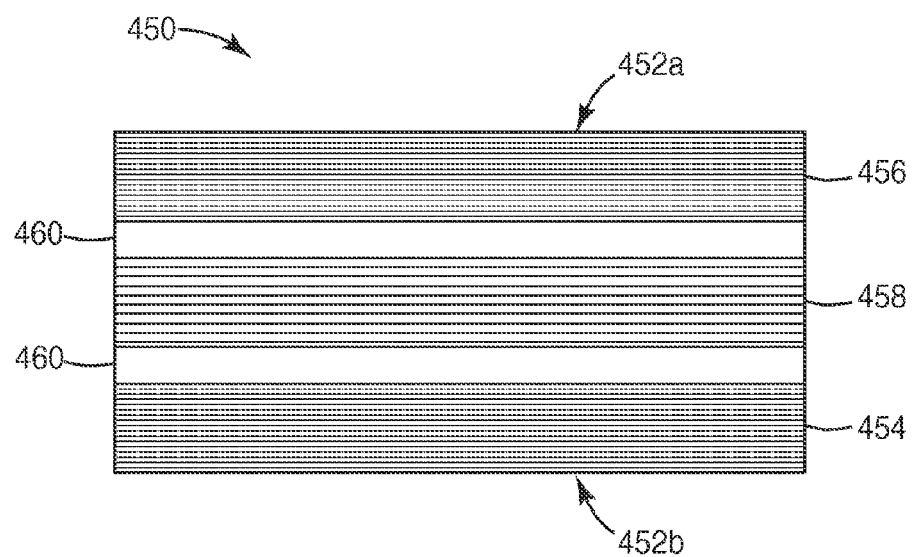
FIG. 4B is a schematic sectional view of a multilayer optical film that has been adapted for bi-level internal patterning.

A further embodiment of a bi-level writeable multilayer optical film 450 is illustrated in FIG. 4B. The film construction includes two outer surfaces, 452a, 452b, at which radiant energy can impinge on the film for patternwise writing of a first reflective microlayer packet 454 and (independently) a second reflective microlayer packet 456. A blocking layer 458 lies between packets 454 and 456. The film 450 may be entirely or partially coextruded, and in the latter case may be formed by lamination of separately formed films. Additional intervening layers and/or layer packets 460 may optionally lie between the writable optical packets 454, 456 and the blocking layer 458. These may include adhesive layers, thermal absorption layers, additional optical packets, or other layers. When radiant energy of the desired writing wavelength impinges on surface 452b, there is a range of power over which the first reflective packet 454 is successfully written, e.g. selected layers in the packet lose a sufficient amount of birefringence to achieve the desired change in optical reflectivity, but over which a sufficient amount of power is rejected, captured, or otherwise blocked by blocking layer 458 so that the second optical packet 456 is not so processed (written). Likewise, when radiant energy of the desired writing wavelength impinges on surface 452a, there is a range of power over which the second reflective packet 456 is successfully written, but over which a sufficient amount of power is rejected, captured, or otherwise blocked by blocking layer 458 so that the first optical packet 454 is not so processed (written).

As further illustration, consider laser light at the write wavelength impinging on surface 452a, and recall that each microlayer packet 454, 456 has associated with it a unique upper and lower threshold energy value $I_U$, $I_L$ as discussed above which is a function of the material properties of the constituent microlayers and the absorption characteristic of the packet. Suppose that the laser light has a fluence or intensity sufficiently higher than $I_U$ for packet 456 so that after passing through packet 456, the partially absorbed beam still has a fluence greater than the $I_U$ for packet 456 when it reaches the blocking layer 458. The blocking layer 458 however then reduces the intensity of the beam via reflection or absorption enough to reduce the fluence of the beam enough so that after it exits layer 458 and reaches the underlying packet 454, the fluence is below the lower threshold value $I_L$ of packet 454. The laser light in this case has successfully written or modified the packet 456 by substantially eliminating the birefringence of at least some of its constituent microlayers, but the laser light has not written or substantially modified the packet 454. In cases where the upper and lower threshold energy values for packet 454 are about the same as those of packet 456, a second beam of laser light similar to the one just described can be employed to selectively write or modify the lower packet 454 without writing or substantially modifying the upper packet 456, simply by directing the second beam so that it impinges on the lower surface 452b rather than the upper surface 452a.

The bi-level writing described herein can be used to obtain interesting color effects. For example, in reference to FIG. 4B, packets 454, 456 may be two optically reflective packets, each reflecting a different portion of the visible spectrum, while the blocking layer 458 may be a third optical packet that reflects a portion of the radiant processing wavelength (write wavelength), which may be in the infrared region or otherwise outside of the visible spectrum. In this case, the film 450 presents a color in reflection which is the combination of the reflection of the two combined visible light reflecting packets 454, 456. In transmission, the color provided is substantially the "spectral complement" of the reflected light: wavelengths that are strongly reflected are weakly transmitted, and wavelengths that are weakly reflected are strongly transmitted. If the first writing operation by the first beam of laser light incident on upper surface 452a causes treated areas or zones of packet 456 to become substantially transmissive over the entire visible range, i.e., substantially colorless, then the remaining color that one perceives in those zones of the film 450 is due to the original reflective characteristic of the still intact packet 454. If processing by the first beam of laser light is omitted and processing occurs via the second beam of laser light incident on the lower surface 452b, and if the second beam causes treated areas or zones of packet 454 to become substantially colorless, then the remaining color that one perceives in the treated zones of the film 450 is due to the original reflective characteristic of the still intact packet 456. If both the first and second writing operations are employed such that packet 456 is treated according to a first in-plane pattern and packet 454 is treated according to a second in-plane pattern, and if the patterns overlap from the perspective of a viewer (e.g. in plan view), then the film 450 becomes clear in the overlapping areas since now both reflective packets 454, 456 have been written or modified to substantially non-reflective states.

In a second case, one packet may be independently processable from one side of the film, but both packets may be processed when irradiating the other side of the film. For example, if one of the packets 454, 456 has a much higher absorptivity than the other at the write wavelength, and if the blocking layer only weakly reflects or absorbs light of the write wavelength, then a light beam at the write wavelength whose power is sufficient to process or modify the packet of lower absorptivity may have sufficient fluence even after passing through the blocking layer to process the higher absorptivity packet. Thus, a first pattern of treated zones can be written or processed in both packets in identical fashion, and a second pattern of treated zones can be independently written or processed only in the packet of higher absorptivity using a second beam of lower fluence incident from the other side of the film. In the resulting bi-level internally patterned multilayer optical film, the packet of higher absorptivity is patterned according to the union or combination of the first and second patterns, while the packet of lower absorptivity is patterned only according to the first pattern.

In the second case just described, the blocking layer 458 may be or comprise a band shifting reflector, e.g. a reflective mirror or polarizer as formed by a multilayer optical film with an interference stack (i.e., a packet of microlayers). For example, if an IR laser is used to deliver the radiant energy, the blocking layer may be an IR reflecting microlayer packet tuned so that its reflection band at normal incidence is centered at, or at least overlaps, the IR write wavelength of the laser. A first writable packet, e.g. packet 456, has a lower absorption at the write wavelength than a second one of the packets, e.g. packet 454, either due to a lower concentration of IR absorber, or a lower intrinsic absorption, or a combination of both. In this manner, the upper and lower threshold values $I_U$, $I_L$ of the first writable packet, referred to as $I_{U,1}$ and $I_{L,1}$ respectively, are higher than the corresponding thresholds of the second writable packet, referred to as $I_{U,2}$ and $I_{L,2}$ respectively, i.e. $I_{U,1} > I_{U,2}$ and $I_{L,1} > I_{L,2}$. When fully independent manipulation or patterning is desired, then in particular the film is designed so that the lower threshold of one packet is greater than the upper threshold of the other packet, i.e., $I_{L,1} > I_{U,2}$. The first writable packet then may be selectively processed at a higher fluence with a first beam normally incident on surface 452*a* (without processing the underlying second packet), and the second writable packet may be selectively processed at a lower fluence with a second beam incident obliquely on the same surface 452*a* (without processing the upper first packet). (In some cases, both packets can be processed at oblique angles, but then the second packet may be processed at a higher angle than the first.) In particular, the second packet may be processed at an oblique angle high enough so that the reflection band of the blocking layer 458 has shifted (relative to normal incidence) so that it no longer substantially overlaps the write wavelength. In this manner, the oblique beam can arrive at the underlying second packet 454 with sufficient power to create the desired reduction in birefringence, and hence patterning, of the second packet 454 without substantially reducing the birefringence of the upper first packet 456. Alternatively, if the blocking layer 458 is or comprises a reflective or absorptive polarizer, the first packet 456 may be selectively processed using a first normally incident beam of high fluence incident on the surface 452*a*, which first beam is linearly polarized along the block axis (e.g. x-axis) of the blocking layer so as to prevent the underlying second packet from being processed. In that case the second writable packet may be selectively processed at a lower fluence with a second beam that is also normally incident on surface 452*a*, but where the second beam is linearly polarized along the pass axis (e.g. y-axis) of the blocking layer. Due to the action of the blocking layer, the second beam of lower (initial) fluence actually possesses greater fluence within the second writable packet than the first beam of higher (initial) fluence, such that the second beam heats the second writable packet sufficiently to reduce its birefringence but the first beam does not.

In alternative embodiments to those of FIGS. 4A and 4B, the bi-level writable multilayer optical film may comprise not only two independently writable optical packets, but three or more. Such embodiments are still referred to as bi-level writable multilayer optical films, since they include at least two independently writable packets. A separate blocking layer may be provided between each pair of adjacent or otherwise neighboring writable packets. For example, in reference to FIG. 4A, another writable stratum or layer similar to layer 416*c*, and another blocking layer similar to blocking layer 416*b*, may be included between layer 416*c* and skin layer 414 or between layer 416*a* and skin layer 412. In reference to FIG. 4B, another writable packet similar to first reflective microlayer packet 454 and another blocking layer similar to blocking layer 458 may be added beneath packet 454 or above packet 456. The various writable packets and blocking layers are tailored so that the packets can be individually written or processed (i.e., selectively heated to reduce birefringence of individual microlayers thereof) with directed light beams that differ from each other in fluence, angle of incidence, side of incidence (i.e., whether the beam is incident from a top side or a bottom side of the film), and/or polarization, for example. Conveniently for manufacturing purposes, some combinations of writeable packets and blocking layers, discussed more fully below, allow at least three writeable packets to be individually processed by three different directed light beams all of which are incident from the same side of the film and all of which comprise the same write wavelength.

Further discussion of angle-dependent and/or polarization-dependent writing or processing of multilayer optical films is provided below in connection with FIGS. 7, 7A, and 7B. First, however, we describe some specific examples of writeable optical packets whose reflective characteristics can be modified in a patternwise fashion using selective absorptive heating delivered by any suitable directed beam. The various types of writeable optical packets described can be combined as desired in a wide variety of combinations, along with suitable blocking layers one of which is preferably provided between each pair of adjacent or neighboring writeable packets, to produce a wide variety of bi-level multilayer optical film constructions.

We thus turn our attention to the idealized graphs of FIGS. 5A-D. These graphs help to explain the process of patterning the multilayer optical films, and the process of patterning selected microlayer packets thereof in connection with bi-level patterning. They also help explain some of the different possible combinations of first and second reflective characteristics in the untreated and treated zones, respectively, for any given writeable packet of microlayers, and how the combinations are achieved. For descriptive purposes, the reflective characteristics of both the untreated and treated zones of an optical film may be categorized into one of following three types: mirror-like reflective characteristics, window-like reflective characteristics, and polarizer-like reflective characteristics. A mirror-like reflective characteristic exhibits high reflectivity (e.g., in some cases greater than 50%, 60%, 70%, 80%, 90%, 95%, or 99%) for all polarization states of normally incident light, a window-like reflective characteristic exhibits low reflectivity (e.g., in some cases less than 20%, 10%, 5%, 3%, or 1%) for all polarization states of normally incident light, and a polarizer-like reflective characteristic exhibits high reflectivity (e.g., in some cases greater than 50%, 60%, 70%, 80%, 90%, 95%, or 99%) for normally incident light of one polarization state and low reflectivity (e.g., in some cases less than 30%, 20%, 10%, 5%, 3%, or 1%) for normally incident light of a different polarization state. (The reflective polarizer-like characteristic may alternatively be expressed in terms of the difference in reflectivity of one polarization state relative to the other polarization state.) The reader will keep in mind that reflectivity values discussed herein that are associated with multilayer optical films or stacks should be considered to not include the Fresnel reflections at the outer air/polymer interfaces, unless otherwise indicated.

The boundaries or limits of these different characteristics—e.g., what is considered to be "high" reflectivity and what is considered to be "low" reflectivity—and the distinctions therebetween may depend on the end-use application and/or on system requirements. For example, a multilayer optical film, or a microlayer packet thereof, that exhibits moderate levels of reflectivity for all polarization states may be considered to be a mirror for purposes of some applications and a window for purposes of other applications. Similarly, a multilayer optical film, or a microlayer packet thereof, that provides moderately different levels of reflectivity for different polarization states of normally incident light may be considered to be a polarizer for some applications, a mirror for other applications, and a window for still other applications, depending on the exact reflectivity values and on the sensitivity of a given end-use application to differences in reflectivity for different polarization states. Unless otherwise indicated, the mirror, window, and polarizer categories are specified for normally incident light. The reader will understand that oblique-angle characteristics may in some cases be the same as or similar to, and in other cases may be drastically different from, the characteristics of an optical film at normal incidence.

In each of the graphs of FIGS. 5A-D, relative refractive index "n" is plotted on the vertical axis. On the horizontal axis, a position or mark is provided for each of the six refractive indices that characterize a two-layer optical repeat unit: "$1x$", "$1y$", and "$1z$" represent the refractive indices of the first layer along the x-, y-, and z-axes, which were referred to above as $n1x$, $n1y$, and $n1z$. Likewise, "$2x$", "$2y$", and "$2z$" represent the refractive indices of the second layer along the x-, y-, and z-axes, which were referred to above as $n2x$, $n2y$, and $n2z$. Diamond-shaped symbols (◇) in the figures represent refractive indices of the materials in a first processing stage. This first stage may correspond to polymer layers that have been extruded and quenched or cast onto a casting wheel, for example, but that have not yet been stretched or otherwise oriented. Open (unfilled) circle-shaped symbols (○) in the figures represent refractive indices of materials in a second stage of processing, later than the first stage. The second stage may correspond to polymer layers that have been stretched or otherwise oriented into a multilayer optical film that reflects light by constructive or destructive interference from interfaces between microlayers within the film. Small filled circle-shaped symbols or dots (●) in the figures represent refractive indices of the materials in a third stage of processing, later than the first and second stages. The third stage may correspond to polymer layers that, after being extruded and oriented, have been selectively heat treated, as discussed further below. Such heat treatment is typically limited to one or more particular portions or zones of a film, referred to as treated zones.

By comparing the vertical coordinates of the various symbols in a given figure, the reader can readily ascertain a great deal of information about the optical film, its method of manufacture, and the optical properties of its treated and untreated portions. For example, the reader can ascertain: if one or both material layers are or were birefringent before or after the selective heat treatment, and whether the birefringence is uniaxial or biaxial, and whether the birefringence is large or small. The reader can also ascertain from FIGS. 5A-D relative magnitudes of each of the refractive index differences $\Delta nx$, $\Delta ny$, $\Delta nz$ between the two layers, for each of the three processing stages (cast state, stretched state, and treated state).

As discussed above, a precursor article to the finished, internally patterned multilayer optical film can be a cast web of polymer material. The cast web may have the same number of layers as the finished film, and the layers may be composed of the same polymer materials as those used in the finished film, but the cast web is thicker and its layers are usually all isotropic. In some cases, however, not depicted in the figures, the casting process may itself impart a level of orientation and birefringence in one or more of the materials. The diamond-shaped symbols in FIGS. 5A-D represent the refractive indices of the two polymer layers in the cast web that, after a subsequent stretching procedure, become the microlayers in the optical repeat units of the multilayer optical film. After stretching, at least some of the layers become oriented and birefringent, and an oriented (but still unpatterned) multilayer optical film is formed. This is exemplified in FIGS. 5A-D by open circles that may be vertically displaced from their respective original values represented by the diamond-shaped symbols. For example, in FIG. 5A, the stretching procedure raises the refractive index of the second layer along the x-axis, but lowers its refractive index along the y- and z-axis. Such a refractive index shift may be obtained by suitably uniaxially stretching a positively birefringent polymer layer along the x-axis while allowing the film to dimensionally relax along the y- and z-axes. In FIG. 5B, the stretching procedure raises the refractive index of the first layer along the x- and y-axes, but lowers its refractive index along the z-axis. Such a refractive index shift may be obtained by suitably biaxially stretching a positively birefringent polymer layer along the x- and y-axes. In FIG. 5C, the stretching procedure raises the refractive index of both the first and second layers along the x-axis, lowers their respective refractive index along the z-axis, and maintains about the same refractive index along the y-axis. In some cases, this refractive index shift may be obtained by biaxially stretching a positively birefringent polymer layer asymmetrically along the x- and y-axes, using a higher degree of stretch along the x-axis compared to the y-axis. In other cases, this may be approximately obtained by uniaxially stretching along an x-axis while constraining the film in the y-axis (constrained uniaxial stretching). Note that in FIGS. 5A and 5B, the one of the layers in the oriented but untreated state (open circles) is birefringent because at least two of the open circles (for $n2x$, $n2y$, and $n2z$ in FIG. 5A, and for $n1x$, $n1y$, and $n1z$ in FIG. 5B) have different values of refractive index n. In these depicted embodiments, the other polymer layer remains isotropic after stretching as indicated by the same refractive index values ($n1x=n1y=n1z$ in FIG. 5A, and $n2x=n2y=n2z$ in FIG. 5B) for the cast state and for the oriented but untreated state.

After formation of the at least partially birefringent multilayer optical film having the microlayers arranged into optical repeat units to provide the first reflective characteristic, the film is ready for the selective heating discussed above. The heating is carried out selectively in a second zone which neighbors a first zone of the multilayer optical film, and is tailored to selectively melt and disorient in part or in whole at least one birefringent material in the microlayer packet in order to reduce or eliminate the birefringence in at least some of the microlayers while leaving their birefringence unchanged in the first (untreated) zone. The selective heating is also carried out to maintain the structural integrity of the layers in the second zone. If the birefringent material in the treated second zone is disoriented in whole, i.e., completely, then the birefringent microlayers return to the isotropic state (e.g. of the cast web), while remaining optically thin. This can be seen in FIGS. 5A and 5B, where heat treatment causes the refractive indices of the first layer (FIG. 5B) or second layer (FIG. 5A) (see the small dark dots) to revert to their values in the cast web state (see the diamond-shaped symbols). Recall that the diamond-shaped symbols represent the refractive indices of layers in the isotropic state (e.g., the cast web), the small dark dots represent the refractive indices of microlayers in the treated or selectively heated zones in the finished, internally patterned film, and the open circles represent the refractive indices of microlayers in untreated zones of the finished, internally patterned film.

If the birefringent material in the treated second zone is disoriented only in part, i.e., incompletely, then the birefringent microlayers relax to a state of birefringence that is less than the birefringent state before heating but is not isotropic. In this case, the refractive indices of the birefringent material in the treated second zone acquire values somewhere between the diamond-shaped symbols and the open circles shown in FIGS. 5A-D. Some examples of such incomplete birefringent relaxation are explained in more detail in commonly assigned International Application No. PCT/US2009/069160, "Internally Patterned Multilayer Optical Films With Multiple Birefringent Layers", incorporated herein by reference.

Figure 5A:
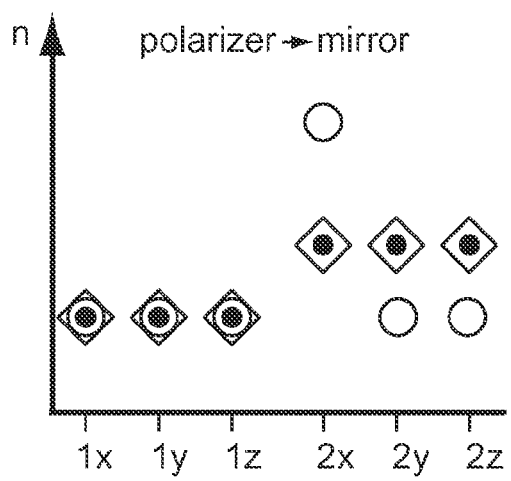
FIGS. 5A-D are idealized plots showing each refractive index (nx, ny, nz) of each layer of a 2-layer optical repeat unit, for different stages of manufacture of four different internally patterned multilayer optical films.
Figure 5B:
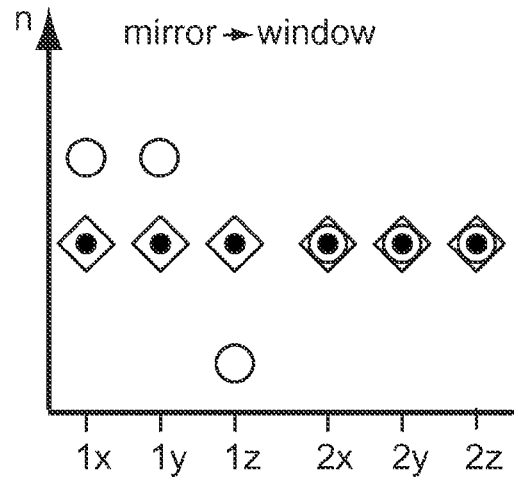
Figure 5C:
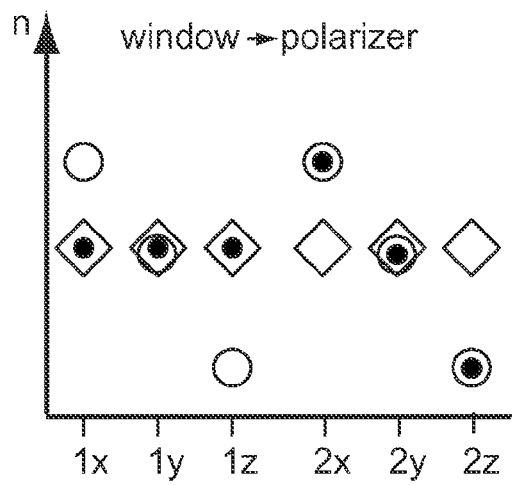

In FIG. 5A, a first polymer material is selected that has a relatively low refractive index, and a second polymer material is selected that has a higher refractive index and that has a positive stress-optic coefficient. The materials are coextruded in an alternating layer arrangement with a suitable number of layers to form a multilayer cast web, having indices shown by the diamond-shaped symbols. The cast web is then uniaxially stretched along the x-axis under suitable conditions to induce birefringence in the second polymer material while the first polymer material remains isotropic. The refractive index value n2x increases further to form a large index difference $\Delta nx$ with n1x. The refractive index values n2y and n2z decrease to form small index differences $\Delta ny$ and $\Delta nz$ with n1y and n1z respectively. The values $\Delta ny$ and $\Delta nz$ may be zero, for example. This set of refractive indices, when implemented in a microlayer packet with an adequate number of layers, can provide a reflective polarizer with the x-axis being a block axis and the y-axis being a pass axis. The reflective polarizer may be broad band or narrow band, depending on the layer thickness distribution of the microlayers.

This reflective polarizing film can then be internally patterned in a second zone as described above, while leaving the reflective polarizing film intact in a first zone. Selective heating by selective delivery of radiant energy to the second zone causes the birefringent layers to relax to their original isotropic states, or to an intermediate birefringent state if the disorientation is incomplete. If relaxation is complete, the second zone can become a mirror-like film (if the microlayer packet has an adequate number of layers) with $\Delta nx \approx \Delta ny \approx \Delta nz$. The finished film thus combines in a unitary film a reflective polarizer in one zone and a mirror-like film in a neighboring zone, with microlayers that extend continuously from one zone to the next. Such films are described more fully in copending and commonly assigned U.S. Application Ser. No. 61/158,006, "Multilayer Optical Films Having Side-by-Side Mirror/Polarizer Zones", filed on even date herewith. For FIG. 5A, the selective heat treatment process is able to change a multilayer reflective polarizer film to a multilayer reflective mirror film, i.e.: polarizer→mirror.

In FIG. 5B, first and second polymer materials are selected that have substantially the same refractive index, but where the first polymer material has a positive stress-optic coefficient. The materials are coextruded in an alternating layer arrangement with a suitable number of layers to form a multilayer cast web, having indices shown by the diamond-shaped symbols. The cast web is then biaxially stretched along the x- and y-axes under suitable conditions to induce birefringence in the first polymer material while the second polymer material remains isotropic. The refractive index values n1x, n1y increase to form substantial refractive index differences $\Delta nx$, $\Delta ny$ with n2x, n2y respectively. The refractive index value n1z decreases to form a substantial refractive index difference $\Delta nz$ with n2z that is opposite in polarity or sign to $\Delta nx$ and $\Delta ny$. This set of refractive indices, when implemented in a microlayer packet with an adequate number of layers, can provide a mirror-like film. The reflection provided by the film may be broad band or narrow band, depending on the layer thickness distribution of the microlayers.

This mirror-like film can then be internally patterned in a second zone as described above, while leaving the mirror-like film intact in a first zone. Selective heating by selective delivery of radiant energy to the second zone causes the birefringent layers to relax to their original isotropic states, or to an intermediate birefringent state if the disorientation is incomplete. If relaxation is complete, the second zone becomes a window-like film with $\Delta nx \approx \Delta ny \approx \Delta nz \approx 0$. The finished film thus combines in a unitary film a mirror-like reflector in one zone and a substantial window in a neighboring zone, with microlayers that extend continuously from one zone to the next. For this FIG. 5B, the selective heat treatment process is able to change a multilayer reflective mirror film to a multilayer window film (mirror→window).

In both FIGS. 5A and 5B, one of the optical materials remains isotropic after stretching (and after the selective heat treatment). This, however, need not be the case in general, and many interesting and useful multilayer optical film designs that can be converted into internally patterned optical films using the selective heat treatment techniques disclosed herein comprise two different optical materials for the constituent layers of the optical repeat unit, and both (rather than only one) of these constituent material layers become birefringent when the cast web is stretched or otherwise oriented. Such multilayer optical films are referred to herein as "doubly birefringent" optical films, since optical repeat units in such a film each include at least two constituent microlayers that are birefringent after stretching. When such a doubly birefringent multilayer optical film is exposed to the selective heat treatment, a number of different responses are possible in the treated zone depending on the material properties and the heating conditions: both material layers may completely relax to become isotropic, or one material layer may relax completely or partially while the other material layer maintains its birefringence, or both material layers may relax by different amounts (e.g., one material layer may relax completely to become isotropic, while the other material relaxes partially so as to maintain only a portion of its birefringence), for example. In any case, the change in birefringence of one or both material layers results in a reflective characteristic in the second (treated) zone of the optical film that differs substantially from a reflective characteristic in the first (untreated) zone of the film. Further details of doubly birefringent multilayer optical films, and selective heating techniques used to internally pattern them, are provided in the following commonly assigned international applications, which are filed on even date herewith and incorporated herein by reference: PCT/US2009/069160, "Internally Patterned Multilayer Optical Films With Multiple Birefringent Layers"; and International Application No. PCT/US2009/069192, "Multilayer Optical Films Having Side-by-Side Polarizer/Polarizer Zones". Some examples of doubly birefringent multilayer optical films suitable for internal patterning by selective heat treatment are shown in the present application in FIGS. 5C and 5D.

In FIG. 5C, first and second polymer materials are selected that have the same or similar isotropic refractive indices, and that have the same or similar stress-optic coefficients (shown as positive in FIG. 5C although negative coefficients may also be used), and that have different melting or softening temperatures. The materials are coextruded in an alternating layer arrangement with a suitable number of layers to form a multilayer cast web, having indices shown by the diamond-shaped symbols. Rather than being biaxially drawn, the cast web of FIG. 5C is then uniaxially stretched along the x-axis under suitable conditions to induce birefringence in both the first and second polymer materials. The stretching causes the refractive index values n1x and n2x to increase by similar amounts, while causing n1z and n2z to decrease by similar amounts, and while causing n1y and n2y to remain relatively constant. This results in refractive indices of the two material layers that are substantially matched along all three principal directions ($\Delta nx \approx 0$, $\Delta ny \approx 0$, and $\Delta nz \approx 0$), even though each material layer is strongly biaxially birefringent. This set of refractive indices, when implemented in a microlayer packet with an adequate number of layers, can provide a multilayer window-like film that has little or no reflectivity for normally incident and obliquely incident light.

This multilayer window film can then be internally patterned in a second zone as described above, while leaving the window film intact in a first zone. Selective heating by selective delivery of radiant energy to the second zone causes at least some of the birefringent layers to relax, becoming less birefringent. In the case of FIG. 5C, the heating is again carefully controlled to a temperature that is above the melting or softening point of the first material layers, but below the melting or softening point of the second material layers. In this way, the selective heating causes the first birefringent layers in the second zone to relax to their original isotropic states, or to an intermediate birefringent state if the disorientation is incomplete, while causing the second birefringent layers in the second zone to substantially maintain their birefringence. If relaxation of the first material is complete, the second zone is characterized by a relatively large refractive index difference ($\Delta nx$) in one in-plane direction, a zero or near-zero refractive index difference ($\Delta ny$) in the other in-plane direction, and a relatively large out-of-plane refractive index difference ($\Delta nz$) of opposite polarity or sign compared to $\Delta nx$. These refractive index relationships, when implemented in a microlayer packet with an adequate number of layers, can provide a reflective polarizer film in the second zone. This polarizer film has a pass axis parallel to the y-direction and a block axis parallel to the x-direction. The reflection provided by this film for block-state polarized light may be broad band or narrow band, depending on the layer thickness distribution of the microlayers. In either case, the reflectivity of the polarizer film for block-state polarized light (for both the s-polarized component and the p-polarized component) increases with increasing incidence angle due to the opposite polarity of $\Delta nz$. The finished film thus combines in a unitary film a multilayer window film in one zone and a reflective polarizer film in a neighboring zone, with microlayers that extend continuously from one zone to the next. For this FIG. 5C, the selective heat treatment process is able to change a multilayer window film to a multilayer reflective polarizer film (window→polarizer).

Figure 5D:
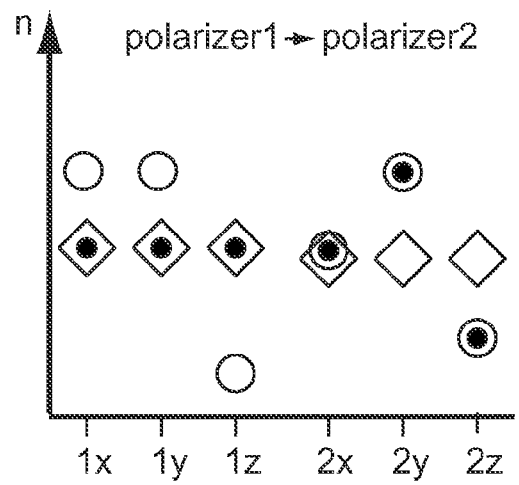

The embodiment of FIG. 5D makes use of a two-step drawing process that is described in U.S. Pat. No. 6,179,948 (Merrill et al.). In this process, the stretching or orientation of the cast film is carried out using a two-step drawing process that is carefully controlled so that one set of layers (e.g., the first material layer of each optical repeat unit) substantially orients during both drawing steps, while the other set of layers (e.g., the second material layer of each optical repeat unit) only substantially orients during one drawing step. The result is a multilayer optical film having one set of material layers that are substantially biaxially oriented after drawing, and having another set of material layers that are substantially uniaxially oriented after drawing. The differentiation is accomplished by leveraging the different visco-elastic and crystallization characteristics of the two materials by using one or more suitably different process conditions such as temperature, strain rate, and strain extent for the two process drawing steps. Thus, for example, a first drawing step may substantially orient the first material along a first direction while at most only slightly orienting the second material along this direction. After the first drawing step, one or more process conditions are suitable changed such that in a second drawing step, both the first and the second materials are substantially oriented along a second direction. Through this method, the first material layers can assume an essentially biaxially-oriented character (for example, the refractive indices may satisfy the relationship $n1x \approx n1y \neq n1z$, sometimes referred to as a uniaxially birefringent material), while the second material layers in the very same multilayer film can assume an essentially uniaxially-oriented character (for example, the refractive indices may satisfy the relationship $n2x \neq n2y \neq n2z \neq n2x$, sometimes referred to as a biaxially birefringent material).

With this background, FIG. 5D depicts an embodiment in which the first and second polymer materials are selected to have the same or similar isotropic refractive indices, and to both become birefringent after drawing, and to have the same polarity of stress-optic coefficient (in the drawing they are both depicted as positive, but they can instead both be negative). The first and second materials have different melting or softening temperatures, and have different visco-elastic and/or crystallization characteristics such that the two-step drawing process discussed above can be implemented. The materials are coextruded in an alternating layer arrangement with a suitable number of layers to form a multilayer cast web, having indices shown by the diamond-shaped symbols. The cast web is then biaxially stretched along the x- and y-axes using the above-described two-step drawing process, such that the first material is oriented comparably along both the x- and y-axes, whereas the second material is oriented preferentially along the y-axis, with lesser orientation (including in some cases no orientation) along the x-axis. The net result is a multilayer optical film whose first and second microlayers are both birefringent, but the first material layers have a substantially biaxially-oriented character, whereas the second material layers have an asymmetric biaxially-oriented character, or even a substantially uniaxially-oriented character. As shown, the materials and process conditions are selected so that the stretching causes the refractive index values $n1x$ and $n1y$ to increase by similar amounts, while causing $n1z$ to decrease by a larger amount. The stretching also causes the refractive index value $n2y$ to increase to a value equal to or close to that of $n1x$ and $n1y$, and causes the refractive index $n2z$ to decrease, and causes the refractive index $n2x$ to remain about the same (if the second material orients to a small degree during the x-axis orientation step, then $n2x$ may increase slightly as shown in the figure). This results in refractive indices of the two material layers that have one large in-plane refractive index mismatch ($\Delta nx$), one significantly smaller in-plane refractive index mismatch ($\Delta ny \approx 0$), and an intermediate out-of-plane refractive index mismatch ($\Delta nz$) of opposite polarity from $\Delta nx$. When the second material orients more biaxially, index matching in the x-direction after treatment may be achieved by pairing with a first material whose isotropic index is higher than the second. This set of refractive indices, when implemented in a microlayer packet with an adequate number of layers, can provide a first reflective polarizing film with a block axis along the x-direction and a pass axis along the y-direction. The reflection provided by the film (for light polarized parallel to the block axis) may be broad band or narrow band, depending on the layer thickness distribution of the microlayers.

This first multilayer reflective polarizer film can then be internally patterned in a second zone as described above, while leaving the polarizer film intact in a first zone. Selective heating by selective delivery of radiant energy to the second zone causes at least some of the birefringent layers to relax, becoming less birefringent. In the present case, the heating is carefully controlled to a temperature that is above the melting or softening point of the first material layers, but below the melting or softening point of the second material layers. In this way, the selective heating causes the first birefringent layers in the second zone to relax to their original isotropic states, or to an intermediate birefringent state if the disorientation is incomplete, while causing the second birefringent layers in the second zone to substantially maintain their birefringence. If relaxation of the first material is complete, the second zone is characterized by a relatively large refractive index difference ($\Delta ny$) in one in-plane direction, a zero or near-zero refractive index difference ($\Delta nx$) in the other in-plane direction, and a relatively large out-of-plane refractive index difference ($\Delta nz$) of opposite polarity or sign compared to $\Delta ny$. These refractive index relationships, when implemented in a microlayer packet with an adequate number of layers, can provide a second reflective polarizer film in the second zone. Notably, this second polarizer has a pass axis parallel to the x-direction and a block axis parallel to the y-direction, i.e., it is perpendicularly oriented relative to the first reflective polarizer. The reflection provided by this second polarizer film for block-state polarized light will be broad band or narrow band, depending on the layer thickness distribution of the microlayers, to the same extent that the first reflective polarizer is broad band or narrow band for the orthogonal polarization state. In any case, the reflectivity of the second polarizer film for block-state polarized light (for both the s-polarized component and the p-polarized component) increases with increasing incidence angle due to the opposite polarity of $\Delta nz$ in the second zone. The finished film thus combines in a unitary film a first reflective polarizer film in one zone and a second reflective polarizer film in a neighboring zone, the second reflective polarizer film being oriented perpendicular to the first reflective polarizer film, with microlayers that extend continuously from one zone to the next. For this FIG. 5D, the selective heat treatment process is able to change a first multilayer reflective polarizer film to a second multilayer reflective polarizer film (polarizer1→polarizer2).

The scenarios discussed above involve only some of a multitude of possible combinations of reflector types for the first zone, reflector types for the second zone, material characteristics, and processing parameters that can be used to produce other internally patterned multilayer optical films, and should not be considered to be limiting. Note that not just positively birefringent but also negatively birefringent materials, and combinations thereof, can be used. Note also that in cases where the combination of a birefringent and isotropic polymer is used, the birefringent polymer may have a pre-stretch isotropic index that is less than, greater than, or equal to the refractive index of the isotropic polymer. Discussion of other possible combinations of reflector types for the first and second zones of internally patterned multilayer optical films, which various combinations can be utilized in bi-level writeable multilayer optical films as disclosed herein, can be found in one or more of the following commonly assigned applications being filed on even date herewith: International Application No. PCT/US2009/069153, "Internally Patterned Multilayer Optical Films Using Spatially Selective Birefringence Reduction"; International Application No. PCT/US2009/069120, "Multilayer Optical Films Having Side-by-Side Mirror/Polarizer Zones"; International Application No. PCT/US2009/069160, "Internally Patterned Multilayer Optical Films With Multiple Birefringent Layers"; and International Application No. PCT/US2009/069192, "Multilayer Optical Films Having Side-by-Side Polarizer/Polarizer Zones".

Figure 6:
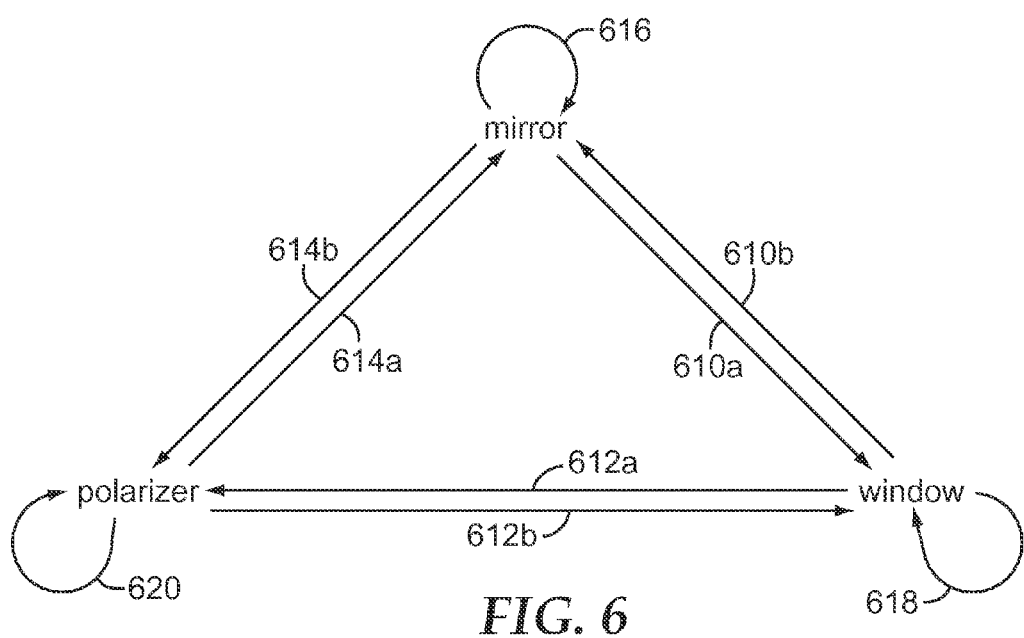
FIG. 6 is a schematic diagram that summarizes various transformations that can be achieved using the techniques discussed herein for multilayer optical films.

FIG. 6 is a schematic diagram that summarizes various transformations that can be achieved using the birefringent-relaxation techniques discussed herein for multilayer optical films. As such, the diagram also summarizes a variety of combinations of reflector types for the first (untreated) zone and the second (heat treated) zone of an internally patterned multilayer optical film, which in turn may form part of a bi-level writeable multilayer optical film. The arrows in the figure represent transformations from a first reflective characteristic to a second reflective characteristic that differs substantially from the first reflective characteristic. Note that the diagram of FIG. 6 is provided for illustrative purposes and should not be construed as limiting.

Arrow 610*a* represents a transformation from a multilayer mirror film to a multilayer window film, e.g., as described in connection with FIG. 5B. Such a transformation can be used to provide an internally patterned multilayer optical film with one or more first (untreated) zones characterized by a mirror film and one or more second (treated) zones characterized by a window film. Arrow 610*b* represents an opposite transformation, from a multilayer window film to a multilayer mirror film. Such a transformation can be used to provide an internally patterned multilayer optical film with one or more first (untreated) zones characterized by a window film and one or more second (treated) zones characterized by a mirror film.

Arrow 612*a* represents a transformation from a multilayer window film to a multilayer polarizer film, e.g., as described in connection with FIG. 5C. Such a transformation can be used to provide an internally patterned multilayer optical film with one or more first (untreated) zones characterized by a window film and one or more second (treated) zones characterized by a polarizer film. Arrow 612*b* represents an opposite transformation, from a multilayer polarizer film to a multilayer window film. Such a transformation can be used to provide an internally patterned multilayer optical film with one or more first (untreated) zones characterized by a polarizer film and one or more second (treated) zones characterized by a window film.

Arrow 614*a* represents a transformation from a multilayer polarizer film to a multilayer mirror film, e.g., as described in connection with FIG. 5A. Such a transformation can be used to provide an internally patterned multilayer optical film with one or more first (untreated) zones characterized by a polarizer film and one or more second (treated) zones characterized by a mirror film. Arrow 614*b* represents an opposite transformation, from a multilayer mirror film to a multilayer polarizer film. Such a transformation can be used to provide an internally patterned multilayer optical film with one or more first (untreated) zones characterized by a polarizer film and one or more second (treated) zones characterized by a window film.

Arrows 616, 618, and 620 represent transformations from one type of mirror to another type of mirror, from one type of window to another type of window, and from one type of polarizer to another type of polarizer (see e.g. FIG. 5D). The reader is again reminded that the diagram of FIG. 6 is provided for illustrative purposes and should not be construed in a limiting fashion.

Figure 7:
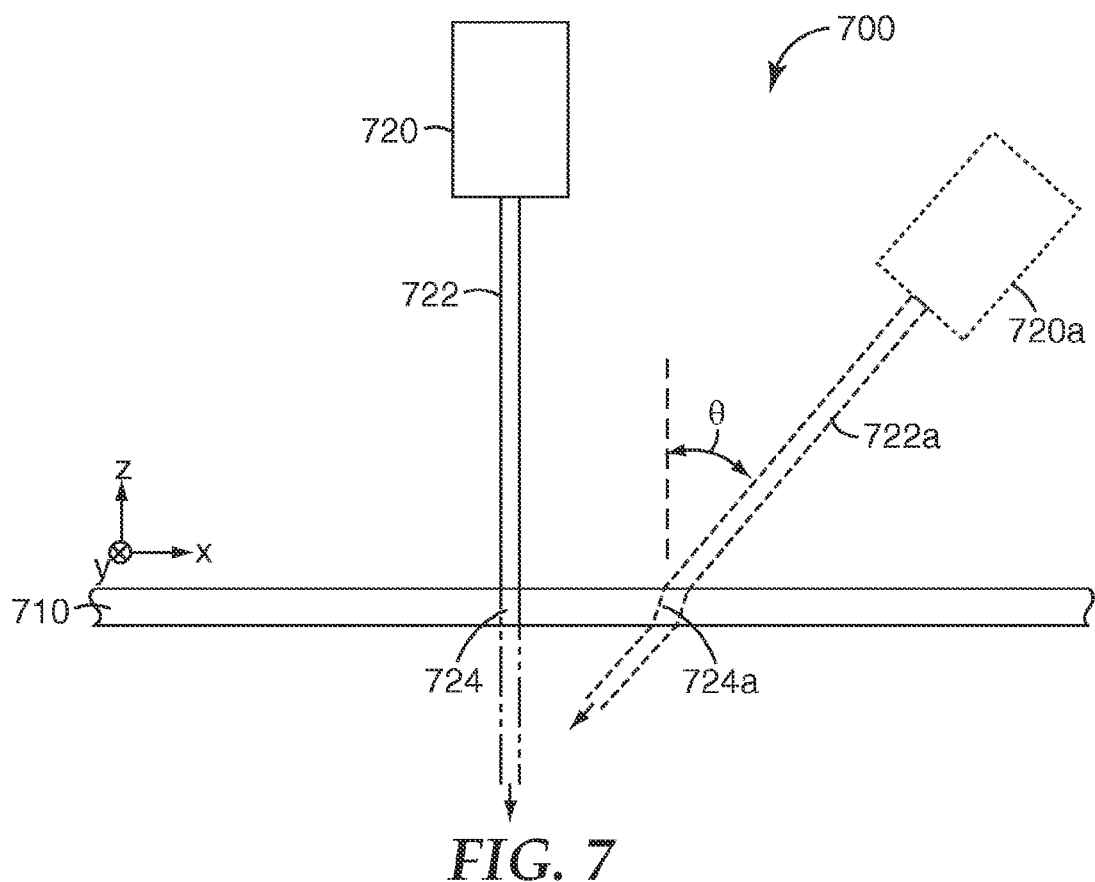
FIG. 7 is a schematic side view of an arrangement for selectively heating a multilayer optical film to accomplish internal patterning.

In FIG. 7, we show one arrangement 700 that can be used to selectively heat the second zone of the multilayer optical films to provide the disclosed internally patterned films. Briefly, a multilayer optical film 710 is provided that comprises at least one microlayer packet that extends throughout the film, or at least from a first to a second zone thereof. The microlayers are internal to the film and provide the film with a first reflective characteristic. A high radiance light source 720 provides a directed beam 722 of suitable wavelength, intensity, and beam size to selectively heat an illuminated portion 724 of the film by converting some of the incident light to heat by absorption. Preferably, the absorption of the film is great enough to provide sufficient heating with a reasonably-powered light source, but not so high that an excessive amount of light is absorbed at the initial surface of the film, which may cause surface damage. This is discussed further below. In some cases it may be desirable to orient the light source at an oblique angle θ, as shown by the obliquely positioned light source 720a, directed beam 722a, and illuminated portion 724a. Such oblique illumination may be desirable where the multilayer optical film 710 contains a microlayer packet having a reflection band at normal incidence that substantially reflects the directed beam 722 in a way that prevents the desired amount of absorption and concomitant heating. Thus, taking advantage of the shift of the reflection band to shorter wavelengths with increasing incidence angle, the directed beam 722a can be delivered at an oblique angle θ that avoids the (now shifted) reflection band to allow the desired absorption and heating.

In some cases, the directed beam 722 or 722a may be shaped in such a way that the illuminated portion 724 or 724a has the desired shape of the finished second zone. In other cases, the directed beam may have a shape that is smaller in size than the desired second zone. In the latter situation, beam steering equipment can be used to scan the directed beam over the surface of the multilayer optical film so as to trace out the desired shape of the zone to be treated. Spatial and temporal modulation of the directed beam can also be utilized with devices such as beam splitters, lens arrays, pockels cells, acousto-optic modulators, and other techniques and devices known to those of ordinary skill in the art.

Figure 7A:
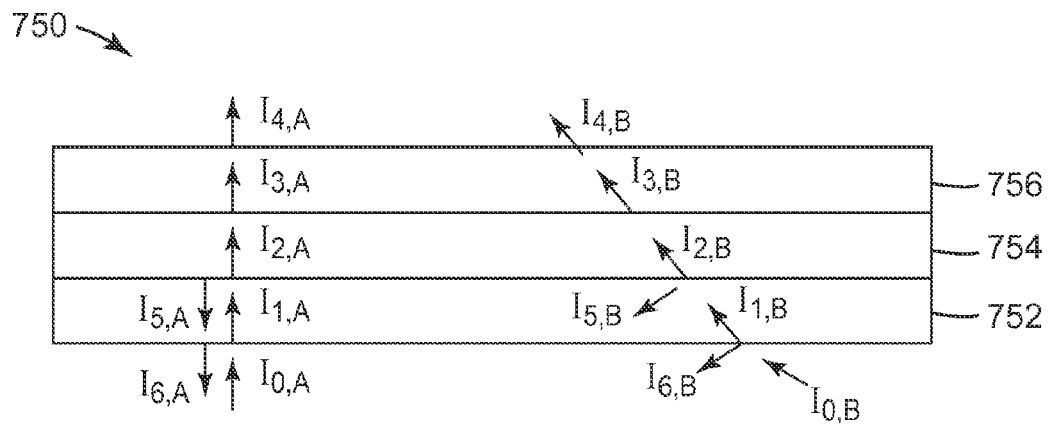
FIG. 7A is a schematic side view of a multilayer optical film that has been adapted for bi-level internal patterning, the figure also showing relative intensities of different beams of directed radiation in the various interior layers or portions of the film.

FIG. 7A is a side view of a multilayer optical film 750 that has been specifically designed to allow independent processing or patterning of at least two of its constituent microlayer packets, i.e., it has been designed for bi-level internal patterning, similar to the films described in connection with FIGS. 4A and 4B. In the case of film 750, normally incident light of the write wavelength, and of suitable intensity or fluence (denoted in FIG. 7A by subscript "A"), is used to treat or pattern a first microlayer packet 752 without substantially treating or patterning a second microlayer packet 756. Obliquely incident light of the write wavelength, and of suitable fluence (denoted in FIG. 7A by subscript "B"), is used to treat or pattern the second packet 756 without substantially treating or patterning the first packet 752.

Thus, in FIG. 7A, normally incident radiant energy $I_{0,A}$ impinges on the first writable microlayer packet 752. This radiant energy $I_{0,A}$ may be linearly polarized or it may be unpolarized, as desired. Some of the energy $I_{6,A}$ is reflected from the first outer surface, resulting in a lower energy $I_{1,A}$ entering the first packet 752. Absorption and optionally some reflection from packet 752 at the write wavelength results in an even lower energy $I_{2,A}$ of normally incident light exiting the packet 752. Blocking layer 754 is or comprises a microlayer packet that substantially reflects the impinging light of energy $I_{2,A}$, resulting in reflected beam $I_{5,A}$. Note that this microlayer packet may be rotationally symmetric or asymmetric as discussed above, which determines if the microlayer packet is a substantial mirror or polarizer. If the blocking layer 754 is a substantial polarizer, then it may (in some cases) be desirable to tailor the radiant energy $I_{0,A}$ (and the energy $I_{1,A}$ and $I_{2,A}$) to be linearly polarized along the block axis of such polarizer. Otherwise, e.g., if the blocking layer 754 is a substantial mirror, then the radiant energy $I_{0,A}$ (and energy $I_{1,A}$ and $I_{2,A}$) may be either polarized or unpolarized, which may or may not have an effect on the selective heating operations depending on the design of the individual microlayer packets. Residual intensities entering and exiting the second packet 756, represented in the figure as $I_{3,A}$ and $I_{4,A}$, respectively, are sufficiently reduced to limit processing, e.g. reduction of birefringence, of the second writable packet 756 to a desired level. When blocking layer 754 is sufficiently strong for a chosen initial impingement energy, $I_{0,A}$, then these residual intensities are both below the lower threshold $I_{L,2}$ and no significant reduction of birefringence occurs in the second packet 756.

For the obliquely incident light beam, radiant energy $I_{0,B}$ impinges on the first writable packet 752. This radiant energy $I_{0,B}$ may be linearly polarized or it may be unpolarized, in accordance with the discussion above. Some of the energy $I_{6,B}$ is reflected from the first outer surface resulting in a lesser energy $I_{1,B}$ entering the first packet 752. It may be advantageous to orient the laser polarization so that p-polarization light is delivered, and obliquely processed near the Brewster angle to limit reflection losses from the outer surface. The entering energy intensity $I_{1,B}$ is sufficiently low so that the changes in the first packet are kept to a low enough level to maintain birefringence in the first writable packet at a desired level. Complete independent manipulation of the two packets is possible when $I_{1,B}$ is lower than $I_{L,1}$. The oblique angle is chosen so that the reflection band of the blocking layer 754 has shifted to substantially avoid the write wavelength, allowing substantial passage of entering beam $I_{2,B}$ through the blocking layer 754 while providing at most only a very weak reflected beam $I_{5,B}$. Thus beam $I_{3,B}$ enters the second packet 756 at sufficient strength to obtain the desired level of processing and exiting beam $I_{4,B}$ is still of sufficient strength to process the back or distal portions of the second writable packet 756. For complete elimination of birefringence in the second packet, $I_{4,B}$ should be at least about $I_{U,2}$.

Figure 7B:
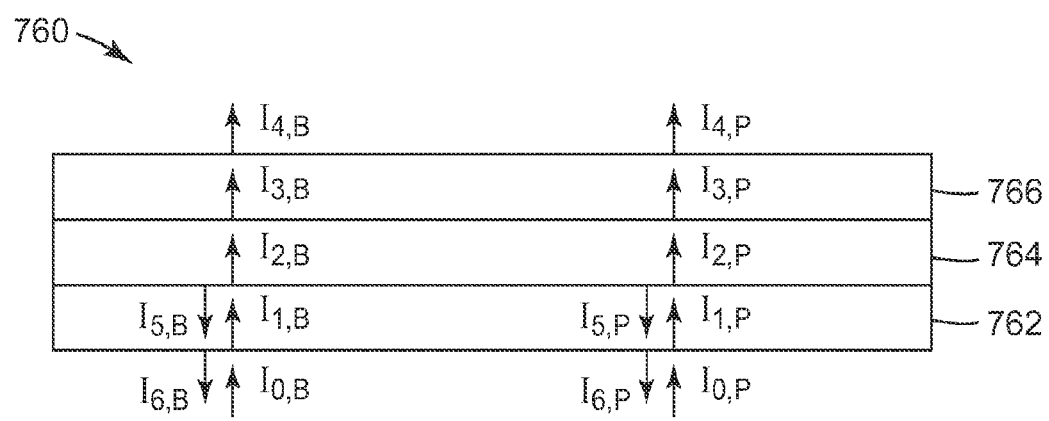
FIG. 7B is a schematic side view of a multilayer optical film adapted for bi-level internal patterning similar to (or in some cases identical to) that of FIG. 7A, but where different beams of directed radiation having the same incidence angle and same write wavelength but different polarizations are used to independently write or process two microlayer packets, such operation made possible by including a rotationally asymmetric (polarization-sensitive) blocking layer in the film construction.

FIG. 7B is a schematic side view of another multilayer optical film 760 adapted for bi-level internal patterning. The film 760 may in some cases be identical to film 750 if the blocking layer 754 of film 750 is sufficiently rotationally asymmetric, e.g., if it is a reflective polarizer. In any case, the film 760 of FIG. 7B has, like film 750, been specifically designed to allow independent processing or patterning of at least two of its constituent microlayer packets, i.e., it has been designed for bi-level internal patterning, similar to the films described in connection with FIGS. 4A and 4B. Film 760 incorporates a blocking layer 764 that is substantially rotationally asymmetric, the blocking layer 764 preferably being a multilayer reflective polarizer having a block axis and a pass axis. Such a blocking layer allows a first beam of normally incident light of the write wavelength, of suitable intensity or fluence, and being substantially linearly polarized along the block axis of the blocking layer (this first beam being denoted in FIG. 7B by subscript "B" for "block axis" polarization), is used to treat or pattern a first microlayer packet 762 without substantially treating or patterning a second microlayer packet 766. The rotationally asymmetric blocking layer also allows a second beam of suitable fluence, the second beam also being normally incident and also comprising the write wavelength, but being polarized orthogonal to the first beam and preferably parallel to the pass axis of the blocking layer 764, (this second beam being denoted in FIG. 7B by subscript "P" for "pass axis" polarization), to treat or pattern the second packet 766 without substantially treating or patterning the first packet 762.

Referring still to FIG. 7B, the first packet 762 (which may also be referred to as a "front" packet, from the standpoint of the incident radiation used to treat or write the packets of the film) has lower and upper thresholds $I_{L,1}$ and $I_{U,1}$ while the second packet 766 (which may be referred to as a "back"

packet for similar reasons) has lower and upper thresholds $I_{L,2}$ and $I_{U,2}$. The first and second packets likewise absorb a fraction $\gamma_1$ and $\gamma_2$ of the energy transversing each packet, respectively. The polarization-sensitive blocking layer 764 passes a portion $\beta_B$ of light of the write wavelength impinging on it in the block polarization state, and passes a portion $\beta_P$ of light of the write wavelength impinging on it in the pass polarization state, where $\beta_P$ is greater than $\beta_B$. We assume for purposes of this description that blocking layer 764 is a reflective polarizer. Preferably, absorption in the blocking layer is negligible, such that the amount light of the write wavelength that is reflected is thus $1-\beta_B$ and $1-\beta_P$ for the block and pass states, respectively.

The various rays shown in FIG. 7B represent the intensity or fluence state of the two propagating writing beams at various points in their paths. The rays shown in the figure are meant to be illustrative only, since additional reflections from the various external and internal surfaces, beyond those shown in the figure, will also in general be present. Relationships described here are intended as a first approximation for discussion purposes. Beam $I_{1,B}$ is the residual of the first initial write wavelength beam, $I_{0,B}$, after the first reflection from the outer surface, i.e. $I_{1,B}$ is $(1-R)\, I_{0,B}$ where R is the fraction reflected off the outer surface. Beam $I_{2,B}$ is the residual unabsorbed portion of $I_{1,B}$ after traversing the first packet 762. Thus, $I_{2,B}$ is the product $(1-\gamma_1)\, I_{1,B}$. The reflected beam $I_{5,B}$ from the blocking layer 764 is $(1-\beta_B)\, I_{2,B}$ which is reduced to $I_{6,B}$ after again reaching the front surface of the film 760. Thus $I_{6,B}$ is $(1-\gamma_1)(1-\beta_B)\, I_{2,B}$. With no absorption in the blocking layer, then $I_{3,B}$ entering the second packet 766 is $\beta_B\, I_{2,B}$. Finally, the beam at the back of the second packet, $I_{4,B}$, is then $(1-\gamma_2)\, \beta_B\, I_{2,B}$.

The second write wavelength beam, $I_{0,P}$, propagates through the film 760 in similar fashion to the first beam $I_{0,B}$, except of course the blocking layer 764 transmits the second beam more than the first beam due to the differences between $\beta_P$ and $\beta_B$. (Further, to the extent one or both of the writeable packets 762, 766 may also be rotationally asymmetric, they too will transmit the different polarization states differently. For simplicity in this description, we assume the packets 762, 766 are rotationally symmetric.) In order to fully write the first packet 762 in the block polarization state (using the first beam), then the total fluence at any point is the sum of the forward traversing and backwards reflecting beam, e.g. $I_{2,B}+I_{5,B}$ and $I_{1,B}+I_{6,B}$ or similar quantities in the middle portions of the front packet. Thus, these sums should be greater than $I_{U,1}$. Moreover, $I_{3,B}$ should be less than $I_{L,2}$. With regard to writing the second packet 766 in the pass state (using the second beam, $I_{0,P}$), then for full and complete independent manipulation, $I_{2,P}+I_{5,P}$ and $I_{1,P}+I_{6,P}$ should be less than $I_{L,1}$, while $I_{4,P}$ should be more than $I_{U,2}$.

Still referring to film 760 of FIG. 7B, it also follows from the strength of the various block state terms, that to a first approximation:

$$(I_{L,2}/I_{U,1}) > \beta_B/(2-\beta_B)$$

in order to process the first or front packet without disturbing the second or back packet. As the block state becomes strong and $\beta_B$ approaches zero, this constraint becomes moot as the back is fully isolated from the block state impinging on the front. As the polarizer becomes ineffective and $\beta_B$ approaches unity, then $I_{L,2}$ should approach $I_{U,1}$ to provide independent processability. In this limit, however, the window of operation becomes negligible as the fluence must then be large enough to be greater than $I_{U,1}$ at the back of the front packet while be small enough to be less than $I_{L,2}$ at the front of the back packet.

It likewise follows from the strength of the various terms for the pass state terms, that to a first approximation:

$$(I_{U,2}/I_{L,1}) < \beta_P/(2-\beta_P)$$

in order to process the back packet without disturbing the front packet. As the pass state becomes perfectly transmissive and $\beta_P$ approaches unity, then the lower write threshold of the front packet $I_{L,1}$ merely needs to exceed the upper write threshold $I_{U,2}$ of the back packet. As the pass state becomes partially reflective, the lower write threshold for the front packet should exceed the upper write threshold of the back packet by a factor larger than unity, e.g. $(2-\beta_P)/\beta_P$. Finally, one should note that the write threshold of each packet is intimately connected to the absorptivity of that packet.

FIGS. 4A, 4B, 7A, and 7B each depict multilayer optical films having two writeable microlayer packets. As discussed above, however, bi-level internal patterning can also encompass films that have three or more independently writeable microlayer packets therein. In such cases more than one blocking layer, and three or more writable microlayer packets, may be used. The additional blocking layer can be of the type that allows for double-sided irradiation treatment, or of the type that utilizes an angle-shifting reflection band for possible single-sided irradiation treatment. In one alternative embodiment to that of film 750 (see FIG. 7A), a second blocking layer (containing a reflective multilayer packet) is disposed atop the second writable packet 756, and a third writable packet is then disposed atop the second blocking layer. Thus, the second writable packet 756 is now sandwiched between two blocking layers. The second blocking layer may have a reflection band that is broader than that of the first blocking layer 754, such that light incident from below at the oblique angle depicted in FIG. 7A is still sufficiently blocked by the second blocking layer so that the third packet is not substantially modified or patterned at the oblique angle used to process the second packet 756. The first two packets 752, 756 of this alternative embodiment may thus be independently processed as depicted in FIG. 7A, while the third writeable packet may be processed at a still higher oblique angle than that used for the second packet. The third writable packet may than have a still higher absorptivity than the second packet, analogous to the relationship between the second and first packets. Alternatively, the first two packets 752, 756 may be processed as depicted in FIG. 7A, while the third packet may be processed from the opposite side of the construction (i.e., using a beam incident from the top of FIG. 7A). Additional writable and blocking layers can also be added. For example, a bi-level internally patternable film may comprise four independently writeable microlayer packets by laminating together two films of the type shown in FIG. 7A with a third blocking layer sandwiched therebetween that substantially isolates the constituent films, whereupon the first packet is processed with normally incident light from below, the second packet is processed with obliquely incident light from below, a third packet is processed with normally incident light from above, and a fourth packet is processed with obliquely incident light from above.

In some embodiments, three writeable packets within a bi-level patternable film can be independently written or treated with the same write wavelength processed from the same side of the film. One film construction compatible with such processing utilizes a polarizing (rotationally asymmetric) blocking layer between one pair of the packets, and a band-shifting blocking layer between another pair of the packets. One such film construction begins with the film 450 of FIG. 4B in which the blocking layer 458 is a reflective polarizer, so that a (high fluence) first normally incident beam linearly polarized along the block axis of the blocking layer can treat or write the first or front packet 456, and a (lower fluence) second normally incident beam linearly polarized along the pass axis of the blocking layer can treat or write the second packet 454. A second blocking layer, which provides a reflection band that shifts with incidence angle (referred to herein as a band-shifting blocking layer) is then added to this film, and placed underneath the second microlayer packet 454. Such second blocking layer may be or comprise a suitably designed packet of microlayers. A third writable packet, in addition to the two other writeable packets (456 and 454) is then placed underneath the second blocking layer. (The three writeable packets may, if desired, all incorporate the same wavelength-selective absorber, but in differing concentrations to provide different write thresholds for the packets.) With this new construction, the previous back writable packet 454 is now sandwiched between two blocking layers. The front (456) and now middle (454) packets can be processed as before using the first and second normally incident beams of the same write wavelength but different polarization. The second blocking layer (the band-shifting blocking layer) of this embodiment is preferably designed to sufficiently block both polarization states at normal incidence so that the third, or back, packet is unaffected by the first and second beams. This third packet is designed to have a lower write threshold than either of packets 456 or 454, and is processed with a third directed beam (which preferably comprises the same write wavelength as the first and second beams) at a sufficiently oblique angle to shift the reflection band of the second blocking layer away from the write frequency, such that the second blocking layer highly transmits the third beam. If the reflection band of the (polarizing) blocking layer 458 also sufficiently shifts at the oblique angle, then the blocking layer 458 may be highly transmissive for any polarization state, in which case the third directed beam may be either polarized or unpolarized, as desired.

In an alternative approach to that just described in the preceding paragraph, a second blocking layer and a third writable packet are again placed beneath the second writable packet (454) of FIG. 4B. The first two packets (456 and 454) are processed using the first and second normally incident beams of the same write wavelength but different polarization. The third packet may be processed with a third directed beam (which preferably comprises the same write wavelength as the first and second beams) that is incident from the opposite side of the film compared to the first and second beams, i.e., from the bottom rather from the top of the figure. Further embodiments are contemplated by the addition of one or more additional writable and blocking layers. For example, two films of the type shown in FIG. 7a can be combined for treatment from opposite sides, with a third blocking layer disposed between such films to isolate the treatment effects from opposite sides. Still further combinations and variations of the disclosed bi-level patternable films are also contemplated.

Figure 8A:
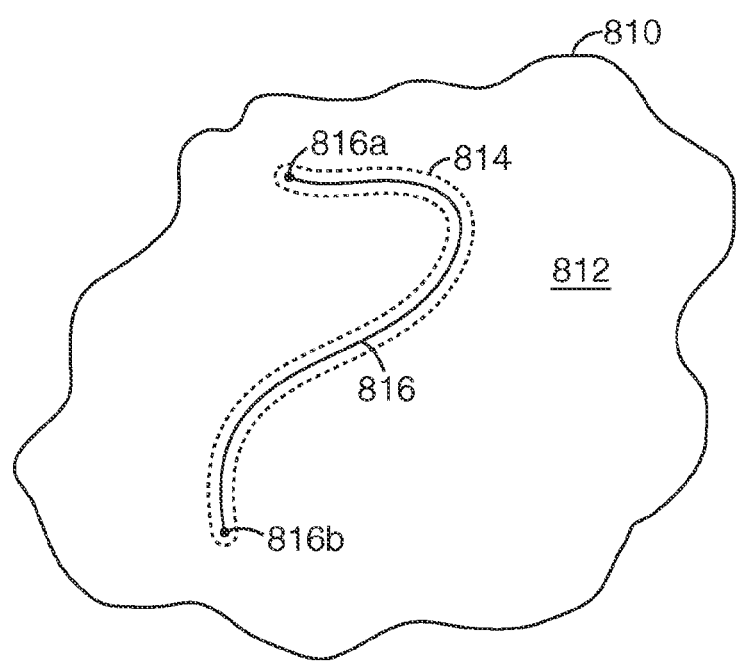
FIGS. 8A-C are schematic top views of different second zones of a patterned multilayer film, and superimposed thereon possible paths of a light beam relative to the film capable of forming the depicted zones.
Figure 8B:
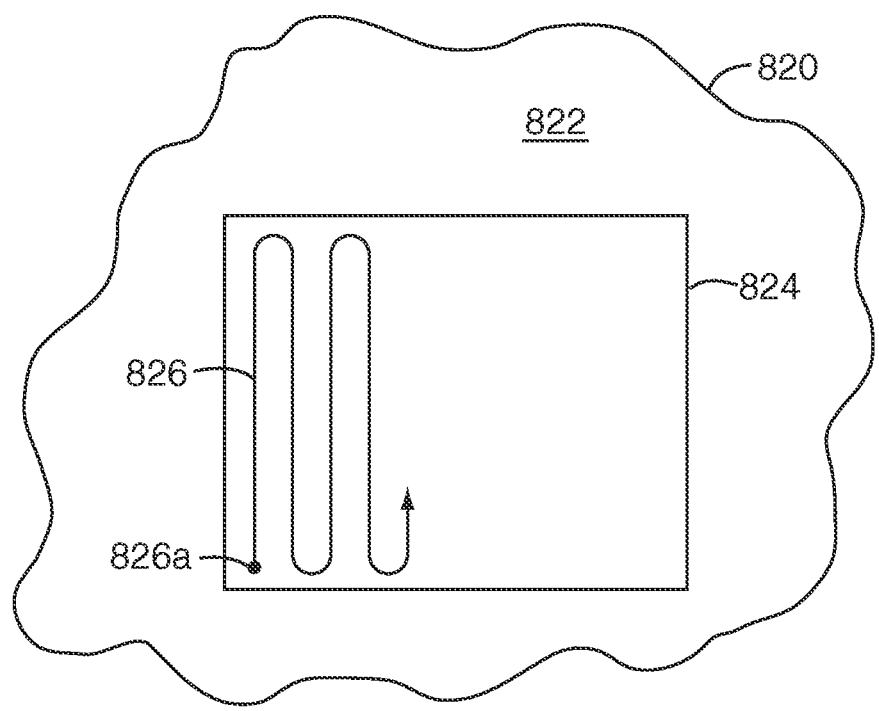
Figure 8C:
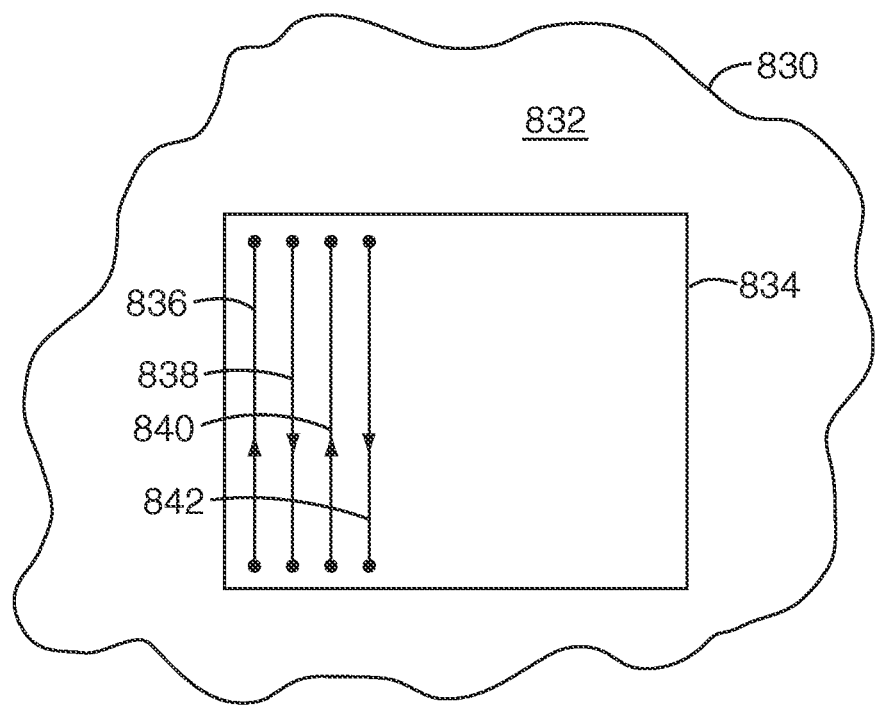

FIGS. 8A-C provide schematic top views of different second zones of a patterned multilayer film, and superimposed thereon possible paths of a directed light beam relative to the film capable of forming the depicted zones. In FIG. 8A, a light beam is directed at a multilayer optical film 810 and scanned at a controlled speed from a starting point 816a to an ending point 816b along a path 816 to selectively heat the film in an arbitrarily-shaped zone 814 to distinguish it from a first zone 812. FIGS. 8B and 8C are similar. In FIG. 8B, a light beam is directed at a multilayer optical film 820 and scanned at a controlled speed from a starting point 826a along a path 826 to selectively heat the film in a rectangular-shaped zone 824 to distinguish it from a neighboring first zone 822. In FIG. 8C, a light beam is directed at a multilayer optical film 830 and scanned at controlled speeds along the discontinuous paths 836-842, and so on, to selectively heat the film in a rectangular-shaped zone 834 to distinguish it from a neighboring first zone 832. In each of FIGS. 8A-C, the heating is sufficient to reduce or eliminate birefringence of at least some interior microlayers in the second zone while maintaining the birefringence of those layers in the first zone, and is accomplished while maintaining the structural integrity of the microlayers in the second zone and without any selective application of pressure to the second zone.

The directed light beam may also be modulated to create paths that are dashed, dotted, or otherwise broken or discontinuous. The modulation may be complete, wherein the light beam intensity changes from 100% or "full on" to 0% or "full off". Alternatively, the modulation may be partial. Further, the modulation may include abrupt (e.g. stepwise) changes in beam intensity, and/or it may include more gradual changes in beam intensity.

Figure 9A:
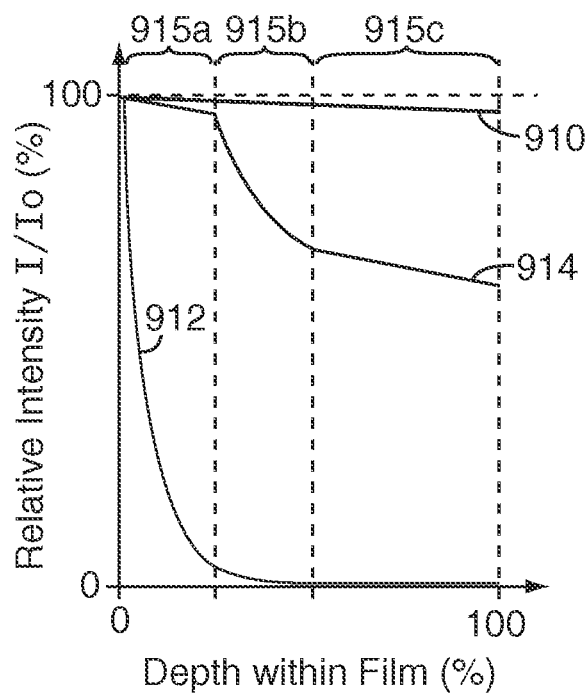
FIG. 9A is an idealized plot showing the relative intensity of a beam of light as a function of the depth the light beam propagates into the film, with three curves provided for three different multilayer optical films.
Figure 9B:
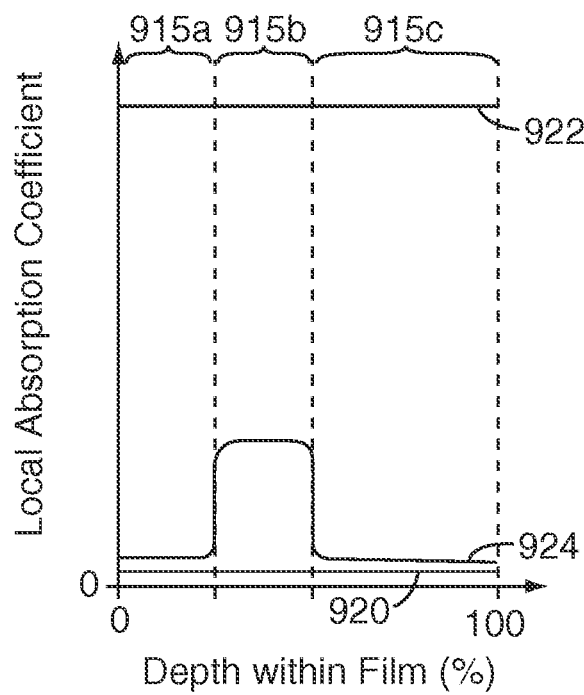
FIG. 9B is an idealized plot showing the local absorption coefficient as a function of the depth or axial position within the film, with three curves corresponding to the three curves of FIG. 9A.

FIGS. 9A and 9B address the topic of how the absorption of the multilayer optical film can or should be tailored to provide optimal localized heating. The graphs of FIGS. 9A and 9B are plotted on the same horizontal scale, which represents the depth or position of the radiant light beam as it propagates through the film. A depth of 0% corresponds to the front surface of the film, and a depth of 100% corresponds to the rear surface of the film. FIG. 9A plots along the vertical axis the relative intensity $I/I_0$ of the radiant beam. FIG. 9B plots the local absorption coefficient (at the selected wavelength or wavelength band of the radiant beam) at each depth within the film.

Three curves are plotted in each figure, for three different multilayer optical film embodiments. In a first embodiment, the film has a substantially uniform and low absorption throughout its thickness at the wavelength of the directed light beam. This embodiment is plotted as curve 910 in FIG. 9A and curve 920 in FIG. 9B. In a second embodiment, the film has a substantially uniform and high absorption throughout its thickness. This embodiment is plotted as curve 912 in FIG. 9A and curve 922 in FIG. 9B. In a third embodiment, the film has a relatively low absorption throughout regions 915a and 915c of its thickness, but has a higher, intermediate absorption in region 915b of its thickness.

The first embodiment has an absorption coefficient that is too low for many situations. Although the directed light beam is absorbed uniformly as a function of depth as indicated by the constant slope of the curve 910, which may be desirable in some cases, very little of the light is actually absorbed as shown by the high value of the curve 910 at a depth of 100%, meaning that a high percentage of the directed light beam is wasted. Nevertheless, in some cases this first embodiment may still be quite useful in the treatment of some films. The second embodiment has an absorption coefficient that is too high for many situations. Although substantially all of the directed light beam is absorbed, and none is wasted, the high absorption causes an excessive amount of light to be absorbed at the front surface of the film, which may cause surface damage to the film. If the absorption is too high, an adequate amount of heat cannot be delivered to interior layers of interest without damaging layers at or near the front surface of the film. The third embodiment utilizes a non-uniform absorption profile that may be achieved, for example, by incorporating an absorbing agent into selected interior layers of the film. The level of absorptivity (controlled by the local absorption coefficient) is desirably set to an intermediate level so that an adequate portion of the directed light beam is absorbed in the tailored absorbing region 915b of the film, but the absorptivity is not so high that an excessive amount of heat is delivered to the incident end of the region 915b relative to the opposite end. In many instances, the absorptivity in absorbing region 915b is still reasonably weak, e.g. the relative intensity profile 914 over that region may appear more as a straight line with merely a steeper slope than the other regions, e.g. 915a and 915c. As further described later, the adequacy of the absorption is determined by balancing that absorptivity against the power and duration of the incoming directed light beam to achieve the desired effect.

In an elementary example of the third embodiment, the multilayer film may have a construction of two thick skin layers with one or more packets of microlayers therebetween (separated by protective boundary layers if two or more microlayer packets are included), and the film may be composed of only two polymer materials A and B. An absorbing agent is incorporated into polymer material A to increase its absorptivity to a moderate level but no absorbing agent is incorporated into polymer B. Both materials A and B are provided in alternating layers of the microlayer packet(s), but the skin layers and the protective boundary layers, if present, are composed only of polymer B. Such a construction will have a low absorptivity at the outer surfaces, i.e. the skin layers, of the film, due to the use of the weakly absorbing material B, and will also have a low absorptivity at the optically thick PBLs if they are present. The construction will have a higher absorptivity in the microlayer packet(s) due to the use of the more strongly absorbing material A in alternating microlayers (along with alternating microlayers of the more weakly absorbing material B). Such an arrangement can be used to preferentially deliver heat to interior layers of the film, in particular to the interior microlayer packet(s), rather than to outer surface layers. Note that with an appropriately designed feedblock the multilayer optical film can comprise three or more different types of polymer materials (A, B, C, . . . ), and an absorptive agent may be incorporated into one, some, or all of the materials in order to provide a wide variety of different absorption profiles so as to deliver heat to selected interior layers, packets, or regions of the film. In other cases, it may be useful to include an absorbing agent in the PBL(s) or even in the skin layer, if present. In either case, the loading or concentration may be same or different, either higher or lower, than in the microlayers.

Similar absorption profiles as those of the foregoing embodiments may be obtained using the inherent absorption characteristics of the various native materials used in the multilayer optical film. Thus, the multilayer film construction may comprise different materials having different absorption characteristics among the various layers or packets of the film, and those various layers or packets may have been formed together during film formation (e.g. by coextrusion), or may have been formed as separate precursor films which were later combined e.g. by lamination.

We now reiterate and embellish upon aspects of the foregoing teachings and disclosure.

The foregoing disclosure may be considered to describe, among other things, "write-able" multilayer optical films that can be altered by noncontact, radiative means after its initial manufacture. The multilayer optical film (MOF) may comprise at least two materials of alternating layers and at least one optical packet of such layers tuned to reflect a selected portion of the spectrum, such as a visible spectral band, at a first selected angle of incidence, furthermore optionally comprising an absorbing agent which may for purposes of the present discussion be referred to as a third material, dispersed in either or both layers of a selected optical packet, that preferentially absorbs electro-magnetic radiation not principally reflected by the MOF reflective band at a second selected angle of incidence nor significantly absorbed by the other materials of the MOF. We also disclose a process using a directed radiant energy treatment of a specified spectral band to selectively melt and disorient in part or in whole, at least one birefringent material in the optical packet containing the absorbing material in order to reduce or eliminate the birefringence in these layers. The treatment is applied to chosen spatial locations across the film plane. Also disclosed is the finished optical film itself with the spatially tailored optical variations after treatment. The disclosed films can be used in business processes in which an originally uniformly cast and drawn optical body is spatially tailored to conform to the individual requirements of a given application.

One aspect of particular interest is the controlled spatial patterning of multilayer optical films containing, for example, near-IR absorbing dyes or other absorbing agents by selectively removing the birefringence of chosen interior optical layers while leaving other interior or surface layers relatively unchanged by subsequent treating with pulsed IR laser sources or other suitable high radiance light sources.

The films disclosed herein (both prior to selective heat treatment and after selective heat treatment), in which the birefringence of at least some of its internal microlayers can be reduced in one or more zones of the film to provide a second reflective characteristic, different from the initial or first reflective characteristic, may be referred to as STOF: Spatially Tailored Optical Films.

The films, methods, and business processes may be generally useful in any application in which a spatially controlled level of orientation is desired. Fields of interest may include, for example, display, decorative, and security applications. Some applications may overlap multiples fields. For example, some articles may incorporate the internally patterned films disclosed herein in combination with a film, substrate, or other layer that includes conventional patterning in the form of indicia, for example. The resulting article may be useful in security applications, but versions of it may also be considered decorative. Selectively heat treating such an article may produce zones in the internally patterned film that selectively obstruct (by increasing reflectivity) or reveal (by decreasing reflectivity) portions of the conventional patterning of the other film, depending on the design of the internally patterned film. Color shifting characteristics of the disclosed internally patterned films may also be exploited in combination with colored or black-and-white background indicia as disclosed for example in U.S. Pat. No. 6,045,894 (Jonza et al.) "Clear to Colored Security Film", and U.S. Pat. No. 6,531,230 (Weber et al.) "Color Shifting Film".

Further in regard to security applications, the disclosed films may be used in a variety of security constructions including identification cards, driver's licenses, passports, access control passes, financial transaction cards (credit, debit, pre-pay, or other), brand protection or identification labels, and the like. The film may be laminated or otherwise adhered as interior or exterior layers to other layers or portions of the security construction. When the film is included as a patch, it may cover only a portion of the major surface of the card, page or label. In some cases, it may be possible to use the film as the base substrate or the only element of the security construction. The film may be included as one of many features in the security construction such as holograms, security printed images (intaglio, offset, barcode, etc.), retroreflective features, UV or IR activated images and the like. In some instances, the disclosed films may be layered in combination with these other security features. The film may be used to provide a personalizable feature to the security construction, for example, a signature, an image, an individual coded number, etc. The personalizable feature may be in reference to the individual document holder or a specific product entity, such as in the case of a manufacturer tag, a lot verification tag, a tamper-proof coding, or the like. The personalizable feature can be made with a variety of scanning patterns including lines and dot patterns. Patterns can be the same or different among writable packets, depending on the film construction.

Consider, for example, the case of a first writable packet that initially exhibits a perceptible color but then becomes clear upon treatment or patterning. One or more such color packets can be used. Consider the addition of a second multilayer optical film packet to form the film construction to be included in the security construction. Patterning or writing the first packet will create a design or image in the color of the second packet in a background representing the color characteristics of the two packets combined. When the spectral bands are sufficiently narrow, both the foreground (patterned area) and background can color shift with viewing angle. The variation of the perceived color with background, e.g. white or black backgrounds, to favor transmitted or reflected light viewing can be used as a security feature. For example, a page or leaf of the film in a document, e.g., a passport, can be flipped to view the film against different backgrounds or portions of the document.

The film may provide both overt (e.g. clearly visible to an ordinary observer) and covert security features to the security construction. For example, a writable (color) reflective polarizer layer can provide a covert feature viewable with a polarizing analyzer, e.g. a feature that changes color or disappears depending on the polarization state of the analyzer. An infrared reflecting packet can be patterned to make an IR detectable, e.g. machine readable, personalized coding feature.

A particularly interesting film construction for security applications is a very far red or near IR reflector, e.g., with a lower (left) reflection band edge between 650 and 800 nm (depending on film construction) as described in U.S. Pat. No. 6,045,894 (Jonza et al.), which can provide a clear-to-colored appearance as the observation angle changes from normal incidence to glancing incidence. Other interesting constructions, including optical polarizing films with designed color shifts, are described in U.S. Pat. No. 7,064,897 (Hebrink et al.). Using the patterning methods of the present application, films such as those described in the '894 Jonza reference and those described in the '897 Hebrink reference can be made that are writable, for example, with a laser. For example, personalized information can be written into such a film by the alteration of reflection packets in the visible, UV, or IR portion of the spectrum, where the altered portions (treated zones) of the film may have a lower reflectivity than untreated portions of the film.

Finally, it should be noted that many of the features described here for security applications are likewise useful for decorative applications. For example, a personalized logo can be thus embedded in a consumer article.

Laminate constructions have been mentioned above, but they, and other types of optical bodies that incorporate a first STOF-type film as disclosed herein joined or combined in some fashion with another film or substrate with different optical properties, deserve further discussion. For purposes of this bi-level patterning application, the "another film or substrate" may be or comprise at least a second STOF-type film. However, other optical components, such as one or more absorbing polarizers, colored light transmissive films (e.g. a single layer polymer that has been dyed), retarding films, glass plates, white or colored cardstock, and the like, and combinations thereof, may also be included. The first and second STOF-type films may initially have the same or similar type of reflective characteristic (e.g., polarizer, mirror, or window), or substantially different characteristics.

The first film comprises a first plurality of layers, e.g. a stack or packet of alternating microlayers, that provide a first reflective characteristic by constructive or destructive interference. This first plurality of layers is tailored such that the birefringence of at least some of its microlayers can be reduced in one or more zones of the film to provide a second reflective characteristic, different from the first reflective characteristic, in such zones. The second film comprises a second plurality of layers, e.g. a second stack or packet of alternating microlayers different from the first such stack, which provides a third reflective characteristic. Third, fourth, and additional pluralities of layers may also be included as desired, and/or other functional layers such as one or more thick substrates, for example. The second film may be joined to the first film by a lamination process (e.g. with a suitable light transmissive adhesive layer) or by other suitable means.

In such optical bodies, the first and second reflective characteristics may be selected from any of the wide variety of reflective characteristic combinations disclosed herein. The third reflective characteristic, i.e., the reflective characteristic of the second plurality of layers, may also be selected from any of the reflective characteristics disclosed herein. The first and third reflective characteristics may have associated therewith first and third reflection bands respectively, and these bands may have substantially no overlap in wavelength in some embodiments, while in other embodiments they may overlap partially or fully.

One such optical body of interest is one in which the first and third reflective characteristics have overlapping reflection bands, and wherein the first plurality of layers is a multilayer mirror-like film and the second plurality of layers is a multilayer reflective polarizer. Light that impinges on such an article at the mirror-like film will be substantially reflected. If the reflectivity of the mirror-like film is high enough, the presence of the underlying reflective polarizer may have little or no effect on the overall reflectivity of the article, since little or no light passes from the mirror film to the polarizer film. However, the mirror film can be selectively heat treated in one or more second zones as disclosed herein to relax the birefringence of at least some of its layers in such zones to provide the second reflective characteristic. The second reflective characteristic may be a multilayer window-like film. In this case, the treated areas (second zones) of the first film allow light to penetrate to the second film. The result is an internally patterned article that may have the function of a mirror film in the untreated (first) zones, and the function of a reflective polarizer film in the treated (second) zones (since the window-like portions of the first film expose the underlying polarizer film). Such a film may be used in some applications as a substitute for the unitary mirror/polarizer films disclosed in International Application No. PCT/US2009/069120, "Multilayer Optical Films Having Side-by-Side Mirror/Polarizer Zones". If desired, the second film may also be selectively treated to convert its third reflective characteristic to a fourth reflective characteristic in the treated zones of the second film. The fourth reflective characteristic may be a window-like characteristic or any other characteristic different from the third reflective characteristic. Treatment of the first and second films may be such that the treated zones of the first film and the treated zones of the second film have any desired spatial relationship, e.g., they may be substantially coincident, complementary, overlapping, non-overlapping, or otherwise as desired, and similarly with the untreated zones of these films.

Another optical body of interest is one in which the first and third reflective characteristics have overlapping reflection bands, and wherein the first plurality of layers is a first multilayer polarizer film and the second plurality of layers is a second multilayer reflective polarizer. These polarizer films may or may not be identical in construction, and may be arranged in any desired orientation, for example, their respective pass axes may be parallel, or orthogonal, or have any other relative orientation angle. Of particular interest is the case where the polarizer films are oriented orthogonally. The first plurality of layers, having the first reflective polarizer characteristic, may be selectively heat treated in one or more second zones as disclosed herein to relax the birefringence of at least some of its layers in such zones to provide the second reflective characteristic. The second reflective characteristic may be a multilayer window-like film. In this case, the treated areas (second zones) of the first film allow light of all polarization states to penetrate to the second film. The second film may also be selectively heat treated after lamination to the first film to also form a multilayer window-like characteristic in its treated areas. By arranging the treated areas of the first film to be complementary to the treated areas of the second film (e.g. by analogy to a checkerboard pattern, the former zones may constitute the dark squares of the pattern, and the latter zones may constitute the light squares of the pattern), the resulting article may have the function of a first reflective polarizer film in the untreated zones of the first film (beneath which the window-like treated zones of the second film lie), and the function of a second reflective polarizer film in the treated zones of the first film (which are window-like but underneath which lie the untreated zones of the second film). Such a film may be used in some applications as a substitute for the unitary polarizer/polarizer films disclosed in International Application No. PCT/US2009/069192, "Multilayer Optical Films Having Side-by-Side Polarizer/Polarizer Zones".

Multilayer optical films may include at least one selected reflection band for at least one state of linear polarization formed by at least one selected packet of optical interference layers, which may comprise a radiatively absorbing material. The patterning method allows the removal or reduction of the birefringence among a selected set of material layers thus altering the interference characteristics of the optical stack over a selected spectral band. In this manner, the film may be spatially tailored for a desired application, e.g. a pixilated display. The optical film can thus be made to be spatially changing color filters, or can be made to vary between transmissive, reflective mirror and/or reflective polarizers, or in combination of color filtering and these reflective states, or strengths or quality of these states (e.g. from a strong to weak mirror, or from a polarizer or partial polarizer to a mirror). One useful application may be color filters used in liquid crystal display (LCD) devices. Another application may be to use the disclosed materials and techniques to create or "write" structures in the interior or inside of films and similar optical bodies for purposes besides or in addition to wavelength-selective transmission or reflection. The spatial tailoring of optical properties and materials described herein may be used to effect a light guiding structure inside film, for instance bringing the guide through the film and intermittently drawing to the surface. The combination of anisotropic and selectively absorbing materials and laser writing process can produce highly functioning optical structures with the added processing advantage of using longer laser pulse widths, reduced numeric aperture, and potentially greater speed of writing.

A particularly useful class of constructions is a polymeric optical body comprising two or more sets of optically functional layers, each set having a similar function (e.g. optical transform, whether it be reflection or transmission, for example) but wherein each particular set is included to act on a particular portion of the spectral band. At least one set may comprise radiant absorbers, and at least one other set does not. In some cases, more than one set may comprise radiant absorbers. For example, a multilayer optical film may comprise two or more optical interference packets. These packets (sets of optically functional layers) may comprise many layers of alternating materials. One optical packet may contain radiant absorbers and another may not.

A variety of optical absorbers can be used. For optical films operating in the visible spectrum, ultraviolet and infrared absorbing dyes, pigments, or other additives may be useful. It may be desirable to choose a spectral range for absorption that is not highly absorbed by the polymers of the construction. In this manner, the directed radiation can be concentrated in the selected regions of interest throughout the thickness of the optical body. The absorbers are desirably melt extrudable so that they can be embedded in the selected layer set of interest. To this end, the absorbers should be reasonably stable at the processing temperatures and residence times required for extrusion.

The disclosed films and optical bodies can be radiatively treated in a chosen spectral range that is outside the spectral band normally transformed by the optical body for a chosen application of interest. The radiative treatment may be achieved by any variety of means which can focus light of the selected spectral band at a sufficient intensity on a chosen location of the film. A particularly suitable means for the radiative treatment is a pulsed laser. This may be an amplified pulsed laser. In some circumstances, the laser may be tunable. For example, an optical film operationally reflective in the visible band may have an absorber in the near IR, or the near UV if the polymer is not particularly absorptive there. For a multilayer optical film, the selection of the absorption band for treatment may be chosen with regard to the optical band of the film. Preferably, the film should not reflect the directed radiant energy for the angle of incidence chosen for this directed radiant energy, although treatment may still be possible if the reflection is sufficiently low. Radiant energy from lasers is frequently substantially polarized. It can be useful to orient the impinging beam at an angle coincident with the Brewster's angle at the outer surface to minimize energy loss. Because the MOF reflection band also shifts to shorter wavelengths with higher incident angles, shorter absorption wavelengths can be used than would be expected solely by the band placement at the normal incident angle.

For example, an MOF mirror film with a biaxially oriented skin layer of index 1.75 (at a wavelength of 632 nm) and corresponding Brewster's angle of about 60 degrees and a sharp normal incident right band edge at about 800 nm can accept a directed light beam above about 700 nm at the Brewster's angle, allowing for processing using this wavelength even though it is reflected at normal incidence. The right band edge is chosen in part to ensure reflection at all angles of interest. At 880 nm, the reflection band still covers to about 700 nm at grazing incidence. At this band position, the band covers up to 750 nm near the Brewster's angle of this case. Some headroom may be desirable between the band edge and the wavelength of the directed radiation. If it is desired that the beam be directed through any of the potential layers, then this puts a practical lower limit in this case of about 750 to 800 nm (vacuum) for the directed energy above the optical band. Alternatively, one may choose to direct the radiant energy through a preferred side of the film so that the intervening wavelength bands in the film do not block the particular energy of interest. For example, a green laser at 532 nm may be used to process a blue packet as long as it does not need to pass at normal incidence through a green reflecting packet, or if the beam could pass through it at sufficiently oblique angle to no longer be reflected by that packet due to the band shift.

If near UV radiation is used for patterning (which again depends on the material absorption characteristics), the band shifting of packets with a longer wavelength reflection band may obstruct the beam. Normally incident directed radiation can then have the highest wavelength relative to the fixed left band edge of the film, whereas oblique angle processing could be obstructed by band shifting. Left band edge shifting is also relevant for other visible or IR beams used with constructions that have band shifting reflection bands higher than the beam vacuum wavelength.

Management of the absorbed radiant energy through the thickness of the film and the resulting thermal pulse through the thickness, is one aspect of the present disclosure. Controlled melting resulting in reduced or eliminated birefringence of materials in the selective layers spanning a selected portion of the film thickness calls for a reasonably low level of absorption of the directed radiation to ensure uniform effect. The materials in the selected layers(s) should not over-heat either from a time pulse or thermal standpoint resulting in either excessive ionization or thermal decomposition. For example, if one considers a purely heat capacity driven situation, a material brought from 25 degrees C. to a desired 300 degrees C. heats up 275 degrees C. If the selected layer absorbs 10% of the directed radiation, then the front portion closest to the source of the directed radiation needs to heat up to about 330 degrees C. in order for the back portion to heat up to the desired 300 degrees C. Sufficient headroom between the hottest portion of the film and deleterious temperatures or ionizing conditions should be maintained. Through-thickness temperature control may be important to selectively remove birefringence from only one material, e.g., to prevent overheating. In some cases, preheating may be desired. Efficiency of the process, from a laser energy perspective, can be increased by preheating the film before and during laser exposure. The preheat temperature of the film should be above room temperature but below the melting temperature for the polymers used in the optical packet. Typically, when the film is pre-heated throughout its thickness, then a larger amount of the directed radiation may be absorbed for the same level of thermal headroom. For example, when a back portion of a selected film region at 200 degrees C. is heated to 300 degrees C. for a difference of 100 degrees C., the front portion will only be overheated to 310 degrees C. when about 10% of the incident energy of the beam is absorbed. In this case, the selected region could absorb up to about 23% of the directed radiation, to again result in heating up to about 330 degrees C. with a temperature rise of 130 degrees C. for the front portion and a 100 degree C. rise for the back portion to again reach the desired 300 degrees C. The amount of preheating may need to be controlled to prevent wash-out of the thermal pulse during cooling resulting in significant melting beyond the selected region. Generally, the higher the pre-heating, the closer the remainder of the film thickness is to melting. These non-selected portions can become liable to melting as the thermal pulse spreads. The maximum temperatures induced by the directed radiation, the sidedness of the film construction with its various layer thicknesses, the pre-heating gradient through the film, and the path of the directed radiation, all may need to be considered together to optimize the film and process. In fact, the thermal management is even more complicated, because sufficient energy is preferably absorbed not only to raise the material into its melting range but also to actually cause the melting. The management of the energy pulse(s) of the directed radiation should include the time factor to ensure that melting can in fact occur and that the thermal wave is adequately contained along the thickness- or z-axis to prevent undesired melting, such as to melt birefringent layers in one microlayer packet without melting birefringent layers in another microlayer packet. In particular, the sequence and duration of the pulses may need to be carefully controlled.

The power, scan speed, and beam shape of a laser source (if a laser source is used for the selective heating) and the dye loading (or loading of another absorbing agent, if in fact any absorbing agent is used) combine to provide an effective energy transmitted to the processed region of the film under adiabatic conditions. Although thermal conditions are not generally adiabatic in practice, approximate laser processing conditions can be estimated by determining the required energy for conversion assuming adiabatic conditions with a specification of the film construction, background temperature, and knowledge of the various heat capacities, heats of fusion, and melting points of the pertinent materials. Dispersion of the IR absorber or other absorbing agent may be an important consideration, including dye solubility limits and dissolution mechanics. For undissolved dyes and pigments, particle size and shape distributions may be important. For example, excessively large absorbing particles can over-heat relative to their surrounding film matrix, causing film defects such as degradation, wrinkling, blistering, layer delamination, or other damage. Film cleanliness may also be important, since surface and embedded dust and similar particulate matter may also cause random or unanticipated defects. Other considerations include the beam shape and frequency (if a pulsed source is used) of the laser source, the scanning pattern, the mounting of the film (e.g. onto a card or other substrate by lamination such as with an adhesive or by other means), and the heat transfer, e.g. as controlled by the various thermal conductivities within and heat transfer coefficients from the film.

Management of the absorbed radiant energy across the film plane may also be important to ensure the desired spatial feature. Beam size and focus can also be important process controls. In some cases, it may be desirable to place the film at a location where the beam is focused to its smallest size, while in other cases the film may be deliberately placed at a location where the beam is defocused by a desired amount. The manner of scanning the film and how quickly the directed light beam path can overlap or turn on itself during processing of an area can alter surface roughness, smoothness, haze, wrinkling and other phenomena. With regard to the film pre-heating discussion above, the beam may be controlled in such a way that a portion of the film currently being irradiated is close to a portion of the film that was recently irradiated, so that the heat provided by the laser itself can be considered to preheat the portion of the film currently being irradiated. This may occur, for example, where the beam is scanned along a first path, and soon thereafter (while the portion of the film along and close to the first path is still at an elevated temperature) scanned along a second path that is adjacent to, or even somewhat overlapping with, the first path.

Time-related aspects such as the duration of the directed radiation may also be important. We have found that relatively short, pulsed operation is often advantageous. For example, in some typical cases we have found that the heating time, as determined by the duration of the laser exposure, is preferably in the range of 10 nanoseconds to 10 milliseconds. The upper exposure duration is a function of the amount of thermal diffusion into other portions of the film through the thickness that can be tolerated for the given application. The shorter the duration, the more compact the delivery of the energy into the desired film region of interest; for example, it may be possible to establish a momentary heat pulse mostly contained within the desired packet. The details of the thermal diffusion are a function of the materials, the anisotropic thermal conductivities at the particular material orientation conditions, the densities, the heat capacities, the thickness of the regions of interest, the beam durations, and the like. In exemplary embodiments, the energy absorbed by the optical packet is of sufficient intensity and duration to melt the optical repeat units in the optical packet but of insufficient intensity and duration to evaporate, significantly chemically modify, or ablate components of the film.

In order for the laser exposure to modify the packet birefringence in the second zone, both high intensity (high power/unit area) and high energy density are desirable, but not necessary. These characteristics help to ensure that a substantial amount of heat generated by absorption of the directed radiation by the materials in the packet stays in the packet, by reducing the time needed for treatment. Thermal diffusion reduces the concentration of energy in the packet and therefore may reduce the efficiency of the process. In this regard, it is often desirable for only a small amount of heat to be dissipated outside of the packet, either laterally into the first (untreated) zone or within the (treated) second zone to other layers of the film. The more heat dissipated outside of the absorbing packet or packets in the second zone, the less efficient the process in those cases where it is desired to heat only a portion of the thickness of the film in the second zone.

The manner of cooling may also need to be carefully considered. Rapid cooling may be useful in some instances. Cooling from one or both sides of the film may be desirable.

Reasonably low levels of absorption of the directed radiation may also be important for end-use applications. It is desirable that environmental exposure not unduly overheat the film. In particular, near IR absorption may result in film heating when exposed to direct sunlight. Preferably, the expected flux does not raise the film temperature unduly. For example, it may be desirable to maintain the temperature of the system below the glass transition temperature of the film under normal use. The amount of energy absorption is in part related to the amount of energy that must be captured from the pulses to achieve the needed temperature difference from the given level of pre-heat.

The desired absorption in the system may thus be optimized, balancing the flux levels, thermal diffusion (wash-out), preheating, and cooling to achieve the desired uniformity and extent of treatment while minimizing end-use concerns, such as color, grayness, or environmental radiant absorption.

It may be useful to incorporate energy absorbing buffer layers or regions between the functional layers or regions of the film. These buffer regions can heat up and even partially or totally melt while protecting another functional region of the film from heating via thermal diffusion (wash-out). In one example, this buffer region could be layers (e.g. PBLs) between packets of a similar or different material than that used in the optical layers. In another example, a lower melting temperature material can be used as "thermal speed bump" between functional layers of higher melting temperature materials. In a multilayer optical film, one simple example is a PEN:PMMA or PEN:isotropic coPEN mirror construction comprising optical packets separated by a lower melting and oriented coPEN protective boundary layer (PBL) such as a so-called low-melt PEN (LmPEN) which e.g. may comprise 90%/10% naphthalate/terephthalate carboxalate subunits.

The melting point and/or softening point (e.g. the glass transition temperature) of a material layer in a polymer film can be measured and analyzed using differential scanning calorimeter (DSC) techniques. In such techniques, the film sample may first be suitably dried, e.g. under vacuum of less than 200 mTorr for about 48 hours at 60 degrees C. before testing. A sample of about 5 mg may then be weighed and sealed in a hermetically sealed aluminum Tzero pan. A heating-cooling-heating ramp may then be conducted over a suitable temperature range, e.g., 30-290 degrees C. A constant heating rate of 20 degrees C./min, or other suitable heating rate, can be used for the ramp. After the scan, the first heating thermal trace may be analyzed for softening step changes and melting peaks. The analysis may reveal both the melting temperature and the characteristic bandwidth associated with the melting temperature, the bandwidth referred to as the peak width at half height (PWHH). Finite values of PWHH reflect the fact that a material can melt over a finite range of the temperatures rather than at a single precise temperature. The PWHH may become important for articles whose different materials have (peak) melting temperatures that are close to each other. The DSC technique was used to measure the melting temperature and PWHH for three exemplary materials suitable for use in multilayer optical films: polyethylene naphthalate (PEN); a naphthalate-based copolymer of PEN, described in Example 7, so-called PEN-CHDM10 of U.S. Patent Application Publication US 2009/0273836 (Yust et al.), referred to herein as "PEN-Gb"; and a PEN-based polymer in which 20% of the dimethyl 2,6-naphthalene dicarboxylate (NDC) is substituted with 4,4'Biphenyldicarboxylic acid dimethyl ester, referred to herein as "PENBB20". Samples of these materials were measured, and exhibited melting points of 261, 248, and 239 degrees C. for the PEN, PEN-Gb, and PENBB20 samples respectively. The PWHH of the samples were also measured. The PWHH of the PEN sample was 7 degrees C., but depending on processing conditions of the polymer this may range from 5 to 10 degrees C. The PWHH of the PEN-Gb sample was 6 degrees C., but depending on processing conditions this may range from 5 to 15 degrees C. The PWHH of the PENBB20 sample was 10.4 degrees C., but depending on processing conditions this may range from 5 to 15 degrees C. In general, the PWHH of a polymer film may be decreased by heat setting the film at a suitable temperature below the melting point for a suitable time.

In general, for any particular wavelength band for the directed radiation, the absorptive power of the remainder of the film along the thickness direction may be tailored to be sufficiently low, relative to the selected portion of the film for this radiation, to prevent undesired over-heating and undesired alteration of these non-selected portions. The film extrusion process may be designed to ensure that migration of the actively absorbing material of a selected portion of the film from that portion to another functional portion of the film does not happen to a significant degree. Again, a buffer layer that blocks such migration, e.g. through chemical nonaffinity, can be used. Processing methods, including residence times for layer contact and the like, can also be used.

The directed radiant treatment may be achieved directly after or even during film manufacture, separately but still in roll form, after sheeting, or after mounting to another substrate such as a glass plate, or plastic or paper cardstock. The level of precision should be balanced against the process variations. For example, web flutter should be sufficiently handled for a roll process. The directed radiant treatment could be achieved as the film moves over a roller while the film is under tension, perhaps between nips. A protective film can be placed between the film and the rollers to continuously clean the rollers and otherwise prevent cosmetic defects such as scratches. In another example, the film can be mounted on a fixed substrate after sheeting, or mounted or fixed over a temporary backing in a semibatch manner. For example, portions of the film roll can successively contact a protective film and slide over a plate. The film roll conveyance could stop, the designated portion over the plate could be slightly tensioned as desired, and then the directed radiant treatment applied over the designated portion backed by the plate. The finished roll portion may then be moved off the plate treatment zone by a successive conveyance by which the successive portion of the roll may be treated, and so on until the entire roll is treated.

The interior patterning method described herein may also be combined with known techniques, e.g. ablative, surface amorphization techniques, focusing methods, embossing, thermoforming, etc.

A variety of melt-extrudable absorbing additives are available from a variety of sources. The additives may be organic, inorganic, or a hybrid. They may be dyes, pigments, nanoparticles, or the like. Some potential IR dyes include any of the Nickel, Palladium, and Platinum-based dyes available from Epolin, Inc. under the tradename Epolight™. Other suitable candidates include Amaplast™-brand dyes, available from ColorChem International Corp., Atlanta, Ga. Both linear and non-linear absorbing additives may be considered.

Several factors in combination may make a dye particularly suitable for the present application. Thermal stability through the extrusion process is particularly desirable. In general, the extrusion process is desirably hot enough to both melt and allow the conveyance of the melt streams at suitably manageable pressure drops. For example, polyester based systems may require very high stability up to about 280 degrees C. These requirements can be reduced by using co-polymers of various polymers, such as coPENs, e.g. with processing around 250 degrees C. Olefinic systems like polypropylene, and polystyrene, are typically less demanding. The choice of resins in a particular multilayer optical film construction can narrow the choices of potential absorbing material candidates, as can dye migration tendencies, the ability to be uniformly dispersed in the desired materials layers, the chemical affinities of the dye to the various materials, and so forth.

EXAMPLES

Cast Webs 1, 2, and 3

The term "cast web" refers to a cast and formed multilayer body prior to subsequent drawing and orientation but after the initial casting process. A first multilayer polymer web, or cast web, was constructed using naphthalate-based co-polymers. The first such co-polymer is referred to as PEN-Gb and the second such co-polymer is referred to as coPEN 55/45 HD. The first co-polymer, PEN-Gb, is described in Example 7, so-called PEN-CHDM10, of U.S. Patent Application Publication US 2009/0273836 (Yust et al.). PEN-Gb is thus a co-polymer made with initial monomer charges in the proportion of 38.9 lbs NDC (dimethyl 2,6-naphthalene dicarboxylic acid—e.g. as available from BP Amoco, Naperville, Ill.) to 20.8 lbs of EG (ethylene glycol—e.g. as available from ME Global, Midland, Mich.) and 2.23 lbs of CHDM (cyclohexane dimethanol—e.g. as available from Eastman Chemical, Kingsport, Tenn.), according to Table 1 of the referenced U.S. patent application. The second co-polymer, coPEN 55/45 HD, is the copolyethylenenaphthlate, comprising 55 mol % naphthalene dicarboxylate, 45 mol % terephthalate as carboxylates and 95.8 mol % ethylene glycol, 4 mol % hexane diol and 0.2% trimethylol propane as glycols, as described in Example 10 of U.S. Pat. No. 6,352,761 (Hebrink et al.).

The multilayer polymer web was formed using a coextrusion process as generally described in U.S. Pat. No. 6,830,713 (Hebrink et al). The various polymers were generally dried, e.g. at 85 degrees C. for 60 hours, and then fed into separate extruders of either a single screw or twin screw configuration. The first and second polymers forming the optical layers were co-extruded, each with its own extruder with a final extruder zone temperature, and fed through a melt train including a 151 alternating layer feedblock using a gradient feed plate that provides a layer thickness gradient through the film thickness. These layers form the so-called optical stack or microlayer packet of the finished multilayer film. To improve flow quality of the layers, two thicker, so-called protective boundary layers (PBLs) adjoin the outermost layers of the optical stack and protect the optical stack from the highest shear rates at the feedblock walls. The PBLs are also fed by the one of the extruders. For purposes of these examples, the material feeding the PBLs will be referred to as material 1, the other as material 2, and likewise for the extruders. Each PBL is about 4% of the thickness of the optical stack. Prior to spreading in the die at a die set point temperature, an additional skin layer fed by extruder 3, with a material 3, is joined to the coextruding multilayer flow, top and bottom, for additional layer stability during flow in the die. In these described examples, material 3 may be the same as material 1 or 2. (The terminology "material 1", "material 2", and "material 3" used in connection with the examples should not be construed in any predetermined fashion with respect to the "first material" and "second material" terminology used elsewhere in this document, e.g. in connection with FIGS. 5A-D. For example, the "material 1" of the present examples may correspond to the "first material" of FIGS. 5A-D, or alternatively the "material 2" of the present examples may correspond to such "first material".) In the case of this first cast multilayer web, material 1 was the first co-polymer, so called PEN-Gb, material 2 was the second co-polymer, so-called coPEN 55/45 HD, and material 3 was again PEN-Gb. The multilayer construction was cast from a die, quenched and electro-statically pinned to a casting wheel to form rolls of the first cast multilayer optical web. This first cast web was wound upon disposable cores having widths of at least 10 cm with a desired approximate thickness (or caliper) over a central portion in width dimension. Other details of construction of the first cast web are provided in Table A below.

TABLE A

| Processing Conditions for Cast Web 1 | |
| --- | --- |
| Conditions | Cast Web 1 |
| Material 1 | PENGb |
| Material 2 | coPEN 55/45 HD |
| Material 3 | PENGb |
| Extruder 1 Final Temperature | 254 degrees C. |
| Extruder 2 Final Temperature | 249 degrees C. |
| Extruder 3 Final Temperature | 254 degrees C. |
| Melt Train Temperature | 260 degrees C. |
| Die Temperature | 249 degrees C. |
| Material 1 relative weight fed | 8 |
| Material 2 relative weight fed | 9 |

TABLE A-continued

Processing Conditions for Cast Web 1

| Conditions | Cast Web 1 |
|---|---|
| Material 3 relative weight fed | 15 |
| Stream fed Masterbatch | none |
| weight % dye in Master batch | NA |
| Masterbatch fraction of stream | NA |
| Cast thickness, center (microns) | 420 |

Cast webs 2 and 3 were made in like fashion to Cast Web 1, except that an absorbing agent was added to the extruder feed of material 2, and the casting wheel speed was adjusted to adjust the overall thickness of the cast webs. The absorbing agent was an IR dye used to capture radiant energy in the subsequent writing process. The IR dye was compounded into material 2 in a so-called "masterbatch," and this masterbatch was then introduced into the extruder feed stream in a prescribed proportion to virgin material 2. For Cast Webs 2 and 3, the prescribed proportion was 1:13 (1 part master batch to 13 parts virgin material). Just as with Cast Web 1, material 1 was the so-called PEN-G, material 2 the so-called coPEN 55/45 HD and material 3 was also the PEN-G for the Cast Webs 2 and 3.

Masterbatches were made prior to the multi-layer co-extrusion by feeding the dye and polymer resin in prescribed weight ratios into a twin screw extruder with or without an additional vacuum applied as needed to ensure minimal degradation of the resin. The extrudate was then chopped into pellets for feeding. The dye used in these example Cast Webs 2 and 3 was a platinum-based dye, Epolite™ 4121 available from Epolin, Inc., Newark, N.J. The peak absorption wavelength for this dye is around 800 nm. For the masterbatch compounding with the Epolite™ 4121 dye, nominal final zone extrusion temperatures were between 240 degrees C. and 260 degrees C. A typical masterbatch nominal dye concentration was 1.0 wt % dye in polymer.

Extrusion and process details for the Cast Webs 2 and 3 are provided in Table B below. Note that the difference in thickness between Cast Web 2 and Cast Web 3 was achieved by simply changing the speed of the casting wheel.

TABLE B

Processing Conditions for Cast Webs 2 and 3

| Conditions | Cast Web 2 | Cast Web 3 |
|---|---|---|
| Material 1 | PENGb | PENGb |
| Material 2 | coPEN 55/45 HD | coPEN 55/45 HD |
| Material 3 | PENGb | PENGb |
| Extruder 1 Final Temperature | 254 degrees C. | 254 degrees C. |
| Extruder 2 Final Temperature | 249 degrees C. | 249 degrees C. |
| Extruder 3 Final Temperature | 254 degrees C. | 254 degrees C. |
| Melt Train Temperature | 260 degrees C. | 260 degrees C. |
| Die Temperature | 249 degrees C. | 249 degrees C. |
| Material 1 relative weight fed | 8 | 8 |
| Material 2 relative weight fed | 7 | 7 |
| Material 3 relative weight fed | 15 | 15 |
| Stream fed Masterbatch | Material 2 | Material 2 |
| weight % dye in Master batch | 1 | 1 |
| Masterbatch fraction of stream | 0.07 | 0.07 |
| Cast thickness, center (microns) | 365 | 115 |

Figure 10:
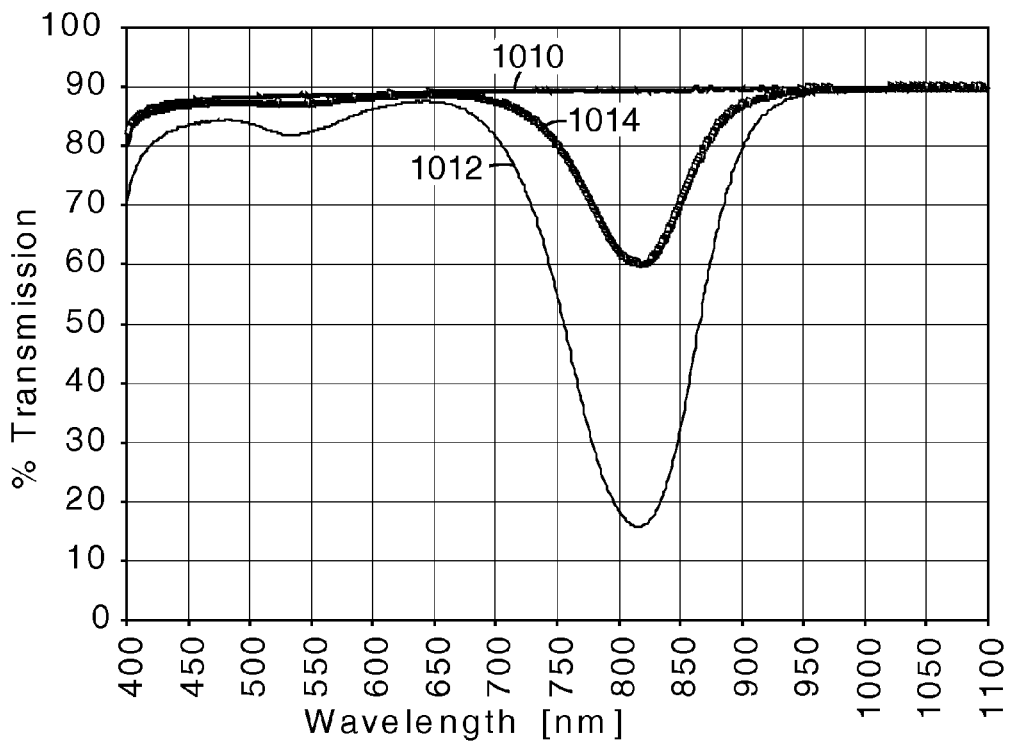
FIG. 10 is a graph of percent transmission versus wavelength for different cast multilayer webs that were fabricated.

The surface indices of refraction (of the PEN Gb material at the outside of the cast webs) were measured using a Metricon Prism Coupler. The index of refraction was essentially isotropic, with values of 1.638, 1.639, and 1.634 in the casting (MD), width (TD), and thickness directions respectively. The refractive index of the coPEN 55/45 HD layers was nominally 1.610 in all directions. The transmission characteristics of Cast Webs 1, 2, and 3 were also measured, using a Perkin-Elmer Lambda 950 spectrophotometer. The results are provided in FIG. 10, where percent transmission is plotted against wavelength, and where curve 1010 is for Cast Web 1, curve 1012 is for Cast Web 2, and curve 1014 is for Cast Web 3. The infrared absorption provided by the absorbing agent in Cast Webs 2 and 3 is readily apparent at about 800 nm, with the absorption of Cast Web 2 being stronger than Cast Web 3 due to the greater thickness of Cast Web 2 compared to Cast Web 3. Note also that the IR dye has a secondary absorption peak around 530 nm, which gives Cast Webs 2 and 3 a rosy hue.

Birefringent Multilayer Films Made Using Cast Webs 1, 2, and 3

The multilayer cast webs were then drawn or stretched so as to form multilayer optical films containing birefringent microlayers. A laboratory stretcher such as the KARO IV (available from Brueckner) was used for the present examples. The cast webs were generally pre-heated (with a pre-heat time and temperature) and then stretched at a uniform separation speed of the grippers corresponding to an initial strain rate (given by a % strain rate) to nominal draw ratios (the ratio of initial to final gripper separation) in two in-plane orthogonal directions (referred to as "x" and "y" directions). Some of the films were subsequently heat set after drawing at elevated temperature (heat set temperature) over a prescribed duration (heat set time). The processing conditions used for stretching the Cast Webs 1, 2, and 3 were selected such that, in the resulting multilayer optical films (referred to below as Multilayer Optical Films 1, 2, 3, 4, 5, 6, and 7), the PEN Gb microlayers were positively birefringent, and the coPEN 55/45 HD microlayers remained substantially isotropic with a refractive index of about 1.610.

Multilayer films 1 and 2 were made in this fashion from Cast Web 1 under the following conditions:

TABLE C

Multilayer Optical Films 1 and 2

| Conditions | Film 1 | Film 2 |
|---|---|---|
| Cast Web | 1 | 1 |
| Preheat time (seconds) | 60 | 60 |
| Pre-heat temperature (degrees C.) | 125 | 125 |
| Draw temperature (degrees C.) | 125 | 125 |
| Initial strain rate along x per second | 10% | 10% |
| Initial strain rate along y per second | 10% | 10% |
| Final Nominal x Draw Ratio | 4 | 3.2 |
| Final Nominal y Draw Ratio | 4 | 3.2 |
| Heat set time (seconds) | 30 | 30 |
| Heat set temperature (degrees C.) | 180 | 160 |
| Visible Appearance of transmitted light | cyan | white/clear |
| Visible Appearance of reflected light | pink | white/clear |

The final films could then be analyzed, before and/or after radiant energy processing, using a variety of physical and optical methods. The refractive indices of the outside of the skin layer (composed of the oriented PEN Gb material), where indicated, were measured at 632.8 nm using a Prism Coupler available from Metricon (Piscataway, N.J.). In summary, these values were measured as: nx and ny in a range from 1.69 to 1.75 and nz in a range from 1.50 to 1.52 (for all of Multilayer Optical Films 3 through 6, discussed below); nx=1.723, ny=1.733, nz=1.507 for Multilayer Optical Film 6, discussed below); and nx=1.841, ny=1.602, nz=1.518 for Multilayer Optical Film 7, discussed below).

The transmission band characteristics of the various cast webs and final films were measured with a Perkin-Elmer Lambda 950 spectrophotometer. Color characteristics were also observed visually under conditions that favored perception of transmitted and/or reflected light.

Figure 11:
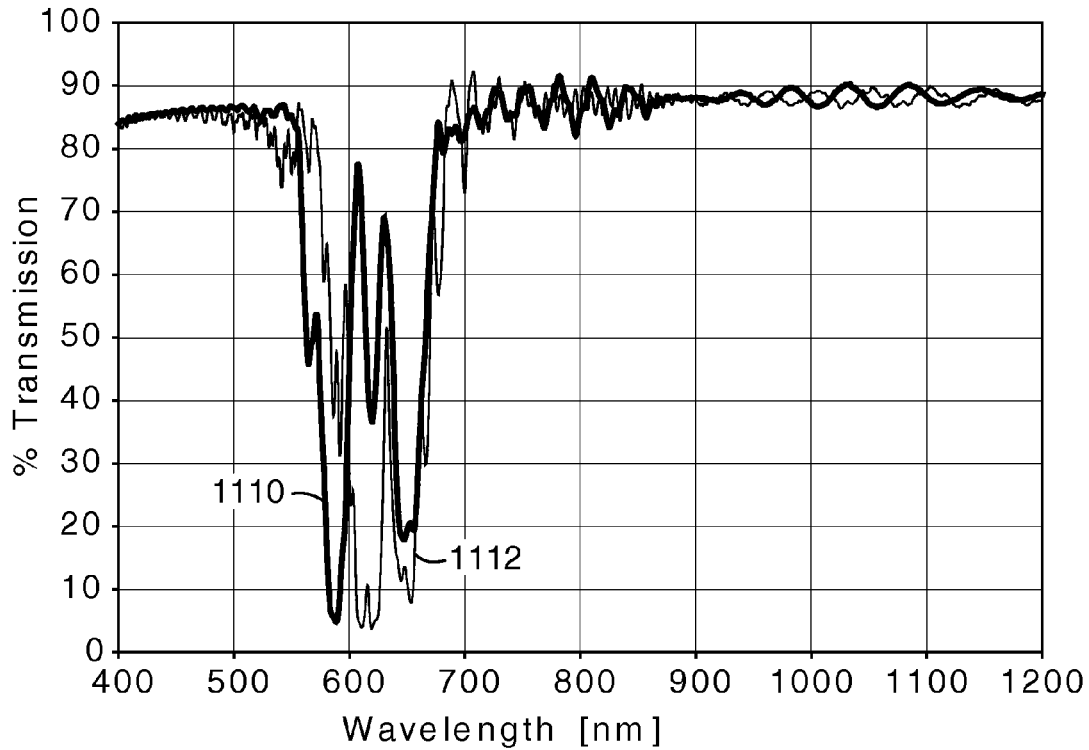
FIG. 11 is a graph of percent transmission versus wavelength for one multilayer optical film made using one of the cast webs of FIG. 10.

FIG. 11 illustrates typical spectra for Film 1, where curves 1110 and 1112 were taken at different positions on the film. Both curves are fairly representative of Film 1. Differences between the curves may be the result of thickness variations as well as layer profile variations due to flow variations down and crossweb during extrusion, film casting, and drawing. The major portion of the reflection band, defined by left and right band edges at 50% of the half minimum relative to the baseline transmission of around 85%, generally lie between 560 nm and 670 nm. The baseline transmission drop from 100% is the result of surface reflection from the two major surfaces of the constructions (front and back).

Figure 12:
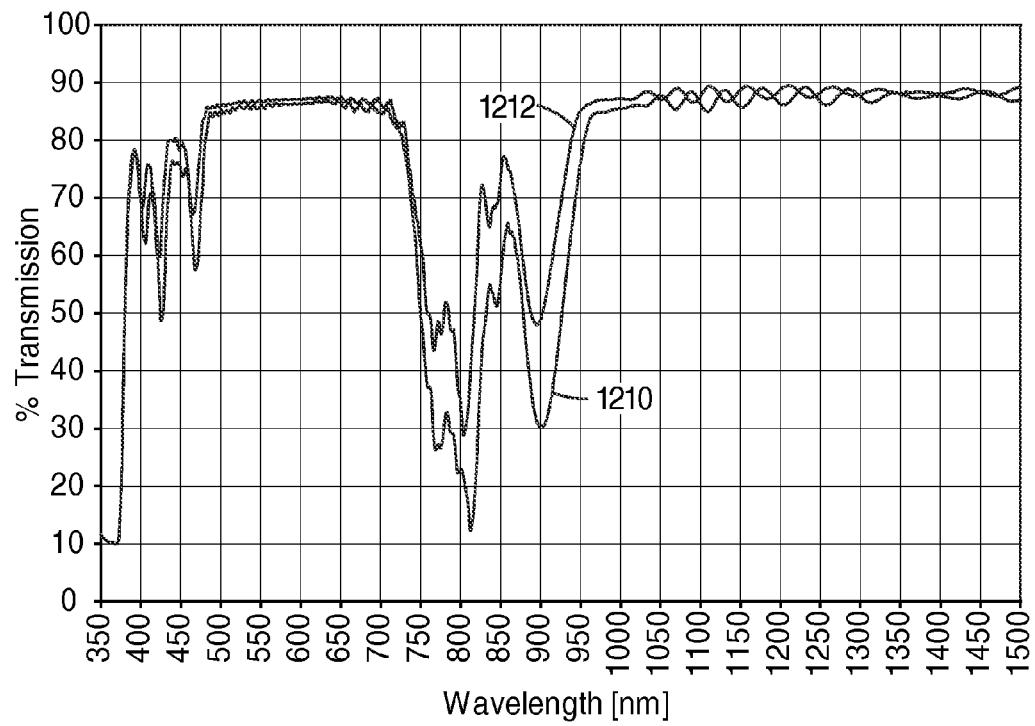
FIG. 12 is a graph of percent transmission versus wavelength for another multilayer optical film made using the same cast web as that used for the film of FIG. 11.

FIG. 12 illustrates typical spectra for Film 2, where curves 1210 and 1212 were taken using the two principal orthogonal (linear) polarization states of a normally incident polarized light source at the same position on the film. The slight differences between the curves reflect a slightly biased stretch resulting in a small difference between the two in-plane principal refractive indices of the oriented PENGb layers. The longer wavelength reflection band of Film 2 compared to Film 1 is consistent with the smaller draw ratio for Film 2 (3.2×3.2, compared to 4×4 for Film 1), because the smaller draw ratio results in a thicker film and thicker constituent layers, hence longer wavelength operation. Film 2 thus functions effectively as an IR reflecting film at normal incidence, having high reflectivity for a write wavelength of 800 nm. Such a film may be used to separate two writeable microlayer packets that have the same concentration of IR dye such that they can be independently treated by processing one packet using an IR beam (e.g. 800 nm) normally incident on one side of the construction and processing the other packet using an IR beam (e.g. 800 nm) normally incident on the opposite side of the construction. When the laser energy is sufficiently controlled and incident on one side of the film, the reflective packet of Film 2 can protect the writeable packet on the opposing side of the film by reducing the intensity of the beam below the threshold energ(ies) associated with such protected writeable packet. Note that the spectra of FIG. 12 reveal the presence of weak second order reflections from the interference stack at short visible wavelengths. These second order reflections may be further reduced by careful balancing of optical thicknesses (e.g., adjusting the f-ratio) as described in the art. In this manner, the Film 2, or slight modification thereof, may provide a blocking layer that is substantially transparent in the visible wavelength range.

Cast webs 2 and 3 were then also drawn or stretched to form other multilayer optical films containing birefringent microlayers. The resulting multilayer optical films, referred to as Films 3-7, and their processing conditions are as described in Table D:

TABLE D

| | Multilayer Optical Films 3 through 7 | | | | |
|---|---|---|---|---|---|
| Conditions | Film 3 | Film 4 | Film 5 | Film 6 | Film 7 |
| Cast Web | 2 | 2 | 2 | 2 | 3 |
| Preheat time (seconds) | 60 | 60 | 60 | 60 | 60 |
| Pre-heat temperature (degrees C.) | 125 | 125 | 125 | 125 | 125 |
| Draw temperature (degrees C.) | 125 | 125 | 125 | 125 | 125 |
| Initial strain rate along x per second | 20% | 10% | 10% | 10% | 10% |
| Initial strain rate along y per second | 20% | 10% | 10% | 10% | 1% |
| Final Nominal x Draw Ratio | 4 | 4.25 | 4 | 4.25 | 6 |
| Final Nominal y Draw Ratio | 4 | 4.25 | 4 | 4.25 | 1.1 |
| Heat set time (seconds) | none | None | 30 | 30 | none |
| Heat set temperature (degrees C.) | NA | NA | 180 | 180 | NA |
| Visible Appearance of transmitted light | magenta | yellow | magenta | yellow | yellow |
| Visible Appearance of reflected light | green | purple/blue | green | purple/blue | purple/blue |

Figure 13:
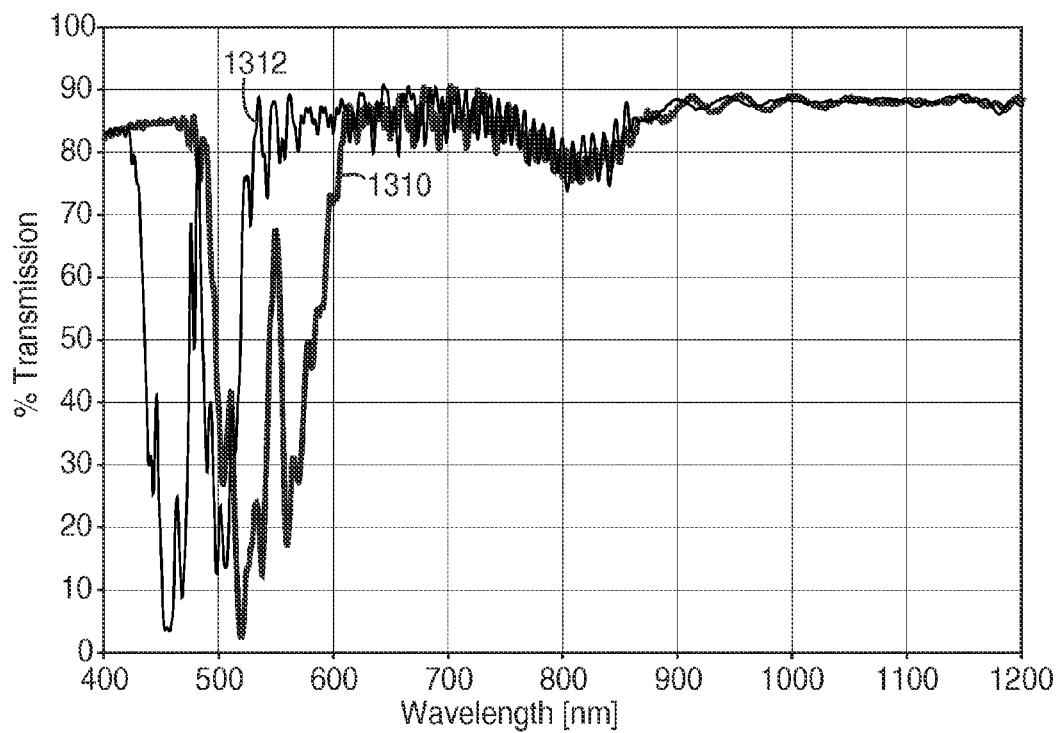
FIG. 13 is a graph of percent transmission versus wavelength for two other multilayer optical films made using a different one of the cast webs from FIG. 10, wherein these two multilayer optical films were later combined with the multilayer optical film of FIG. 12, which served as a blocking layer, to provide a composite multilayer optical film that was demonstrated to be capable of bi-level internal patterning.

Typical transmission spectra for Films 5 and 6, as measured by a Perkin-Elmer Lambda 950 spectrophotometer, are presented in FIG. 13 as curve 1310 and curve 1312 respectively. Spectra are not shown for Films 3 and 4, but they were similar to the spectra of Films 5 and 6 respectively.

Multilayer Films with Internal Patterning

Bi-Level Patterned Film 1

A three film laminated stack was formed by successively hand laminating Film 5 to Film 2, and then laminating Film 6 to the opposite side of Film 2, in each case using 3M™ 8141 Optically Clear Adhesive available from 3M Company, St. Paul, Minn. The resulting multilayer film (a composite of Films 5, 2, and 6) had an orange-colored appearance in transmitted light. This film included two interior writeable microlayer packets, i.e., the packets of Films 5 and 6 respectively, and also included a blocking layer disposed therebetween, i.e., Film 2. The blocking layer (Film 2) in this case comprised a microlayer packet having a reflection band disposed in the infrared region for normal incidence but that shifted to shorter wavelengths at oblique angles.

The capability of two internal microlayer packets of this film to be independently patterned was then confirmed using an infrared laser light source having a write wavelength of 800 nm. Specifically, the film was treated first with a Coherent Micra ultrafast oscillator laser (wavelength=800 nm, pulse rate=70 MHz) incident approximately normally on the Film 5 side of the composite film. A scanning speed of 30 mm/sec, a spot diameter of about 10 microns, and an average laser power of 0.25 Watts was used. A square-shaped zone, approximately 5 mm on a side (for a total area of about 25 mm$^2$), was fully treated with overlapping sweeps to substantially reduce the reflection of the Film 5 component in the treated square zone without substantially affecting the reflectivity of the Film 6 component in this zone.

The composite film was then turned over and again treated with the same Micra ultrafast oscillator laser, again at approximately normal incidence and with the same scanning speed and average power, but this time with the directed radiation impinging on the Film 6 side of the construction. This second treatment was applied in a second square-shaped zone, also about 5 mm on a side for a total area of about 25 mm², but this second square-shaped zone was offset or shifted in plan view relative to the first square-shaped zone to allow evaluation of the treatment from both sides independently and together. This second zone was fully treated with overlapping sweeps to substantially reduce the reflection of the Film 6 component in the treated square zone without substantially affecting the reflectivity of the Film 5 component. Thus, in one area (I) of the film a portion of the first zone was present without any portion of the second zone, in another area (II) of the film a portion of the second zone was present without any portion of the first zone, in another area (III) of the film a portion of the first zone and a portion of the second zone were both present, and in still another area (IV) of the film no portion of either the first or second zone was present. These four areas of the film had noticeably different appearances in transmitted light, confirming the bi-level internal patterning of the resulting film, which is referred to herein as Bi-Level Patterned Film 1. Specifically, the Bi-Level Patterned Film 1 exhibited a yellow appearance in transmitted light in area (I), due to the reduced reflectivity of Film 5 in this area, a magenta appearance in area (II), due to the reduced reflectivity of Film 6 in this area, a colorless appearance in area (III), due to the reduced reflectivities of both Film 5 and Film 6 in this area, and the original orange appearance in area (IV).

Cast Webs 4, 5, and 6

Multilayer polymer webs were formed in a manner similar to Cast Webs 1-3; however, a 275 alternating layer feedblock was used. The multilayer construction was cast from a die, quenched, and electro-statically pinned to a casting wheel to form cast multilayer optical web with desired approximate thicknesses (or caliper) over a central portion in width dimension. Other details of construction of these webs, referred to here as Cast Webs 4, 5, and 6, are provided in Table E below. In addition to the resins PEN, CoPEN 55/45 HD and PENBB20 used in the previous cast web examples, a 90/10 CoPEN was used. This 90/10 CoPEN comprises a 10 mol % substitution of DMT (dimethyl terephthalate) for NDC (dimethyl 2,6-naphthalene dicarboxylate) as generally described in U.S. Pat. No. 6,352,761 (Hebrink et al.), "Modified Copolyesters and Improved Multilayer Reflective Films". SA115B used in the skins is available from Eastman (Kingsport, Tenn.).

In connection with these cast webs, masterbatches were made prior to the multi-layer co-extrusion by feeding the dye and polymer resin PENBB20 or coPEN 55/45 HD in prescribed weight ratios into a twin screw extruder with an additional vacuum applied as needed to ensure minimal degradation of the resin. The extrudate was then chopped into pellets for feeding. The dye used in Cast Webs 4 and 5 was Epolight™ 4121, available from Epolin, Inc., Newark, N.J. The masterbatch nominal dye concentrations were 1.0 wt % dye in polymer.

TABLE E

Processing Conditions for Cast Webs 4, 5 and 6

| Conditions | Cast Web 4 | Cast Web 5 | Cast Web 6 |
|---|---|---|---|
| Material 1 | PEN | CoPEN 90/10 | CoPEN 90/10 |
| Material 2 | PENBB20 | CoPEN 55/45 HD | CoPEN 55/45 HD |
| Material 3 | PEN | SA115B | SA115B |
| Extruder 1 Final Temperature | 282° C. | 282° C. | 282° C. |
| Extruder 2 Final Temperature | 275° C. | 275° C. | 275° C. |
| Extruder 3 Final Temperature | 282° C. | 268° C. | 268° C. |
| Melt Train Temperature | 285° C. | 268° C. | 285° C. |
| Die Temperature | 279° C. | 275° C. | 279° C. |
| Material 1 relative weight fed | 11 | 10 | 10 |
| Material 2 relative weight fed | 8 | 9 | 9 |
| Material 3 relative weight fed | 5 | 5 | 5 |
| Stream fed Masterbatch | Material 2 | Material 2 | Material 2 |
| Infra-red dye | Epolight ™ | None | Epolight ™ |
| weight % dye in Master batch | 1 | 1 | 1 |
| Masterbatch fraction of stream | 0.04 | 0.0 | 0.06 |

The cast web thicknesses were adjusted to achieve the desired final thicknesses of the Multilayer Optical Films 9, 10, and 11 described below.

Birefringent Multilayer Film 9, 10, 11 Made Using Cast Webs 4, 5, 6

The multilayer cast webs were then drawn sequentially on a film line and wound into continuous rolls of film. The cast webs were generally pre-heated, stretched in a Length Orienter (L.O.) along the machine direction (x direction) above the glass transition of the cast web materials to a draw ratio of about 3.8. The film was then preheated and drawn in the transverse direction (y direction) to a draw ratio of about 4.2 at 130 degrees C. in a conventional tenter. The finished Multilayer Optical Film 9, made from Cast Web 4, was clear and approximately 22 microns thick. This film represents a so-called "doubly birefringent" film with a latent blue reflective band. When laser treated, the film became a blue reflector and appeared yellow when transmitted light was viewed from a white background. The finished Multilayer Optical Film 10, made from Cast Web 5, was a so-called clear-to-cyan film with a reflection left band edge around 735 nm and a final thickness of about 44 microns. This film appeared clear with a slight rosy hue when viewed with transmitted light from a white background. When viewed obliquely, this film appeared cyan with transmitted light from a white background. The finished Multilayer Optical Film 11, made from Cast Web 6, was a red reflector that appeared cyan when viewed with transmitted light from a white background.

The refractive indices of the outer skin layer of the Multilayer Optical Film 9 (composed of the oriented PEN material) were measured at 632.8 nm using a Prism Coupler available from Metricon (Piscataway, N.J.). For these films, the refractive indices of the interior PEN microlayers is substantially the same as the measured refractive indices of the outer PEN skin layers. The measured refractive indices nx, ny and nz of the PEN skin were 1.731, 1.754 and 1.495, respectively. Transmission variations over the inherent but inactive reflective band, relative to that measured due to surface reflections only (i.e. when no optical band is present) were under 10%. The Multilayer Optical Film 10 had a reflection band between about 750 nm and 860 nm with transmission in both polarization states below 5% (e.g., reflectivity greater than 95%) in the major central portion of the band. Multilayer Optical Film 11 had a reflection band between about 590 nm and 680 nm with transmission in both polarization states below 5% (e.g., reflectivity greater than 95%) in the major central portion of the band.

Bi-Level Patterned Film 2

Multilayer Optical Film 9 was laminated to Film 10 and then to Film 11 using a pressure sensitive adhesive. In this example, the Film 9 side of the construction was placed nearest to the source. In this manner, a construction comprising a less absorbing first packet with a more absorbing second packet, separated by a reflective, band shifting, blocking layer was formed.

The construction was mounted on Aerotech XY linear stages mounted to a Newport rotational axis such that the center of rotation is very near the focused spot of the laser. In this manner, the stage could control the angle of incidence for laser treatment. The construction was then treated with a Coherent Micra ultrafast oscillator laser (wavelength=800 nm, pulse width of 40 femtoseconds, and repetition rate between 60-80 MHz) at 840 milliWatts to form a bi-level patterned film referred to herein as Bi-Level Patterned Film 2. The beam was focused with an Edmunds Optics 75 mm focal length plano-convex lens mounted in a Thorlabs 1 inch beam tube. The samples were deliberately processed with a chosen level of defocus to improve uniformity of the treatment.

The Film 9 portion of the construction was treated at normal incidence with a scan speed of 20 mm/sec, with 10 micron spacings between scans and at approximately 3 mm of defocus. Under these conditions, the Film 9 portion of the construction became an active blue reflector in the processed zones. The Film 11 portion of the construction remained untreated under these conditions. Thus, Film 9 exemplified an independently treatable clear-to-mirror set of layers in a bilevel construction, such treatment accomplished with normal incident processing wherein a blocking layer prevented treatment of another, treatable layer, behind it.

The Film 11 portion of the construction began as a red reflector in the untreated state. The Film 11 portion was treated at 60 degrees to normal incidence with a scan speed of 80 mm/sec, with 27 micron spacings between scans and at approximately 3.5 mm of defocus. Under these conditions, the Film 11 portion became clear in the treated zones, and Film 9 remained untreated. Thus, Film 11 exemplified an independently treatable mirror-to-clear set of layers in a bilevel construction, such treatment accomplished with an off-normal angle process.

This Bi-Level Patterned Film 2 construction also exemplified the use of two levels of absorption in the two sets of layers. Finally, Film 10 exemplified a radiant energy blocking layer for 800 nm that band shifted to allow radiant energy treatment at an off-normal angle of incidence.

Further Contemplated Bi-Level Patterned Film Embodiments

An IR polarizer, similar to that of Film 7 but using a thicker initial cast web than Cast Web 3, can be made. The cast web would be about twice as thick as Cast Web 3, i.e. intermediate in thickness between Cast Webs 2 and 3. The cast web itself would preferably include no IR absorber present so that the resulting IR polarizer, which will be used as a blocking layer, is relatively immune to processing by the write wavelength. This prophetic IR polarizer is referred to herein as Film 8.

A three film laminated stack could be formed by successively hand laminating a film similar to Film 5 (denoted Film 5') to Film 8, and then laminating a film similar to Film 6 (denoted Film 6') such that Film 8 is disposed between Films 5' and 6', the laminations again preferably using the 3M 8141 Optically Clear Adhesive available from 3M (Maplewood, Minn.). The resulting construction would have orange color under conditions that favored transmitted light viewing. The Films 5' and 6' would differ from Films 5 and 6, respectively, in the amount of IR absorber used so as to properly tailor the respective threshold values. One of the Films 5' or 6' would be tailored to have a higher concentration of IR absorbing dye, e.g. Epolite™ 4121, so that it has a lower write threshold and can be processed at a lower fluence at the write wavelength. This higher concentration film (thus having a higher absorptivity) would be chosen as the back writeable packet. The writing process would be conducted by directed a beam comprising the write wavelength at the other side of the film (the side having the Film 5' or 6' of lower IR absorber concentration).

The IR polarizing Film 8 is expected to have a transmission spectrum for its block state of polarization similar to that of Film 2 portrayed in FIG. 12. This film would block a substantial portion of the laser energy used to write on the laser receptive optical film polarized along this block state. In the orthogonal pass state of polarization, the spectrum is expected to be relatively flat, and representative of the baseline surface reflections, e.g. as represented by the portions of the curves between 500 and 700 nm and above 1000 nm in FIG. 12. In this manner, two writable optical packets with the same concentration of IR dye can be individually treated by processing the front packet closest to the source with a first beam having a high fluence and polarized along the block state of the IR blocking polarizer (Film 8), while processing the back packet behind the blocking layer with a second beam of the same write frequency but polarized along the pass state of the IR blocking polarizer. When the laser energy is sufficiently controlled in the block state, the reflective packet protects the back packet by preventing the threshold energy needed from striking it. When the laser energy is sufficiently controlled in the pass state, the fluence is maintained below the threshold of the front packet but above the threshold of the back packet, so that the back packet is independently written. FIG. 12 also reveals the presence of second order reflections from the interference stack. These may be suppressed by a careful balancing of optical thicknesses as described in the art. In this manner, the blocking layer may be made essentially transparent in the visible.

Consider also an embodiment similar to that just described, in which Film 5' is used as a front packet and Film 6' is used as the back packet with higher absorptivity than the front packet at the write wavelength. The resulting film could be treated first from the Film 5' side using the Micra femtosecond oscillator configured so that the light is polarized along the block axis of Film 8, to substantially reduce the reflective characteristic of the Film 5' in a 5 mm square area. The construction could then be treated again, from the same side, with the Micra ultrafast oscillator, but now in the orthogonal pass state of Film 8, at a lower fluence, to produce a 5 mm square in which the reflective characteristic of Film 6' was substantially reduced. This second treated area could be deliberately partially overlapped to allow evaluation of the treatment from both polarizations independently and together. This would result in a yellow appearing area due to the reduction in the reflection of Film 5', a magenta appearing area due to the reduction in the reflection of Film 6', and a colorless appearing area where the laser exposure of both sides of the construction overlapped due to the reduction in reflection of both films in this area.

The teachings of the present application can be used in combination with the teachings of any or all of the following commonly assigned applications, which are incorporated herein by reference: U.S. Provisional Application No. 61/157,996, "Multilayer Optical Films Having Side-by-Side Mirror/Polarizer Zones", filed Mar. 6, 2009; U.S. Patent Application 61/139,736, "Internally Patterned Multilayer Optical Films Using Spatially Selective Birefringence Reduction", filed Dec. 22, 2008.

The teachings of the present application can be used in combination with the teachings of any or all of the following commonly assigned applications being filed on even date herewith: International Application No. PCT/US2009/069153, "Internally Patterned Multilayer Optical Films Using Spatially Selective Birefringence Reduction"; International Application No. PCT/US2009/069120, "Multilayer Optical Films Having Side-by-Side Mirror/Polarizer Zones"; International Application No. PCT/US2009/069160, "Internally Patterned Multilayer Optical Films With Multiple Birefringent Layers"; and International Application No. PCT/US2009/069192, "Multilayer Optical Films Having Side-by-Side Polarizer/Polarizer Zones".

Unless otherwise indicated, all numbers expressing quantities, measurement of properties and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the scope and spirit of this invention, and it should be understood that this invention is not limited to the illustrative embodiments set forth herein. All U.S. patents, published and unpublished patent applications, and other patent and non-patent documents referred to herein are incorporated by reference, to the extent they are not inconsistent with the foregoing disclosure.

The invention claimed is:

1. A multilayer optical film, comprising:
    a first group of interior layers arranged to selectively reflect light by constructive or destructive interference to provide a first reflective characteristic, the first group of layers also having a first absorption characteristic suitable to, upon exposure to light comprising a write wavelength, absorptively heat the first group of layers by an amount sufficient to change the first reflective characteristic to a third reflective characteristic while maintaining the structural integrity of the first group of layers;
    a second group of interior layers arranged to selectively reflect light by constructive or destructive interference to provide a second reflective characteristic, the second group of layers also having a second absorption characteristic suitable to, upon exposure to light comprising the write wavelength, absorptively heat the second group of layers by an amount sufficient to change the second reflective characteristic to a fourth reflective characteristic while maintaining the structural integrity of the second group of layers, the second absorption characteristic of the second group of interior layers being different from the first absorption characteristic of the first group of interior layers; and
    a first blocking layer disposed between the first and second groups of interior layers, the first blocking layer being adapted to at least partially block light of the write wavelength
    wherein the first group of interior layers includes at least some first layers that are birefringent;
    wherein the change from the first reflective characteristic to the third reflective characteristic is associated with a reduction or elimination of the birefringence of the at least some first layers;
    wherein the second group of interior layers includes at least some second layers that are birefringent; and
    wherein the change from the second reflective characteristic to the fourth reflective characteristic is associated with a reduction or elimination of the birefringence of the at least some second layers.

2. The film of claim 1, wherein the first blocking layer blocks light of the write wavelength such that a first beam of light comprising the write wavelength can be directed at the film to change the first reflective characteristic to the third reflective characteristic without substantially changing the second reflective characteristic.

3. The film of claim 2, wherein the first blocking layer blocks light of the write wavelength such that a second beam of light comprising the write wavelength can be directed at the film to change the second reflective characteristic to the fourth reflective characteristic without substantially changing the first reflective characteristic.

4. The film of claim 1, wherein the first blocking layer comprises an absorbing agent that selectively absorbs light at the write wavelength.

5. The film of claim 1, wherein the first blocking layer substantially reflects light at the write wavelength.

6. The film of claim 1, wherein the first blocking layer substantially reflects a first beam of light comprising the write wavelength and substantially transmits a second beam of light comprising the write wavelength, the first and second beams having different angles of incidence.

7. The film of claim 1, wherein the first absorption characteristic comprises a first energy threshold, and the second absorption characteristic comprises a second energy threshold different from the first energy threshold.

8. The film of claim 1, wherein the first blocking layer is rotationally asymmetric.

9. A multilayer optical film, comprising:
    a first group of interior layers arranged to selectively reflect light by constructive or destructive interference, the first group of layers including at least some first layers that are birefringent, and the first group of layers also having a first absorption characteristic suitable to, upon exposure to light comprising a write wavelength, absorptively heat the first group of layers by an amount sufficient to reduce or eliminate the birefringence of the at least some first layers, while maintaining the structural integrity of the first group of layers;
    a second group of interior layers arranged to selectively reflect light by constructive or destructive interference, the second group of layers also including at least some second layers that are birefringent, and the second group of layers also having a second absorption characteristic suitable to, upon exposure to light comprising the write wavelength, absorptively heat the second group of layers by an amount sufficient to reduce or eliminate the birefringence of the at least some second layers, while maintaining the structural integrity of the second group of layers, the second absorption characteristic of the second group of interior layers being different from the first absorption characteristic of the first group of interior layers; and a first blocking layer disposed between the first and second groups of interior layers, the first blocking layer being adapted to at least partially block light of the write wavelength.

10. The film of claim 9, wherein the first blocking layer blocks light of the write wavelength such that a first beam of light comprising the write wavelength can be directed at the film to reduce or eliminate the birefringence of the at least some first layers without substantially reducing the birefringence of the at least some second layers.

11. The film of claim 10, wherein the first blocking layer blocks light of the write wavelength such that a second beam of light comprising the write wavelength can be directed at the film to reduce or eliminate the birefringence of the at least some second layers without substantially reducing the birefringence of the at least some first layers.

12. The film of claim 1, wherein the first group of interior layers has a lower absorption at the write wavelength than the second group of interior layers.

13. The film of claim 9, wherein the first group of interior layers has a lower absorption at the write wavelength than the second group of interior layers.

\* \* \* \* \*

UNITED STATES PATENT AND TRADEMARK OFFICE
CERTIFICATE OF CORRECTION

PATENT NO. : 9,019,607 B2
APPLICATION NO. : 13/139848
DATED : April 28, 2015
INVENTOR(S) : William Merrill It is certified that error appears in the above-identified patent and that said Letters Patent is hereby corrected as shown below:

Title Page

Page 2, Column 2
Line 6, After "PCT/US2009/069173," insert -- (Docket 65038W0003) --.
Line 7, After "PCT/US2009/069173," insert -- (Docket 65038W0003) --.

Specification

Column 29
Line 42, After "Polarizer Zones" insert -- (Attorney Docket No. 6S038US002), --.

Column 30
Line 45, After "PCT/US2009/069160" insert -- (Attorney Docket No. 65848W0002), --.
Line 47, After "PCT/US2009/069192" insert -- (Attorney Docket No. 65849W0002), --.

Column 33
Line 59, After "PCT/US2009/069153" insert -- (Attorney Docket No. 64847W0003), --.
Line 61-62, After "PCT/US2009/069120" insert -- (Attorney Docket No. 65037W0003), --.
Line 63-64, After "PCT/US2009/069160" insert -- (Attorney Docket No. 65848W0002), --.
Line 66, After "PCT/US2009/069192" insert -- (Attorney Docket No. 65849W0002), --.

Column 35
Line 62, Delete "$I_{LA}$" and insert -- $I_{1,A}$ --.
Line 65, Delete "$I_{LA}$" and insert -- $I_{1,A}$ --.

Column 44
Line 57, After "PCT/US2009/069120" insert -- (Attorney Docket No. 65037W0003), --.

Signed and Sealed this
Twenty-third Day of August, 2016

Michelle K. Lee
*Director of the United States Patent and Trademark Office*

CERTIFICATE OF CORRECTION (continued)
U.S. Pat. No. 9,019,607 B2

Column 45
Line 38, After "PCT/US2009/069192" insert -- (Attorney Docket No. 65849W0002), --.

Column 60
Line 64, After "Mirror/Polarizer Zones," insert -- (Attorney Docket No. 65037US002), --.
Line 67, After "Reduction," insert -- (Attorney Docket No. 64847US002), --.

Column 61
Line 4-5, After "PCT/US2009/069153" insert -- (Attorney Docket No. 64847W0003), --.
Line 7, After "PCT/US2009/069120" insert -- (Attorney Docket No. 65037W0003), --.
Line 9, After "PCT/US2009/069160" insert -- (Attorney Docket No. 65848W0002), --.
Line 11-12, After "PCT/US2009/069192" insert -- (Attorney Docket No. 65849W0002), --.